United States Patent
Litty et al.

(10) Patent No.: US 11,611,482 B1
(45) Date of Patent: Mar. 21, 2023

(54) BANDWIDTH THROTTLING

(71) Applicant: Menlo Security, Inc., Mountain View, CA (US)

(72) Inventors: Lionel Litty, San Francisco, CA (US); Ji Feng, Sunnyvale, CA (US); Gautam Altekar, Sunnyvale, CA (US); Gary Steven Kratkin, Albany, CA (US)

(73) Assignee: Menlo Security, Inc., Mountain View, CA (US)

( * ) Notice: Subject to any disclaimer, the term of this patent is extended or adjusted under 35 U.S.C. 154(b) by 0 days.

(21) Appl. No.: 17/346,010

(22) Filed: Jun. 11, 2021

Related U.S. Application Data

(60) Provisional application No. 63/038,539, filed on Jun. 12, 2020.

(51) Int. Cl.
*H04L 41/0896* (2022.01)
*H04L 47/70* (2022.01)
*H04L 43/16* (2022.01)
*H04L 47/22* (2022.01)
*H04L 41/5025* (2022.01)
*H04L 41/22* (2022.01)
*H04L 41/0253* (2022.01)

(52) U.S. Cl.
CPC ...... *H04L 41/0896* (2013.01); *H04L 41/0253* (2013.01); *H04L 41/22* (2013.01); *H04L 41/5025* (2013.01); *H04L 43/16* (2013.01); *H04L 47/22* (2013.01); *H04L 47/822* (2013.01)

(58) Field of Classification Search
CPC . H04L 41/0896; H04L 41/0253; H04L 41/22; H04L 41/5025; H04L 43/16; H04L 47/22; H04L 47/822
See application file for complete search history.

(56) References Cited

U.S. PATENT DOCUMENTS

| | | |
|---|---|---|
| 6,253,234 B1 | 6/2001 | Hunt |
| 6,615,212 B1 | 9/2003 | Dutta |
| 6,829,746 B1 | 12/2004 | Schwerdtfeger |
| 7,769,820 B1 | 8/2010 | Spies |
| 8,510,571 B1 | 8/2013 | Chang |
| 8,559,642 B2 | 10/2013 | Wurm |
| 8,745,742 B1 | 6/2014 | Satish |
| 8,788,616 B2 | 7/2014 | O'Laughlen |
| 8,825,748 B2 | 9/2014 | Sng |
| 8,839,460 B2 | 9/2014 | Shirlen |
| 9,391,832 B1 | 7/2016 | Song |
| 2001/0003830 A1* | 6/2001 | Nielsen ............ H04L 47/70 709/226 |

(Continued)

OTHER PUBLICATIONS

Moshchuk et al., Flashproxy: Transparently Enabling Rich Web Content via Remote Execution, MobiSys'08, Jun. 2008.

(Continued)

*Primary Examiner* — Thai Nguyen
(74) *Attorney, Agent, or Firm* — Van Pelt, Yi & James LLP

(57) ABSTRACT

Bandwidth throttling in a browser isolation environment is disclosed. A request is received from a client browser executing on a client device to connect with a remote resource. The browser isolation system provides a surrogate browser to facilitate communications between the client browser and the remote resource. A throttle is applied to a portion of content delivered to the client browser in response to the received request.

26 Claims, 16 Drawing Sheets

(56) References Cited

U.S. PATENT DOCUMENTS

| | | |
|---|---|---|
| 2002/0069241 A1 | 6/2002 | Narlikar |
| 2002/0073155 A1 | 6/2002 | Anupam |
| 2003/0196104 A1 | 10/2003 | Baber |
| 2005/0038900 A1* | 2/2005 | Krassner ............ G06Q 30/0207 709/231 |
| 2005/0039141 A1 | 2/2005 | Burke |
| 2008/0049777 A1* | 2/2008 | Morrill ................ H04L 67/141 370/420 |
| 2008/0098301 A1 | 4/2008 | Black |
| 2008/0235239 A1 | 9/2008 | Penton |
| 2009/0060032 A1 | 3/2009 | Schmit |
| 2009/0097651 A1 | 4/2009 | Whillock |
| 2009/0138937 A1 | 5/2009 | Erlingsson |
| 2009/0179917 A1 | 7/2009 | Hargreaves |
| 2009/0182844 A1 | 7/2009 | Barton |
| 2010/0036853 A1 | 2/2010 | Jones |
| 2010/0042709 A1 | 2/2010 | Liesche |
| 2010/0095219 A1 | 4/2010 | Stachowiak |
| 2010/0268739 A1 | 10/2010 | Zalepa |
| 2010/0306642 A1 | 12/2010 | Lowet |
| 2011/0088039 A1 | 4/2011 | Tabone |
| 2011/0113230 A1 | 5/2011 | Kaminsky |
| 2011/0126248 A1* | 5/2011 | Fisher .............. H04N 21/47202 725/95 |
| 2011/0145694 A1 | 6/2011 | Graves |
| 2011/0283267 A1 | 11/2011 | Waite |
| 2012/0016959 A1 | 1/2012 | O'Laughlen |
| 2012/0022942 A1* | 1/2012 | Holloway ............. G06F 40/143 705/14.49 |
| 2012/0030224 A1 | 2/2012 | Cohen |
| 2012/0054616 A1* | 3/2012 | Mittal .............. H04N 21/42209 715/722 |
| 2012/0124372 A1 | 5/2012 | Dilley |
| 2012/0167206 A1 | 6/2012 | Reetz-Lamour |
| 2013/0007882 A1 | 1/2013 | Devarajan |
| 2014/0012978 A1* | 1/2014 | Moussavian ..... H04N 21/44213 709/224 |
| 2014/0365794 A1* | 12/2014 | Decker ................... G06F 1/329 713/320 |
| 2017/0147590 A1* | 5/2017 | Holloway ........... H04L 63/1466 |

OTHER PUBLICATIONS

Moshchuk et al., SpyProxy: Execution-based Detection of Malicious Web Content, 2007.

* cited by examiner

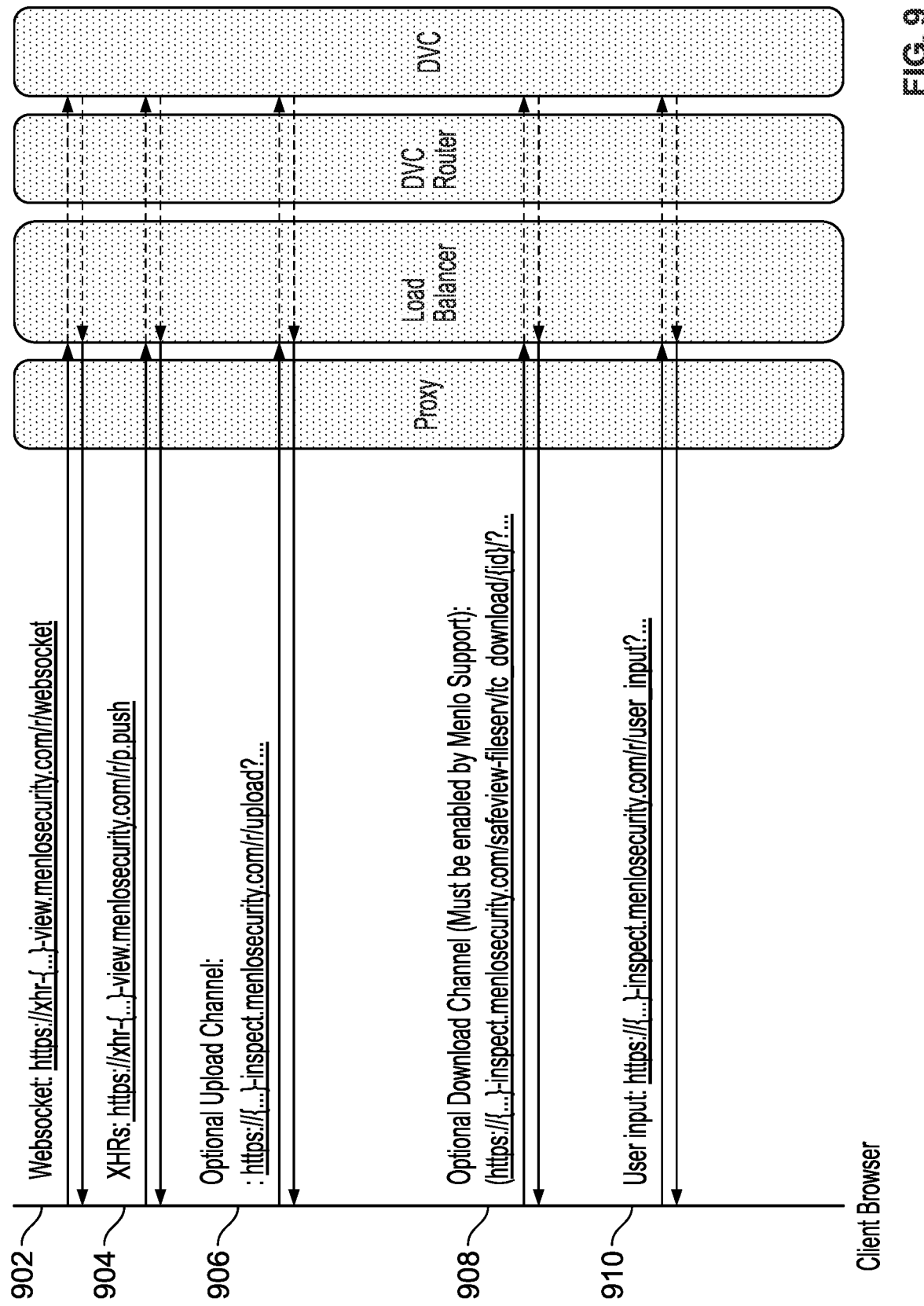

≡ ⚲ Policy

● Web ⌄

GLOBAL POLICY
Threats
Categories
Documents / Archives
File Downloads
File Uploads

EXCEPTIONS
SSL Decryption Exemptions
Policy Exceptions

SETTINGS
Policy Settings
Content Inspection

Bandwidth Limits
☐ Applications ›
⚙ CASB ›

← Create Bandwidth Rule

Rule Details

Users/Groups
Please select users, groups, or both.
                                          Type
Users and/or Groups                       Group ▼    [+ Add]  ⎡Import List    ⟵ 1002
⋔ All Types ▼  🔍 Search

| Name | Source (Users/Groups) | High Usage Threshold | Bandwidth Limit | | |
|---|---|---|---|---|---|
| Limit Interns | interns | 200 MB | 300 MB | Delete | Edit |
| Higher Limit for Managers | managers, staff | 2 GB | 3 GB | Delete | Edit |
| Default Rule | Any | 800 MB | 1 GB | | |

[Next >]

Bandwidth Quota

Video Settings

FIG. 10

≡ ⏻ Policy

● Web ∨

GLOBAL POLICY
Threats
Categories
Documents / Archives
File Downloads
File Uploads
EXCEPTIONS
SSL Decryption Exemptions
Policy Exceptions
SETTINGS
Policy Settings
Content Inspection
Bandwidth Limits
☐ Applications  >
⌘ CASB  >

← Create Bandwidth Rule

Rule Details

Users/Groups

Bandwidth Quota
Customizes default daily bandwidth limits and the actions to take when the limit is approached and/or exceeded. Daily bandwidth limits are measured every 60 seconds.

Daily Bandwidth Quota
⬤ Activate  Quota___  MB ▶  } 1102
  Required

Action on Approaching Quota
50%    70%    75%
       ▶      90%   } 1104
✓ Allow Action on Exceeded Quota
⊖ Block  ▶  } 1106

[Next >]

Video Settings

FIG. 11

Web Customization

| Block Page | Indicators | Dialogs, Documents and Files | Bandwidth Alerts |

Excessive Bandwidth Usage

Text for Excessive Bandwidth Usage Alert:
> You are approaching your daily bandwidth limit. Please moderate internet usage and close high bandwidth applications like video streaming. Once the limit is reached, your Internet access will be disabled for the rest of the day.

22 characters left

Label for Alert Acknowledgement Button: OK 28 characters left

Daily Bandwidth Limit Exceeded

Text for Daily Bandwidth Limit Exceeded Alert:
> You have exceeded your daily bandwidth limit. This event has been logged. Repeated violations will result in access restrictions.

120 characters left

Label for Alert Acknowledgement Button: OK 28 characters left

Heading for Block Page: Request Blocked 35 characters left

Text for Daily Bandwidth Limit Exceeded Block Page:
> You have exceeded your daily bandwidth limit. Your internet access will be disabled for the remainder of the day.

58 characters left

✓ There are unpublished changes

[Reset] [Preview] [Save Changes] [Publish]

≡ ♀ Policy

● Web ∨

← Create Bandwidth Rule

GLOBAL POLICY
Threats
Categories
Documents / Archives
File Downloads
File Uploads

EXCEPTIONS
SSL Decryption Exemptions
Policy Exceptions

SETTINGS
Policy Settings
Content Inspection

Bandwidth Limits

☐ Applications ∨
⊄ CASB ∨

Rule Details

Users/Groups

Bandwidth Quota 1302

Video Settings
Customizes default video resolution limits for active and background tabs
YouTube Resolution Limit GUARANTEED RESOLUTION ⎫
● Enable resolution limit on Active tab      720p ▶    ⎬ 1304
● Optimize resolution on Background tabs    480p ▶    ⎭

Resolution Limit For Other Streaming Services
● Enable resolution limit on Active tab         2    MB/s ▶ ⎫
● Optimize resolution on Background tabs    1    MB/s ▶ ⎬ 1306
                                                                                  ⎭

Limit Resolution for Other Streaming Sites

| SERVICE | ENFORCE RESOLUTION LIMITS |
|---|---|
| Vimeo | ● |
| Daily Motion | ● |

Save

FIG. 13

BANDWIDTH THROTTLING

CROSS REFERENCE TO OTHER APPLICATIONS

This application claims priority to U.S. Provisional Patent Application No. 63/038,539 entitled BANDWIDTH THROTTLING filed Jun. 12, 2020 which is incorporated herein by reference for all purposes.

BACKGROUND OF THE INVENTION

One way that nefarious individuals perpetrate computer attacks is by exploiting browser vulnerabilities. When an unsuspecting user visits a website hosting malicious content, that user's browser can by compromised and the compromise can further be extended to other resources on the user's computer or accessible via the user's computer. Exposure to known threats can sometimes be prevented by having users routinely apply patches or otherwise update their browsers. Unfortunately, many users lack the skill or knowledge to keep their browsers up to date (or run legacy browsers for which such patches/updates are not available) and thus remain vulnerable to preventable attacks. Approaches such as having patches automatically applied can reduce but not eliminate risk. For example, even browsers diligently kept up-to-date can be compromised by zero-day and/or other attacks that the browser is not capable of withstanding. Computer attacks can be perpetrated in other ways as well, even when fully up-to-date systems are involved. Accordingly, ongoing improvements to securing computing interactions (e.g., with browsers and websites) are desirable.

BRIEF DESCRIPTION OF THE DRAWINGS

Various embodiments of the invention are disclosed in the following detailed description and the accompanying drawings.

FIG. 9 illustrates different communication channels used in various embodiments.

FIG. 10 illustrates an example of an interface.

FIG. 11 illustrates an example of an interface.

FIGS. 12A-12C illustrate examples of interfaces.

FIG. 13 illustrates an example of an interface.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Example Environment

Figure 1:
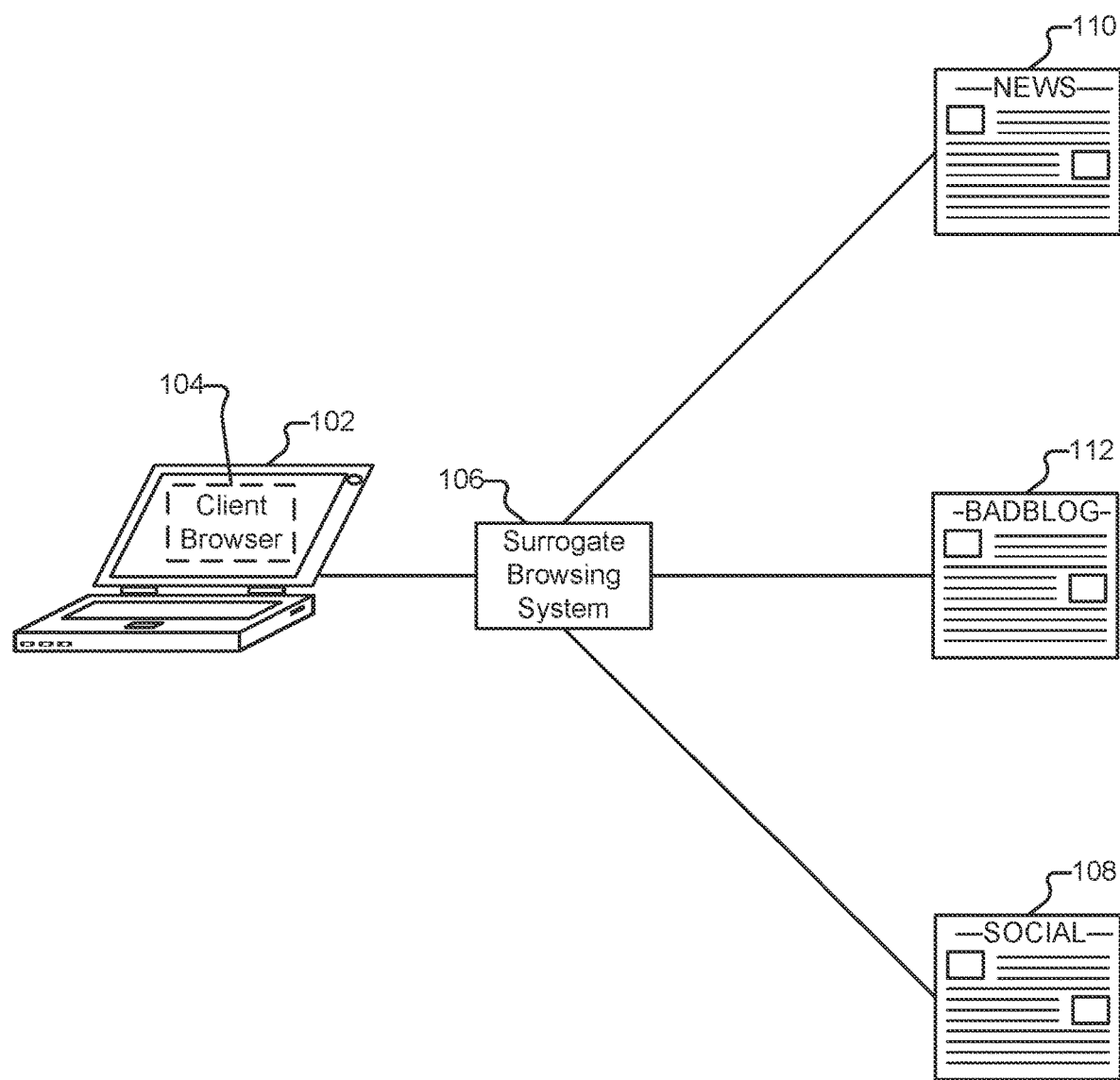
FIG. 1 illustrates an embodiment of an environment in which surrogate browsing services (also referred to herein as isolated browsing services) are provided.

FIG. 1 illustrates an embodiment of an environment in which surrogate browsing services (also referred to herein as isolated browsing services) are provided. In the example shown, client device 102 (e.g., a laptop computer) is executing a client browser application 104. Embodiments of the techniques described herein are applicable to a variety of client devices and browser applications. For example, desktop computers, tablet devices, smartphones, game consoles, and set top boxes are all examples of client devices. Client browser 104 can similarly be one of a variety of browsers, including: a legacy browser (e.g., that is no longer supported/maintained); a browser for a mobile device such as a phone or tablet; a modern browser that is not current on its patches/updates; and/or a modern browser whose patches are up-to-date.

Suppose a user of client 102 (hereinafter referred to as "Alice") has an account on social networking website 108. Via site 108, Alice learns about news articles that are of interest to her friends. For example, Alice's friend, Bob, might include in his profile on site 108 a link to a news article about a solar eclipse. The news article is located on news website 110. While website 110 is legitimate, suppose it has unfortunately been compromised and is perpetrating drive-by download attacks. If Alice were to visit website 110 directly using client browser 104, Alice's browser would quickly be compromised. If, instead, Alice used the services of surrogate browsing system 106, Alice's browser would be protected. As will be described in more detail below, in various embodiments, surrogate browsing system 106 provides protection to browsers such as browser 104 by obtaining and rendering content on behalf of users, and then transmitting a representation of that content on to the client browser.

The surrogate browser can perform all dynamic rendering of a page, including potentially dangerous JavaScript. As will be described in more detail below, in some embodiments, after the page has been rendered by the surrogate, a transcoding engine transcodes the page layout of the rendered page in the surrogate browser and sends it to the client in the form of layout updates, canonicalized Cascading Style Sheets (CSS), and/or canonicalized images or other resources. Third party JavaScript and/or plugins, and malformed images/CSS are not sent to the client. Users, such as Alice, can interact with the representations, such as by clicking on links—resulting in safe and enjoyable user experiences.

System 106 is illustrated as a single logical device in FIG. 1. As will be described in more detail below, in various embodiments, system 106 is a scalable, elastic architecture and can comprise several distributed components, including components provided by one or more third parties. Further, when system 106 is referred to herein as performing a task, such as transmitting or processing data, it is to be understood that a sub-component or multiple sub-components of system 106 (whether individually or in cooperation with third party components) may cooperate to perform that task. As one example, system 106 can comprise a single (or multiple) Amazon EC2 instances. Such instances can be geographically distributed—located at data centers around the world.

Figure 2A:
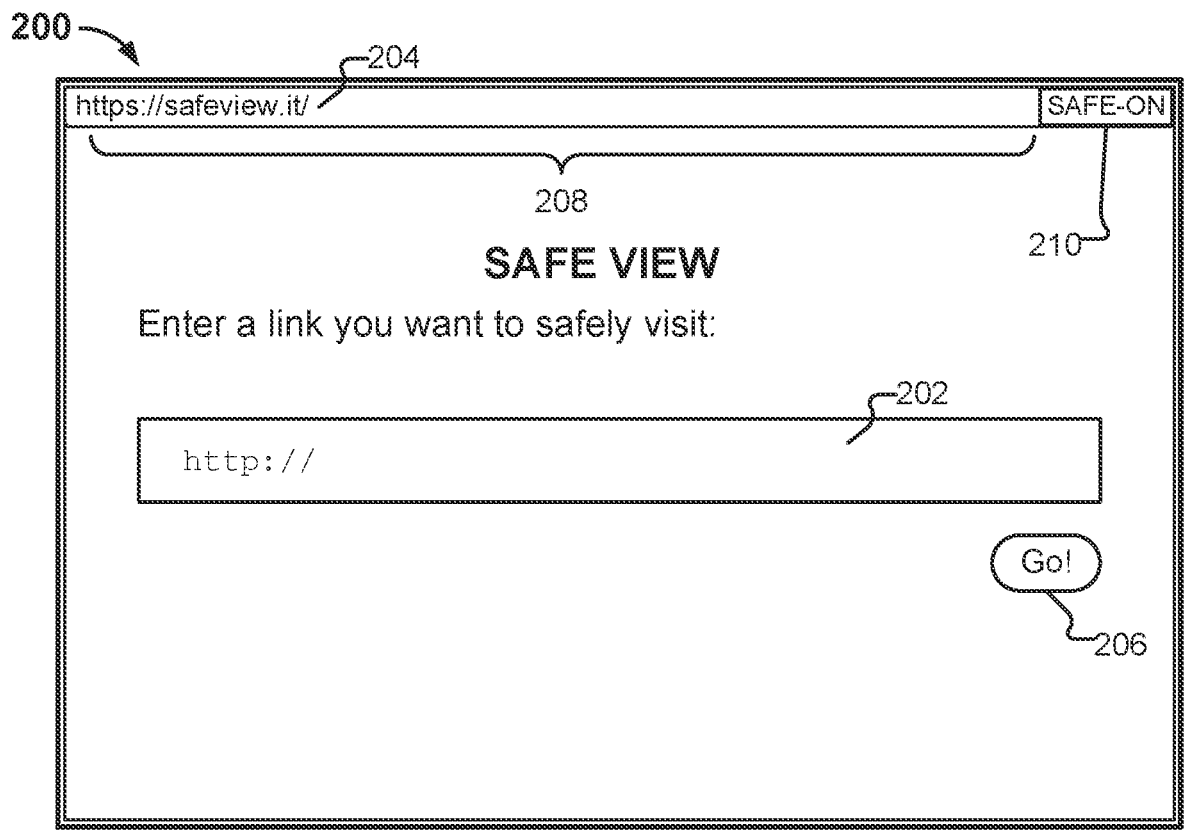
FIG. 2A illustrates an embodiment of an interface as rendered in a browser.

Depicted in FIG. 2A is one example way that Alice can avail herself of the surrogate browsing services of system 106. In particular, FIG. 2A illustrates an embodiment of an interface as rendered in a browser. As shown, Alice has navigated to page 204 using her browser 104. Interface 200 is a web page served by system 106. Alice enters the URL of the page she wishes to securely visit (e.g., http://examplenews.com/solareclipse.html) by typing the URL into box 202 and selecting button 206. The services of system 106 can also be accessed in a variety of other ways. For example:

Alice can manually prepend the URL of the page she wishes to securely visit (examplenews.com/solareclipse.html) with a URL associated with system 106 (e.g., https://safeview.it) in URL bar 208. An example of such a composite URL is depicted at 252 in FIG. 2B.

A browser plugin installed on client browser 104, and/or native functionality of client browser 104, as applicable, can be configured to cause Alice's request for site 110 to be directed through system 106. As one example, a toggle button 210 can be included in the browser that allows Alice to toggle whether all (or none) of her web browsing is routed through system 106. As another example, a context menu can be added so that when Alice right-clicks a link (or otherwise activates the context menu), she can select a "view this link safely" option that opens the link using the services of system 106. As yet another example, browser 104 can be configured so that whenever it is launched by Alice's email client (e.g., because Alice has clicked on a link in an email), browsing traffic is routed through system 106. As yet another example, Alice (or another appropriate entity) can specify a whitelist of sites for which the processing of system 106 is not needed/desired (e.g., Alice's banking website) and have all web browsing activity outside of sites included on the whitelist processed by system 106.

The services of system 106 can be integrated into site 108 in a variety of ways. For example, site 108 can be configured to display a "view this link safely" button next to links that are not included in a whitelist of sites (e.g., the top 200 Internet domains). The button can also be made available next to all links—not just those that appear on a whitelist.

System 106 can also provide a URL shortening service (e.g., to site 108) in which all URLs posted by users to site 108 (e.g., http://examplenews.com/solareclipse.html) are replaced with URLs that direct requests through system 106. An example of such a shortened URL is https://safeview.it/7x83dh37. In some embodiments, only some URLs posted to site 108 are shortened (or otherwise changed to system 106 links). For example, site 108 (or another appropriate entity) can maintain a whitelist of sites for which a user is allowed to directly access via links uploaded to site 108. For any other link appearing on site 108 (and/or for links that are determined to be suspicious), the URL shortening service is used. One example of a malicious site is site 112, a blog that hosts pictures of kittens in the hopes of attracting visitors to download malicious applications under the guise of such downloads being kitten-oriented screen savers.

Anti-phishing and other browsing protection software can be integrated with services provided by system 106. For example, instead of blocking a user's access to a suspicious site, or merely warning the user that the site she is about to visit could be malicious, attempts by a user to access suspicious pages can be routed through system 106. In that way, the user can both satisfy her desire to visit the suspicious site and avoid compromising her computer.

System 106 can also be configured to provide protection services by operating in an enterprise mode, described in more detail below. In some embodiments, when running in enterprise mode, system 106 is collocated with other infrastructure of the enterprise, such as by being on premise with the clients that use the system. In other embodiments, the system uses third party services, such as Amazon EC2.

Figure 2B:
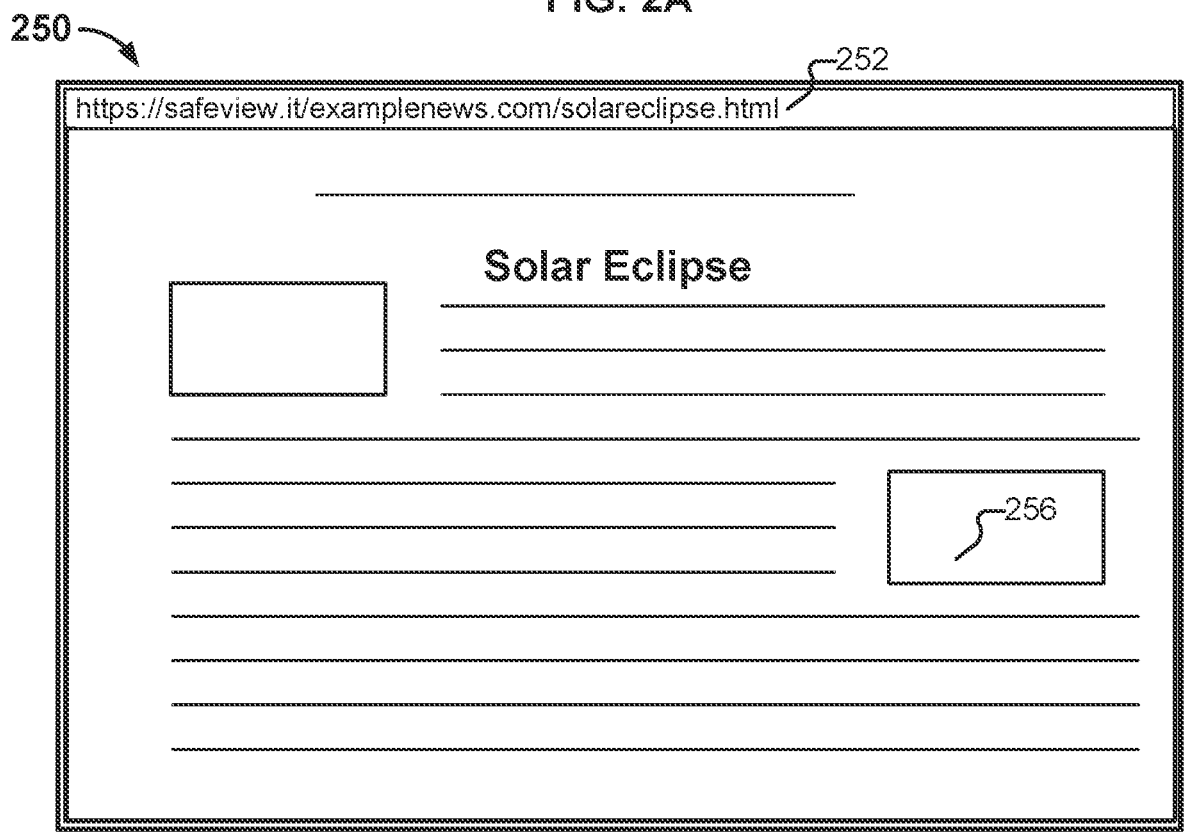
FIG. 2B illustrates an embodiment of an interface as rendered in a browser.

FIG. 2B depicts interface 200 after Alice has typed (or copy and pasted) the URL "examplenews.com/solareclipse.html" into box 202 and pressed button 206. In some embodiments, the content displayed in interface 250 appears, to Alice, to be identical to the content that would have been shown to her if she had visited the page "examplenews.com/solareclipse.html" directly with her browser. As will be described in more detail below, system 106 has fetched the content from site 110 on behalf of Alice, and has processed the received content to generate a representation of the content that is then provided by system 106 to client 102. Also, as will be described in more detail below, surrogate browsing system 106 can be configured in a variety of ways and use a variety of techniques to transform the content it receives (e.g., from site 110) prior to transmitting a representation of the content to client 102.

Figure 3:
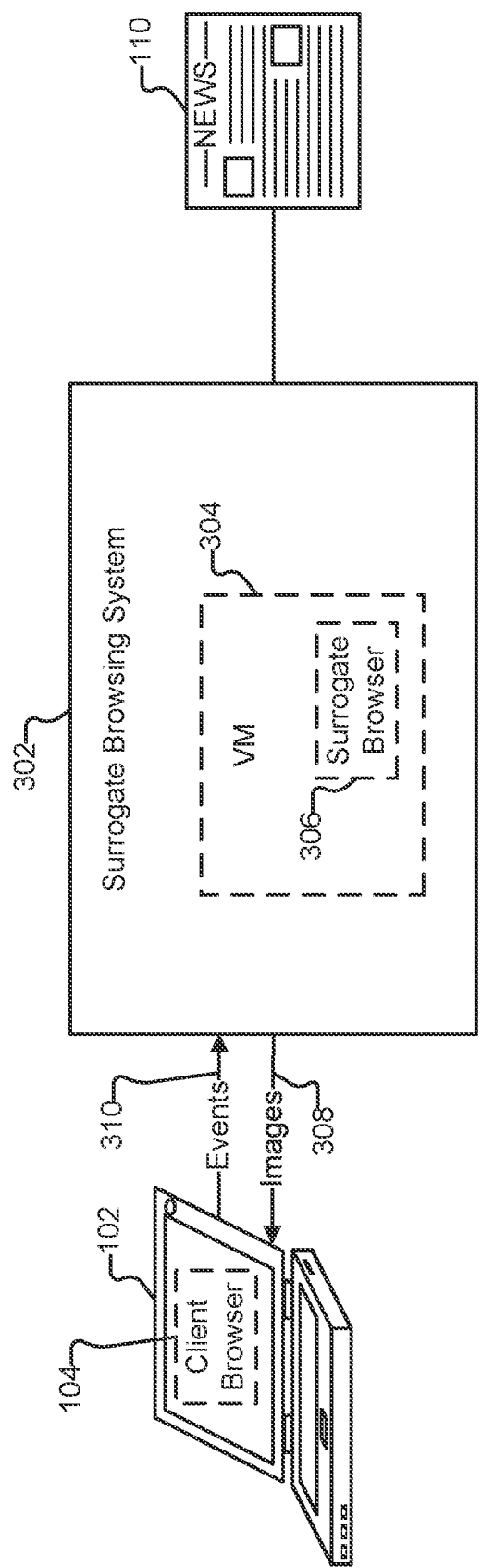
FIG. 3 illustrates an embodiment of a surrogate browsing system.

FIG. 3 illustrates an embodiment of a surrogate browsing system. Surrogate browsing system 302 is one embodiment of surrogate browsing system 106. When Alice connects to system 302, her client browser 104 receives JavaScript that facilitates communication with system 302 via the remote framebuffer (RFB) protocol. As one example, the JavaScript can implement a Virtual Network Computing (VNC) client.

Other graphical desktop sharing technologies can also be used in conjunction with the techniques described herein, as applicable.

In the example shown in FIG. 3, when Alice requests access to a page on site 110 (e.g., by clicking submit button 206), a virtual machine 304, in which a surrogate browser application 306 is executing, is made available to browser 104. An image of the page is sent by surrogate browsing system 302 to client 102 (308). In some embodiments, the image sent to Alice is transcoded so that, for example, an attacker cannot send malicious pixels to Alice. When Alice interacts with the image via her browser 104, her events, such as mouse clicks and keyboard presses, are observed and transmitted by the JavaScript executing on client 102 to virtual machine 304 (310). System 302 interprets the received events (e.g., by overlaying the position of the events on Alice's rendering of the page on top of the page as seen by system 302) and surrogate browser 306 takes the corresponding actions with respect to site 110, if applicable. For example, if Alice attempts to click a link on the page she is viewing, her click event is sent to system 302 and browser 306 replicates Alice's click on site 110. If Alice is randomly clicking in white space, in some embodiments, the event is not replicated to site 110. As browser 306's view of the page changes (e.g., a new page is displayed due to following a link), updated images are streamed to Alice's browser 104.

The surrogate browsing approach depicted in FIG. 3 will protect Alice's computer 102 against attacks, such as drive-by downloads and zero-day exploits, that may be present on site 110. Further, with respect to certain websites (e.g., ones with relatively simple layouts), Alice may be unable to distinguish between the experience of accessing the site directly with her browser, or accessing the site using surrogate browsing system 302. The approach shown in FIG. 3 can also be used to allow Alice to safely use certain types of browser plugins (on the surrogate browser) such as Flash. Interaction with some sites, however, using system 302, may be too slow or otherwise less enjoyable for Alice. Other surrogate browsing approaches can also be used, and in particular, will provide good performance even when used in conjunction with more sophisticated sites (e.g., sites with interactive games, and/or which require context such as the position of scroll bars, look of widgetry, and size of internal frames).

As will be described in conjunction with FIG. 4, one alternate surrogate browsing approach is to render a page in a surrogate browser and transcode the layout of the rendered page in a secure manner before sending it to the client browser. One example of such transcoding is to have a dynamic transcoder encode the Document Object Model (DOM) layout of the rendered page and send DOM updates that describe the DOM of the page using a DOM update command language to the thin client layer of the client browser. The dynamic transcoder can also transcode resources such as images and CSS files into sanitized, canonicalized versions for clients to download. In particular, the dynamic transcoding involves the use of two components—a DOM transcoder, and a resource transcoder for transcoding images and CSS. The output of both components passes through a checker proxy that validates the data against a security policy before sending it to the client. A command interpreter running in the client browser interprets the DOM update commands and updates the DOM in the client browser accordingly.

Figure 4:
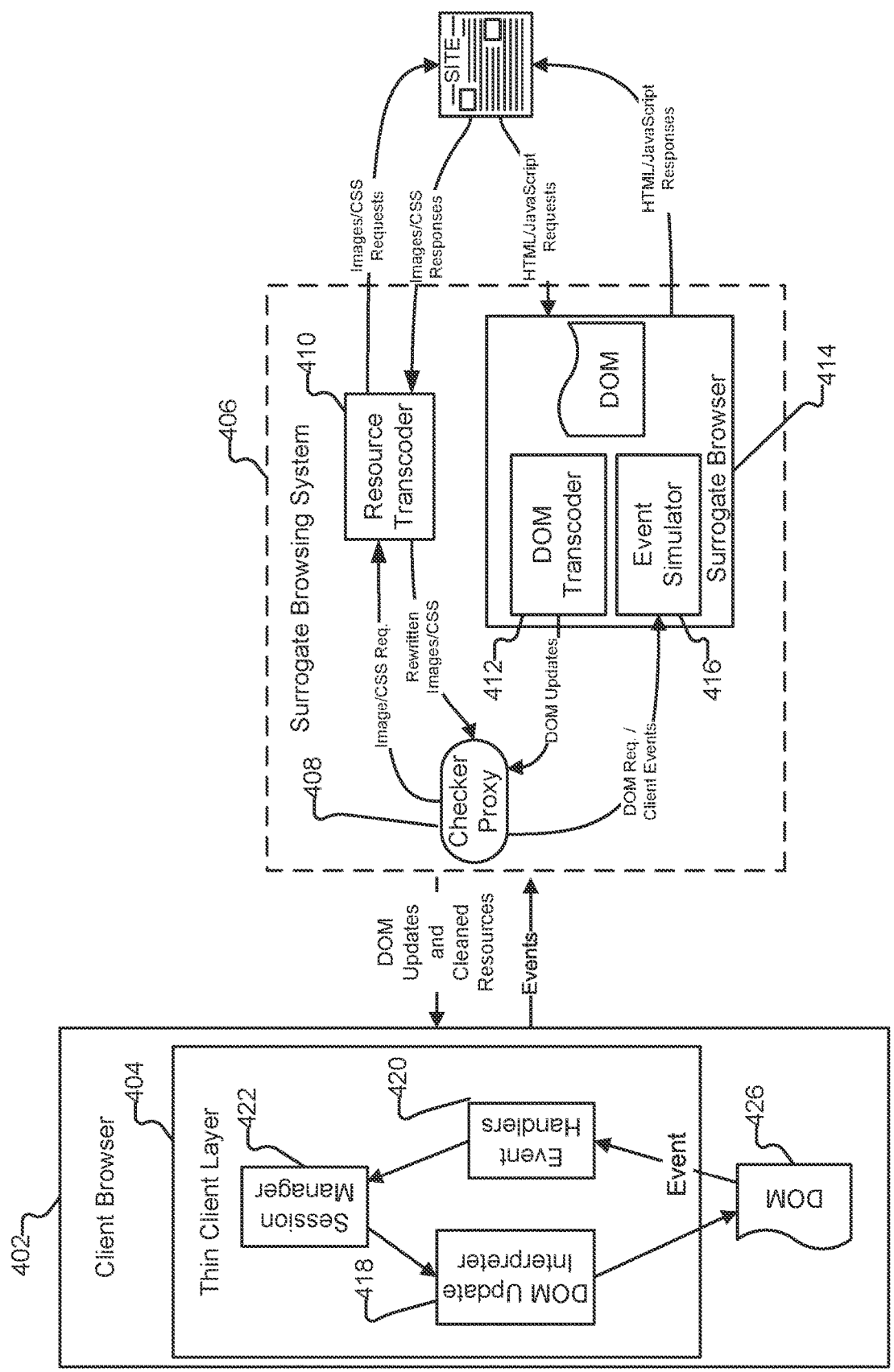
FIG. 4 illustrates an embodiment of a surrogate browsing system.

FIG. 4 illustrates an embodiment of a surrogate browsing system. Surrogate browsing system 406 is one embodiment of surrogate browsing system 106. Client browser 402 is one embodiment of client browser 104. As shown, an unmodified (i.e., stock) browser 402 is executing a thin client layer 404, which is discussed in more detail below. Among other components, system 406 includes a checker proxy 408, a resource transcoder 410, and a surrogate browser 414 that includes a DOM transcoder 412 and an event simulator 416. As explained above, system 406 can comprise scalable, elastic hardware, and can comprise several distributed components including ones provided by one or more third parties. In the example shown, system 406 uses the Amazon Elastic Compute Cloud (Amazon EC2) infrastructure.

When a client initiates a browsing session with system 406, system 406 sends a thin client layer 404 (e.g., signed JavaScript) to the client browser (e.g., 402) that decodes and interprets layout updates, images, and CSS from the surrogate browser. It also intercepts user events and forwards them to the surrogate browser. No client-side installation (e.g., of an agent) is needed. Maintenance is performed on the server-side (e.g., on system 106) and any needed updates can be pushed as new JavaScript to client 102. In some embodiments, thin client layer 404 is also configured to use the techniques described in conjunction with FIG. 3, where needed, such as if Alice navigates to a page that requires the use of a Flash plugin or includes the <canvas> tag.

Requests from client browser 402 for system 406 are received by a reverse proxy which routes the requests based on type. If the client is asking for a new page (e.g., because Alice has just clicked button 206), system 406 selects a new surrogate browser to provide surrogate browsing services to the client. In some embodiments, a load balancer is used to help determine which virtual machine should be assigned. A given virtual machine image can support many surrogate browsers. In turn, a given hardware node can support many virtual machines. If the request implicates an existing session (e.g., Alice has hit the "reload" button), the reverse proxy routes the handling of the request to the previously-used surrogate browser.

In some embodiments, one surrogate browser is assigned for a given client, per tab, per domain. Each surrogate browser is sandboxed to provide isolation between surrogate browsers (e.g., using a Linux Container). Thus, for example, if Alice has open two tabs in browser 402 (e.g., one to site 110 and one to site 112), two different surrogate browsers will provide services to her. If Alice navigates away from one of the sites (e.g., navigates from site 110 to site 108), the surrogate browser providing Alice services with respect to site 110 will go away, and a fresh surrogate browser will provide services with respect to site 108. Other configurations are also possible. For example, Alice could be assigned a single surrogate browser per session, a surrogate browser per tab (irrespective of which sites she visits in the tab), a surrogate browser per site (irrespective of the number of tabs she has open to that site), etc. Embodiments of individual components of the environment shown in FIG. 4 will now be described.

A. Surrogate Browsing System 406

1. Surrogate Browser 414

Surrogate browser 414 is a Webkit-based browser (or other appropriate browser) running inside a Linux container—a lightweight and disposable sandboxing environment. The surrogate browser renders requested pages and runs JavaScript code within the pages. It also contains an event simulator component 416 that applies user interaction events (e.g., 310) received from client 102.

2. DOM Transcoder 412

The surrogate browser also includes a DOM Transcoder component 412. As described in more detail below, client browser 402 handles DOM updates from surrogate browser 414. The surrogate browser intercepts all DOM mutation events and translates those events using the DOM transfer command language before transmitting them through checker proxy 408 to client browser 402. Surrogate browser 414 detects DOM updates by installing JavaScript DOM update handlers in the surrogate page. One way to do this is to customize Webkit to support all types of DOM mutation events and to generate the events during the initial construction of the DOM. When generating DOM commands to send to client 102, surrogate browser 414 first passes them through a whitelist that removes, among other things, all JavaScript. It also rewrites all URLs to point to through system 106. The <iframe> tag is treated specially: no source URL is sent to client 102. This allows thin client layer 404 to render content from multiple origins without violating a same-origin policy. Surrogate browser 414 enforces the same-origin policy, but handles all interactions and updates for the iframe as for a normal top-level document, with the exception that updates are directed to the top level page in the client browser. Since no JavaScript reaches client browser 402, and all external resources are passed through system 406, it is not possible for a site to convince client browser 402 to implicitly violate the same-origin policy without first compromising surrogate browser 414 and checker proxy 408.

3. Resource Transcoder 410

The techniques described herein can be used to allow a user, such as Alice, to view web pages that include such features as images and CSS, without being subject to compromise. In various embodiments, system 106 is configured to serve a canonicalized copy of such resources instead of the original ones (or, instead of preventing them from being displayed at all). In the example shown, the rewriting of images and CSS is performed by resource transcoder 410. In particular, surrogate browsing system 406 rewrites the URLs of external images and CSS to redirect client browser resource requests to resource transcoder 410, which then serves the client a cached and harmless copy of the resource. Surrogate browsing system 406 handles inline images and CSS by forwarding the inline resources to resource transcoder 410 and then substituting them with the ones returned by the transcoder.

As one example, transcoder 410 can transcode images by reading in the file from an input file descriptor and parsing the image from its original format. It then adds cryptographic random noise to the lower-order bits of the pixel data and rewrites the image to its original format, stripping unneeded metadata which can be used as attack vectors. Checker proxy 408, described in more detail below, can cryptographically verify that the noise was added before sending the image data to the client. Other media types can similarly be processed. For example, audio and video files can have noise randomly inserted to reduce the likelihood of an embedded attack payload. Other transformations can also be made and need not rely on the use of cryptographic functions. Modifications made by resource transcoder 410 are also referred to herein as inserted modification data.

4. Checker Proxy 408

Checker proxy 408 is configured to validate that the surrogate browser is generating DOM commands and resources as expected. In some embodiments, the checker proxy runs on a separate server from the surrogate browser(s). The checker proxy proxies all calls between client browser 402 and surrogate browser 414. In some embodiments, the checking is performed by making sure that all messages the surrogate browser sends to the client conform to the command language described below.

In some embodiments, the checker first verifies that the commands are all valid JSON. It then passes each individual command through a whitelist filter for that particular command. For example, the "DOM_add_element" command has a list of valid tags and attributes. Any tags and attributes not on that list cause checker proxy 408 to reject the command and terminate the connection between the surrogate and client browsers under the assumption that the surrogate browser will only send invalid commands if it has been compromised. In the case that the checker detects an invalid command or resource, the container for that surrogate browser is cleaned and restarted.

Checker proxy 408 also validates that all URLs it sees begin with the appropriate domain (e.g., safeview.it). This validation checks attributes against a blacklist of attributes that will contain URLs. Any such attribute is verified to begin with the safeview.it (or other appropriate) domain. If it does not, the checker assumes an attack, as above.

B. Thin Client Layer 404

The thin client layer (404) includes three logical components: a DOM update interpreter 418, client event input handler(s) 420, and a session manager 422.

1. DOM Update Interpreter 418

The DOM update interpreter 418 runs inside client browser 402 and applies incoming DOM updates to the client DOM (426) which are received when dynamic DOM transcoder 412 sends the layout of a page rendered in the surrogate cloud browser as a sequence of DOM updates to the client. The interpretation of these updates ensures that the client browser page shows the latest layout as rendered in the surrogate cloud browser. JavaScript supplies a standardized DOM manipulation application programming interface (API) which can be used to update the client DOM based on the commands system 406 sends to client 102.

In some embodiments, DOM updates are defined using an unambiguous command language serialized using JSON. The basic element in the language is a command, which is a list that represents a DOM update. The first element in the list describes the type of update to be applied; the remaining elements are parameters. For example, the following command inserts an element into the local DOM:

[DOM_add_element, type, attributes, unique_id, parent_id, sibling_id]

This command will try to insert an element with type "type" into the DOM, with respect to its parent (parent_id) and successor sibling (sibling_id). The interpreter will also set the _uid attribute to unique_id and will add the additional keys and values in attributes to the element. The other commands are similar to this example. Additional detail regarding the command language is provided below.

2. Event Handler(s) 420

Many modern web pages are interactive—user events (e.g., key presses or mouse clicks) influence the content of the web page. Event handler(s) 420 are configured to capture any events created by a user and to make them available (via the thin client layer) to the surrogate browser in a manner that is consistent with what JavaScript running in the surrogate browser page expects. In some embodiments, all events are captured by event handler 420. In other embodiments, only those events for which an event handler is registered are listened for and sent.

3. Session Manager 422

Session manager 422 handles three tasks: managing connections with surrogate browsers, such as browser 414, emulating browsing history and page navigation, and providing cookie support.

Regarding communications management: In some embodiments, the session manager uses Websockets (in browsers that support it) and falls back to long-polling otherwise. These technologies enable full-duplex communication between the client and surrogate browsers.

Regarding history and navigation: In some embodiments, system 406 employs DOM updates to provide the illusion that the user is visiting different pages—a DOM reset command clears the current DOM and makes way for DOM updates from the new page. System 406 can provide history and navigation functionality in a variety of ways. As one example, system 406 can instruct client browser 402 to modify its browser history after every navigation action. To ensure that cookie state persists across client browser sessions, system 406 mirrors surrogate cookies in the client, and employs a consistency protocol to keep the client and surrogate cookie jars synchronized. When the client browser initiates a new browsing session with system 406 and visits a domain, session manager 422 transmits the client's cookie jar to the surrogate for that domain only, and the surrogate in turn will install the cookies before loading the page.

C. Enterprise Mode

Figure 5:
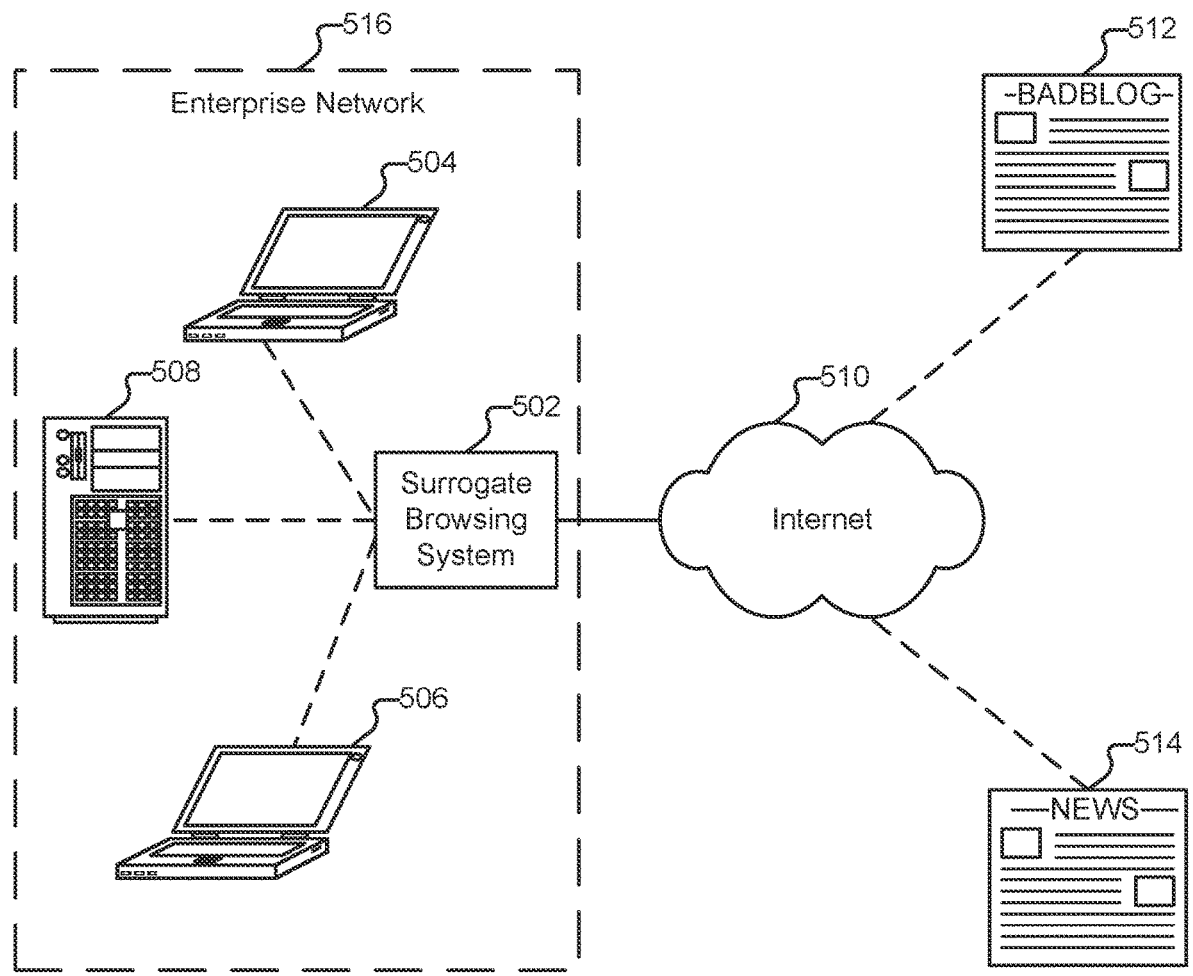
FIG. 5 illustrates an embodiment of a surrogate browsing system.

FIG. 5 illustrates an embodiment of a surrogate browsing system. In the example shown, an enterprise (e.g., the company for which a user, "Charlie," works) has deployed an embodiment of system 106 within its enterprise network 516 as an appliance. In particular, surrogate browsing system 502 is an embodiment of surrogate browsing system 106. Other entities can also use the technology described herein in enterprise mode, such as households (e.g., where a single surrogate browsing system sits at the perimeter of the home network). In the example of FIG. 5, surrogate browsing system 502 is owned by or otherwise under the control of the enterprise and comprises commodity server hardware running a server-class operating system. As one example, system 502 includes 32 GB of RAM, an 8-core AMD 4.4 GHz processor, and a Gigabit Ethernet adaptor attached to a Gigabit Ethernet network.

As shown, all web browsing traffic in network 516 destined for the Internet (510), such as traffic exchanged between client 504 and blog 512, automatically passes through surrogate browsing system 502. Other appliances may also process such traffic as applicable, such as firewall devices, and are not pictured. In some embodiments, the functionality of system 502 is incorporated into another such device, such as a firewall device.

The settings of system 502 are configurable. For example, instead of diverting all web browsing traffic through system 502, certain sites appearing on whitelists (e.g., site 514) may be accessible directly by clients 504-508, while attempts to browse suspicious sites, such as site 512, must be handled via system 502. As another example, an administrator can specify that only certain clients (e.g., client 504 and 506) must use the services of system 502, while client 508 does not. Other policies, such as whether users are alerted to the fact that their web browsing traffic is being processed by system 502 can also be configured. As yet another example, a logo, overlay, or other indicator (e.g., indicating that the browsing is being protected by system 502) can be included in the client browser.

D. Additional Information—Plugins and HTML5

Plugins such as Flash are the source of many security vulnerabilities in browsers. HTML5 includes tags such as the <canvas> tag, native audio and video support, WebGL, and other features. These tags either include new content streams that may expose vulnerabilities similar to those in images, or new JavaScript calls that must run on the client.

As mentioned above, in some embodiments, such plugins are handled by surrogate browsing system 106 by using an unoptimized VNC approach to render the graphical content directly in the browser. Certain plugins can be optimized for, such as Flash support. So, for example, video can be handled similarly to images—by transcoding the video signal and adding noise to reduce the risk of attack, and then passing the video through to our own video player, such as by using the <video> tag.

E. Additional Information—Command Language Embodiment

In some embodiments, the thin client layer uses only a small subset of the JavaScript DOM API in order to limit the attack surface. For example, the client can be configured to accept twenty commands, which together call only nine DOM API functions. The client JavaScript does not contain any other API calls, and as such is not vulnerable to these attack vectors. This is in comparison to the more than thirty DOM API calls which typical modern browsers support. The command language does not permit regular expressions.

Because all input to the client passes through checker proxy 408's whitelist, each function is called only with canonical arguments. The command language can only produce DOM trees, and it guarantees that all nodes will be unique and live. It achieves these properties by never permitting the attacker from holding a direct reference to a DOM node and by not permitting nodes to be copied or moved. All references are done through names that look up the relevant node in a dictionary. If a node needs to be moved, a new node is generated with the same attributes, and the old node is deleted. This removes two possible attack vectors: it is not possible to create circular graph structures, and deleted nodes cannot be referenced. The following is an example of a specification of a DOM command language:

The basic element in the DOM command language is a command, which is a list that represents a single DOM update. The first element in the list describes the type of update to be applied and the remaining elements are parameters. The checker proxy and the thin client layer recognize only a predefined number of command types.

TABLE 1

Part of the DOM command language specification. Unique_id and frame_id are attributes that maintain the mapping between the client and remote DOM nodes.

| Schema | Description |
| --- | --- |
| DOM_add_element, type, attributes, unique_id, parent_id, sibling_id, frame_id | Add a type element with attributes with respect to the parent and sibling. |
| DOM_remove_element, unique_id, frame_id | Remove an element. |
| DOM_modify_attribute, unique_id, attribute, value, frame_id | Set attribute value of an element to value. |
| DOM_add_cdata, type, unique_id, parent_id, value, frame_id | Add type character data value with respect to the parent. |
| DOM_change_cdata, unique_id, value, frame_id | Change character data to value. |

Table 1 includes some examples of the DOM command language specification. The number of parameters varies depending on the command type. Concrete examples are shown in Table 2.

DOM_add_element, "div," [["id," "example"], ["class," "mainCSS"]], "123121," "245564576," "12353123," "13443253456"

DOM_modify_attribute, "123121," "id," "changed," "13443253456"

DOM_remove_element, "123121," "13443253456"

Table 2: Example of DOM update sequence. A div element is added to the DOM. Then, its id attribute is changed. Finally, the element is removed from the DOM.

First, the div element is added to the DOM with respect to the parent node, the sibling node, and the frame. At the same time, its attributes id and class, defined as a list of attribute-value pairs, are updated as well. After the insertion, the element's id attribute is changed to value "changed." Finally, the element is removed from the DOM.

a) DOM_inject_script, "javascript:do_bad_things( )"
b) DOM_add_element, "script," [["type," "JavaScript"]], "123121," "245564576," "12353123," "13443253456"

Table 3: Example of unsuccessful attacks. In case a), the checker will not recognize a new command and classify it as a malicious activity. In case b), the checker will, using whitelists, observe that the attacker is trying to inject a script and classify it as an attack.

To compromise the client, the attacker needs to send a message that conforms to the DOM command language. The attacker may try to attack the thin client layer in a number of ways, for example: 1) to craft a command with a new type or 2) to use an existing command type but with bad parameters. In the first case, the attempt will fail since the checker proxy and the thin client layer only recognize a predefined set of command types. The second attack also fails in most cases, since sensitive parameters are whitelisted. Examples are shown in Table 3.

F. Example Process Used in Some Embodiments

Figure 6:
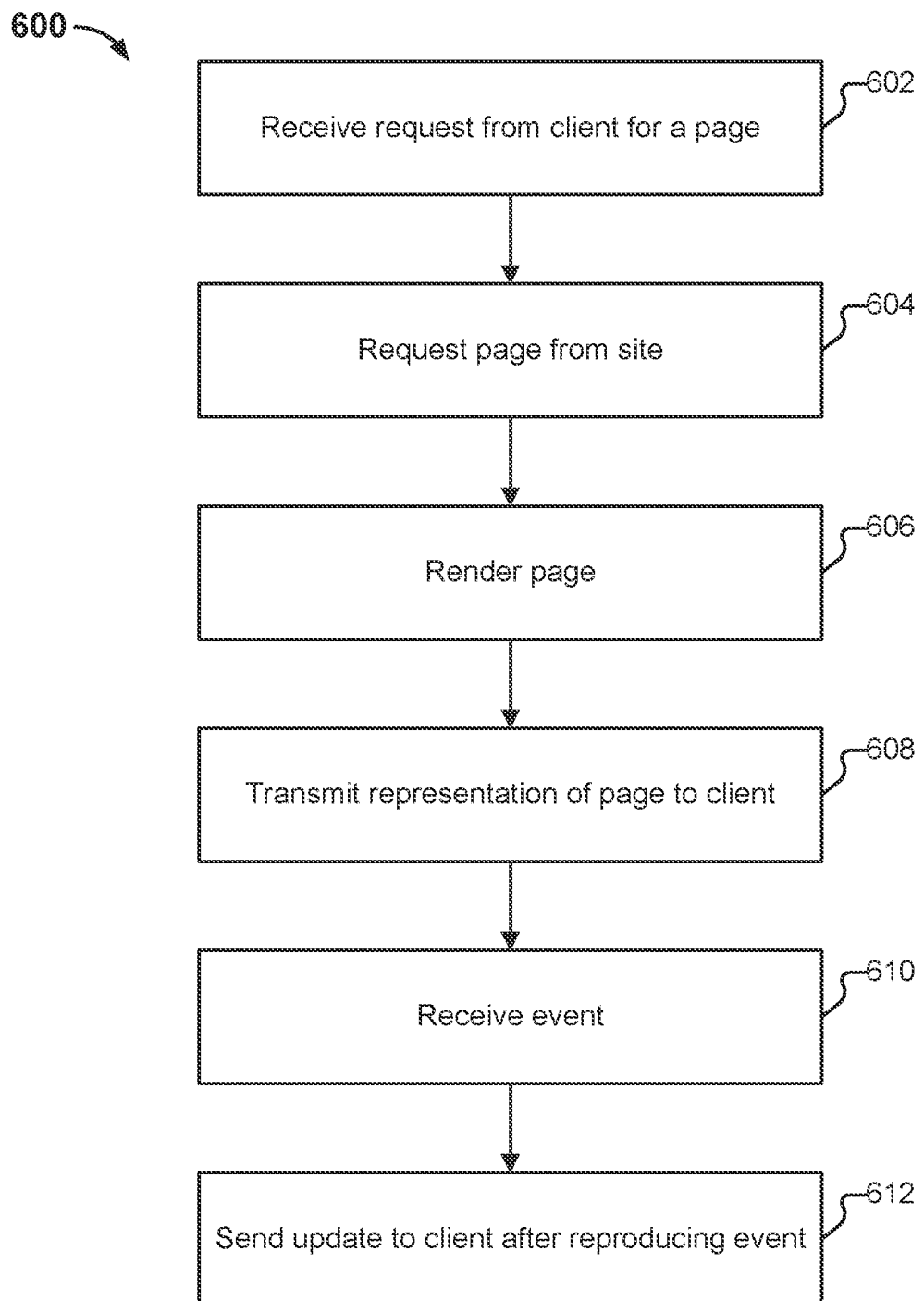
FIG. 6 illustrates an embodiment of a process for protecting a browsing session.

FIG. 6 illustrates an embodiment of a process for protecting a browsing session. In some embodiments, the process shown in FIG. 6 is performed by surrogate browsing system 106. Process 600 can also be performed by various embodiments of surrogate browsing system 106, such as system 302, system 406, and system 502, as applicable. Also, as applicable, various portions of process 600 can be repeated or omitted.

The process begins at 602 when a request from a client for a page is received. As one example, a request is received at 602 when Alice clicks on button 206 as shown in interface 200 of FIG. 2A. At 604, a page is requested from a site. As an example, system 106 requests the page, "http://example-news.com/solareclipse.html" from site 110 at 604. At 606, the requested page is rendered. As previously explained, the rendering is performed on surrogate browsing system 106.

At 608, a representation of the page is sent to the requesting client. As explained above, the page is transformed in some manner, rather than the exact web traffic being passed from the surrogate browser to the client. As one example, the representation is transmitted as an image (e.g., by system 302) at 608. As another example, the representation transmitted at 608 comprises DOM layout content.

At 610, an event is received. As one example, when Alice clicks on picture 256 of FIG. 2B, an event is sent by client 102 and received by surrogate browsing system 106 at 610. Finally, at 612, an update is sent to the client after reproducing the received event. As one example, the click event received at 610 is replicated by event simulator 416. Any resulting changes to the page as rendered in surrogate browser 414 are sent to client 102 as an update at 612—either as an updated image (e.g., in the case of system 302) or as a DOM layout update (e.g., in the case of system 406).

G. Example—Other Types of Pages

The techniques described herein can be used in conjunction with a variety of types of pages in addition to web pages (e.g., comprising HTML and resources such as images). Examples include Microsoft Word documents and documents in the Adobe Portable Document Format (PDF). As one example, an embodiment of surrogate browsing system 302 can be configured to transmit images of a Word document to client 102 (whether via browser 104 or a different application) and to receive events associated with a user's interactions with the Word document. As another example, PDF documents can be rendered in a surrogate viewer and an embodiment of system 302 can be configured to send images of the rendered PDF views to a client.

Embodiments of system 406 can similarly be configured to provide more sophisticated surrogate viewing/editing of documents, such as PDF documents. As one example, PDF documents can be rendered in a surrogate viewer, their internal structures obtained, and encoded prior to sending to a client (e.g., by an embodiment of system 406).

II. Additional Example Environment

Figure 7:
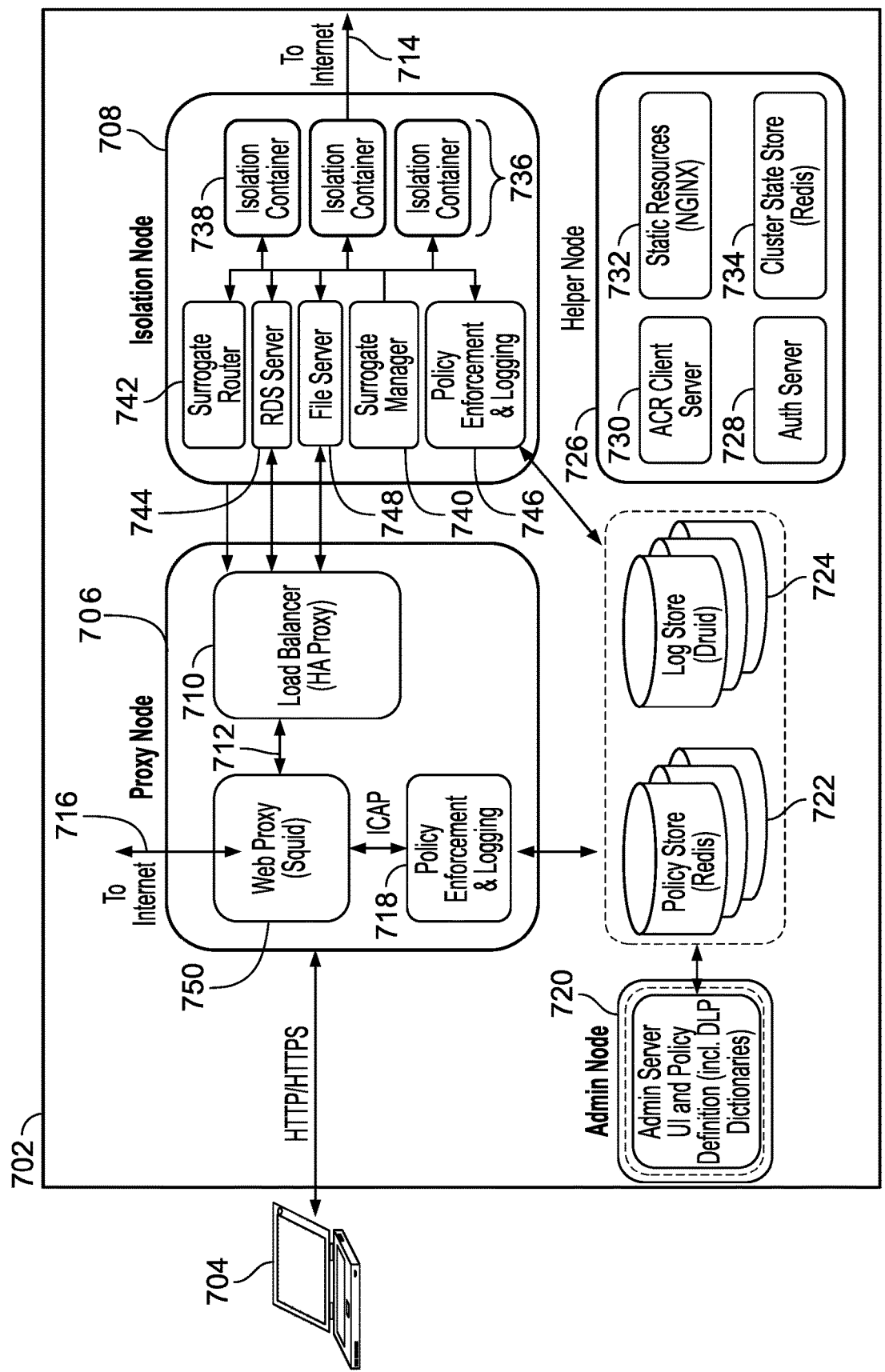
FIG. 7 illustrates an embodiment of an environment in which surrogate browsing services are provided.

FIG. 7 illustrates an embodiment of an environment in which surrogate browsing services are provided. Surrogate browsing system 702 is an embodiment of surrogate browsing system 106. In this example, surrogate browsing system 702 comprises a set of nodes (e.g., each running on Amazon EC2 instances, running a server class operating system such as Ubuntu). While a single node of each type is depicted in FIG. 7, in various embodiments, multiple instances of particular node types are used (e.g., for scalability/performance). As an example, each cluster of isolation, helper, and proxy nodes is configured in a separate AWS Auto Scale group to provide per-cluster elasticity as demand increases and decreases.

Proxy node 706 acts as a gateway to surrogate browsing system 702. Users of surrogate browsing system 702 (e.g., using client 704) enter surrogate browsing system 702 via proxy node 706. As applicable, proxy node 706 performs tasks such as authenticating the user. In some scenarios (e.g., based on a policy applicable to client 704), all of a user's traffic is passed through an isolation node 708 (via load balancer 710). This is illustrated in part, via paths 712 and 714. In other scenarios, some traffic is passed through an isolation node 708, while other traffic is not (illustrated in part, via path 716). Even where the client's traffic is not passed through an isolation now, as applicable, policy enforcement (e.g., allow/block) and logging can still be provided by module 718 of proxy node 706. One way of implementing module 718 is by using node.js. In the environment shown in FIG. 7, policies (configurable, e.g., via administration node 720) are stored in policy store 722 and logs are stored in log store 724.

As applicable, proxy node 706 can be configured to provide data loss (or leak) prevention (DLP) services to traffic associated with client 704. This can be helpful, e.g., where client 704's traffic exits to the Internet via path 716, rather than through isolation node 708. More robust DLP services can be provided when client 704's traffic is processed through isolation node 708.

Helper node 726 generally provides supporting functionality to isolation node 708. For example, helper node 726 includes an authentication server 728 for authenticating users of surrogate browsing system 702. Further, when a client first connects to surrogate browsing system 702, Adaptive Client Rendering (ACR) client server 730 provides a copy of a thin client (stored as a static resource along with other static resources 732 such as company logos, boilerplate text, etc.) to the client browser to apply rendering/draw updated coming from the isolated browser and to relay user inputs to the isolated browser. The thin client is loaded by the client browser upon first request. Rather than return the original contents of a target page (e.g., example.com), the response instead contains the thin client's HTML that is independent of the actual content of the target page. An example of the thin client's HTML is as follows:

<!DOCTYPE html>
<html><body>
    <safeview-info build="2.60.0-36-1-g75968eb" session-info="base64(JSON(config))"></safeview-info>
    <script src='https://( . . . )/safeview-min.js?v=2.60.0-36-1-g75968eb' type='text/javascript'></script>
</body></html>

Finally, cluster state store 734 is responsible for maintaining/synchronizing external state (e.g., which isolation container 736 is currently assigned to a client).

Although pictured in FIG. 7 as having an isolation node 708, in various embodiments, a single proxy node (e.g., proxy node 706) makes connections to many isolation nodes, as handled by load balancer 710. A given isolation node (e.g., isolation node 708) in turn makes use of many isolation containers 736 of which isolation container 738 is an example. Each isolation container comprises multiple processes each running in a sandbox comprising a Chromium Browser Process, an isolated Chromium renderer process, an isolated Flash process, and an isolated resource rewriter. A dedicated Chromium renderer process runs for each browser tab, providing isolation between tabs.

The various components of isolation node 708 can be implemented using a variety of tools, such as a combination of python scripts, C++, and node.js. Surrogate router 742 steers incoming traffic, pairing requests (to pair a client with an isolation container), etc. to an appropriate isolation container (e.g., in consultation with cluster state store 734). Surrogate manager 740 manages the isolation containers in an isolation node (e.g., keeping track of which isolation containers are busy/available, growing/shrinking the pool of isolation nodes as needed, and communicating such information with cluster state store 734). Remote desktop server (RDS) server 744 is responsible for encoding VNC updates and sending them to a client's thin client. Similar to module 718, module 746 provides policy enforcement and logging services for isolation node 708.

Finally, file server 748 is responsible for handling files uploaded (and downloaded) by clients. As an example, suppose Alice is currently accessing (via a surrogate browsing session) a web page that supports file uploads. Alice initiates a file upload (e.g., by clicking on an upload button). The surrogate browser detects that the website has initiated a request for an upload and sends a file request message to the thin client. The thin client displays a file selection dialogue on the endpoint browser, Alice selects a file, the thin client receives a file handle, and the thin client facilitates a multi-part upload of the file to the surrogate browsing system (e.g., by posting the file into the surrogate browser). Upon completion of the upload, the surrogate browser uses a REST API to inform file server 748 that a file upload has completed, at which point file server 748 can perform one or more policy checks (e.g., based on the file type which can be determined based on file extension, an introspection tool such as magic, etc., as well as the website and website categorization that the file will be uploaded to) by calling module 746. The types of checks that can be performed are pluggable/configurable by an administrator (e.g., Alice's employer, ACME Bank). Examples of such checks include multi-vendor hash checks (e.g., to determine whether the file is known to be malicious), full file scans, file detonation sandboxing, DLP, etc. If the policy checks succeed (i.e., it is determined that uploading the file to the web page does not violate any policies), the surrogate browser uploads the file to the web page. If the policy checks fail, an appropriate action can be taken based on the policy (e.g., block, log, etc.). In addition to performing checks, other actions can be specified to be taken via a REST API. As an example, ACME Bank might have a requirement that all files uploaded or downloaded to surrogate browsing system 702 be archived. As another example, ACME Bank might have a watermarking tool that is configured to watermark all documents (PDF, PPT, DOC, etc.) that are uploaded to external sites. Such tool can be called via the REST API. As another example, ACME Bank might have a redaction tool that is configured to redact or otherwise modify certain types of information from documents prior to sending them to external sites.

A similar two-stage process is performed when Alice attempts to download a file from a web page (i.e., the file is transferred from the web page to the surrogate browsing system, applicable checks are performed, and the file is then transferred from the surrogate browsing system to Alice via the thin client if policy allows). In various embodiments, surrogate browsing system 702 provides additional functionality regarding file downloads. As one example, suppose Alice is attempting to download a ZIP file. Assuming the file passes any applicable checks, Alice can be presented by surrogate browsing system 702 (via the thin client) with an option of unzipping the ZIP file at the surrogate browsing system, and only downloading portions of its contents. As another example, instead of downloading a policy-checked PDF from the surrogate browsing system to her browser, Alice can be given the option of viewing the PDF (e.g., after conversion to HTML) at the surrogate browsing system, downloading a simplified PDF, etc. Further, while the functionality of file server 748 has been described in the context of file uploads/downloads via websites, the same infrastructure can be used for handling other types of file transmission, such as email attachments. Similarly, the policy enforcement described as being performed on files can also be performed on other kinds of input, such as user input. For example, if Alice attempts to paste credit card numbers from her clipboard to a site such as pastebin.com, that input can be checked first, and blocked, as applicable.

III. Pairing and Communication Channels

Figure 8:
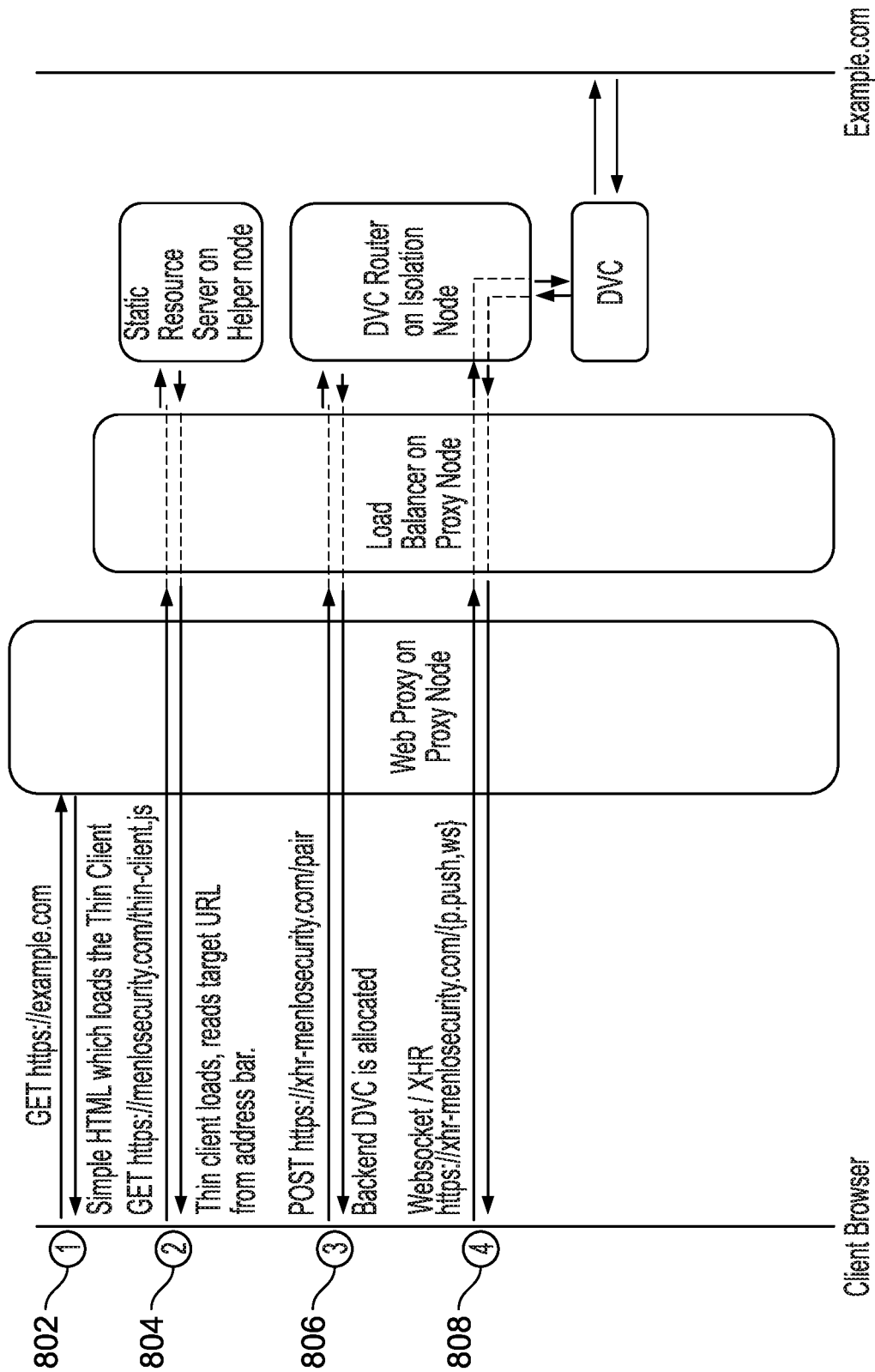
FIG. 8 is a flow diagram that illustrates the initialization of a surrogate browsing session.

FIG. 8 is a flow diagram that illustrates the initialization of a surrogate browsing session. First (802), the client browser requests a page. In the example shown in FIG. 8, the request is made to https://example.com. This is handled by proxy service 750 on proxy node 706. Proxy service 750 returns basic HTML that is independent of the site-to-be-visited. Content is not fetched from example.com in this step, but an SSL tunnel is established with example.com to allow for the mimicking of properties of the example.com certificate as part of the TLS inspection. The SSL connection to example.com is then terminated by proxy service 750.

Second (804), the HTML returned during 802 includes a tag to load JavaScript referred to herein as the "thin client." This JavaScript is loaded from helper node 726. It is the same for all visited pages and will be cached by the client browser after the first visit to any site. All SSL connections to system 702 are terminated by a load balancer.

Third (806), the thin client JavaScript starts executing in the client browser. The thin client consults the address bar to get the URL of the page the user wants to load and POSTs it to xhr-menlosecurity.com/pair. At this point, a Disposable Virtual Container (DVC), also referred to herein as an isolation container/isolated browser, is allocated for the user, if necessary. The DVC for the user is then instructed to create a tab and navigate it to example.com. The DVC starts loading example.com. At this point, no information from example.com has been sent to the client browser.

Finally (808), a communication channel with the DVC is established and information starts flowing bidirectionally to the client: rendering data flows from the DVC and user input (mouse, keyboard) flows to the DVC. This communication occurs over a WebSocket channel over TLS terminated by HAProxy on a master node if a Web Socket can be established. Otherwise (e.g., WebSocket is not supported by the client software), communication occurs via multiple XHR requests (over TLS). In various embodiments, the thin client mirrors only client browser viewport dimensions, OS, and locale settings to the isolation container. This prevents many client fingerprinting approaches (e.g., user agent, canvas, WebGL), and masks the client IP from the web servers being visited.

The thin client does not trust the isolated browser. A compromised backend browser cannot get the client to execute JavaScript or Flash. This can be achieved by having the thin client JavaScript disallow the creation of "script" nodes and "object" nodes that could host plugin content. In addition, the thin client can be loaded with a strict Content Security Policy (CSP). The CSP blocks any use of inline JavaScript and forces all resources to be loaded from menlosecurity.com hostnames.

In various embodiments, system 702 provides two types of remoting engines. The first, a DOM engine, mirrors the DOM tree and associated resources (e.g., CSS, images, fonts, SVG, etc.) from the isolated browser to the endpoint browser. By contrast, the Pixel engine sends a stream of Compositor Commits containing layers, their draw-ops, and property-trees from the isolated browser to the endpoint browser. The Pixel engine is a remote compositing rendering engine that offers a way to achieve low data-rate continuous recording. Which engine (e.g., DOM vs. Pixel) is used depends on policy: the mode can be pre-selected on a per-site and/or per-tenant basis. Alternatively, the engine can be automatically and dynamically selected based on the content of the page being selected: e.g., pages that use ShadowDOM or <canvas> can be automatically switched into Pixel mode. The ACR Protocol defines all instructions between the endpoint browser and isolation container. Examples of these instructions include:

From the server to the client:
DOM Mode: DOM manipulation instructions (create node, add attribute . . . )
Example: ["fupd",[1,4054,"DIV",[["class","es-search-group",null]], . . . ]]
Pixel Mode: Drawing commands (draw glyph, add transparency . . . ):
Example: DrawRect(0,0, 50, 50, paint_0),
DrawImage(img_0),
DefinePaint(paint_0, {color: blue; stroke-width: 2px}),
DefineImage(img_0, 'http://t.com/logo.png'),
DrawTextBlob([34,45,34,56,65], paint_1),
DefineGlyph(34, path_data)

From the client to the server:
Input events (mouse, keyboard, scroll, window size)
Navigation instructions (change page URL, create new tab)
Example: ["keyboard", 1, 2059, "keypress", 100, 100, "d", false, false, false]
Example: ["resize",674,903,1]

FIG. 9 illustrates different communication channels used in various embodiments. Channel 902 is used to relay user input (mouse, keyboard) to the DVC. Channel 904 is used to relay rendering information to the client browser. As mentioned above, if possible, a WebSocket is used. Otherwise, XHRs are used. Channel 906 is a dedicated channel for uploads. The original destination URL (example.com) is a URL parameter (page_url). Channel 908 is a dedicated channel for downloads. The original source of the file (example.com/file.bin) is a URL parameter (file_url) as well as in a response header (X-Msip-Download). Additional information is also present in the response headers: X-Msip-User has the user ID, X-Msip-Download-Source has the URL of the page from which the file is downloaded, and X-Msip-Download-Hash has the hash of the file content (SHA256). Finally, channel 910 is used to relay user input before being sent to the visited site. It uses a standard form POST to capture input to the page so far.

IV. Bandwidth Throttling

A. Introduction

Various scenarios exist where available bandwidth (e.g., for web-browsing) is limited and/or where it would be desirable to specify policies applicable to bandwidth usage. As a first example, governmental or other entities may make use of satellite or other resource constrained links. Further, such links may be metered and/or usage of other network connections (e.g., by academic institutions) may be subject to tiered or other consumption-based pricing schemes. The techniques described herein can also be used in a consumer environment (e.g., where an end user pays for bandwidth consumed, such as on a cellular device or for a metered home Internet connection).

One approach to minimizing bandwidth consumption is to apply a connection-wide bandwidth cap (e.g., restricting all session traffic to a particular network speed). A drawback of this approach is that it can be frustrating to end users whose browsing experience can be noticeably degraded. Existing network-level rate throttling mechanisms generally result in a poor user experience. One problem is that they treat all browser traffic with equal bandwidth priority when, in reality, not all content is of equal value in the user's eyes. For example, videos that are visible to the user (e.g., in a foreground tab) are more important, from a user experience perspective, than invisible videos (e.g., those in background tabs or those that have been scrolled out of view on a current page). To give another example, non-advertisement content is more important than advertisement content, yet network-based throttling treats advertisement and non-advertisement content alike, giving both an equal share of bandwidth. Further, content such as input boxes and menus are more important than background animations, yet updates of the latter can overwhelm a connection to preclude updates of the former.

An alternate approach, various embodiments of which are described herein, is to selectively throttle content at a tab, sub-tab, sub-page, or other appropriate granularity (where particular pieces of content that should receive greater bandwidth than others are identified during a browsing session). As an example, the playback bitrate of a video element on a page can be throttled down. As another example, a determination can be made as to which video elements should be played and which should not. The techniques described herein can be used both to control network consumption and (e.g., in a mobile device use scenario) CPU (and thus, as applicable, battery) consumption. The techniques described herein allow administrators to enforce per-device bandwidth limits on web browsing traffic without compromising user experience. The throttling techniques described herein also allow a thin client to control the flow of updates (e.g., Compositor Commits) to the endpoint that it runs on, which can be useful for regulating the CPU and power expended in processing such updates. As an example, if a thin client detects that a mouse cursor is active or focused on a certain element, that element can be given a greater portion of bandwidth than other elements appearing on the page.

Using techniques described herein, the meaning and user-value of page content (generally referred to herein as a "context") is taken into account to selectively throttle content, including at a sub-page granularity. Context-aware throttling such as is described herein differs from network rate limiting in that it (a) allows for an administrator to be selective about what portions of the page are throttled, as opposed to throttling the entire page/browser and consequently impacting the whole page/browser user experience, and (b) allows for the consideration of user context (e.g., whether the user is looking at the content or whether video is playing) in applying the throttling. Both of these benefits are made possible by the fact that the isolated browser has an understanding of what content is on the page (as browsers understand HTML), what that content is doing (e.g., is it actively playing a video), and what the user sees. In contrast, traditional rate limiters see only a stream of bytes and hence have no visibility page semantics or user perception of page content.

The following is an example comparison of an environment deploying remote browser isolation (e.g., using techniques described herein) with bandwidth throttling vs. one that has not:

First Environment (No Throttling):
User 1 watches video in a foreground tab at 1080p [73.5 MB]
User 2 listens to a music video in a background tab at 1080p [73.5 MB]
Total data transferred=147 MB
Second Environment (Throttling):
User 1 watches video in a foreground tab at 480p [25.2 MB]
User 2 listens to a music video in a background tab at 240p [9.6 MB]
Total data transferred=34.9 MB In an example embodiment, a given page is subdivided into units (Layers) and bandwidth priority is given to units based on their importance (e.g., impact on perceived user experience). This allows browsing to be kept within imposed resource limits (e.g., bandwidth and endpoint CPU) in a way that avoids degrading the user experience of the entire browsing session. As an example, videos can be played with high quality, while keyboard input remains responsive even as bandwidth constraints are adhered to. In various embodiments, techniques for avoiding video playback stalls on throttled video content are employed (described in more detail below).

The priority of a Layer is a system parameter (e.g., provided by an administrator policy) and a variety of configurations (policies) are possible. Some examples (which can be used individually or in combination) are as follows:

Priority is given to visible video Layers over invisible ones.
Priority is given to non-advertisement Layers over advertisement Layers.
Priority is given to interactive Layers (e.g., those with input boxes or the focus of mouse activity) over Layers with high-data rate background animations.
Priority is given to Layers whose updates do not consume excessive CPU when drawing them on the client.

Use of a Layer abstraction as a unit for data rate control decisions provides rich semantic information about the content being rendered and how the user perceives it, via its associated metadata such as Display Lists and video state. The Layer abstraction is also general in that implementers are free to define its granularity (i.e., define what content falls within a given layer). For instance, a Layer can be defined so that it always maps one-to-one with page DOM elements. The throttling techniques described herein need not make use of Layer abstraction, however. They can also be adapted to other remoting approaches such as DOM-level remoting.

B. Policy Configuration Examples

System 702 makes available a set of interfaces that allow an administrator to configure various options for implementing bandwidth throttling in conjunction with surrogate browsing services. Any such configurations can be stored in policy store 722 and enforced by an applicable policy enforcement module (e.g., module 746).

In various embodiments, once bandwidth throttling has been turned on for a particular user or group of users, certain defaults are assumed by system 702 unless overridden (e.g., allocating more bandwidth to non-advertisement content than advertisement content, and reducing bandwidth when the user is not actively engaging with the browser). The following are examples of customizations that an administrator can make to throttling policies.

FIG. 10 illustrates an example of an interface provided by system 702. After entering a username or user group (and picking the applicable dropdown), an administrator can click on region 1002 to specify who a given bandwidth throttling policy should be applicable to (and as applicable, conditions such as time-of-day restrictions). As shown in FIG. 10, one policy has been configured for a group of users (interns) and another policy has been configured for another group of users (managers and staff). A default rule (covering anyone who is not an intern, manager, or staff) is also specified. One benefit of the interface shown in FIG. 10 is that it allows for differentiation in throttling policies (e.g., based on a role of a user). As an example, the video resolution used when a member of the legal department views a video may be higher than when other users access the same video (irrespective of whether they have the same quotas or not, or have a quota set at all).

FIG. 11 illustrates an example of an interface provided by system 702. In region 1102, an administrator can specify whether or not a default daily bandwidth quota should be activated (e.g., for all users, for a group of users, or for a specific user) and what that quota should be (e.g., 1 GB). In region 1104, the administrator can specify at what quota usage percentage an action should be taken (e.g., 75%). In region 1106, the administrator can specify what action should be taken in the event the quota is exceeded (e.g., block any additional browsing for the day, warn the user, etc.).

Figure 12B:
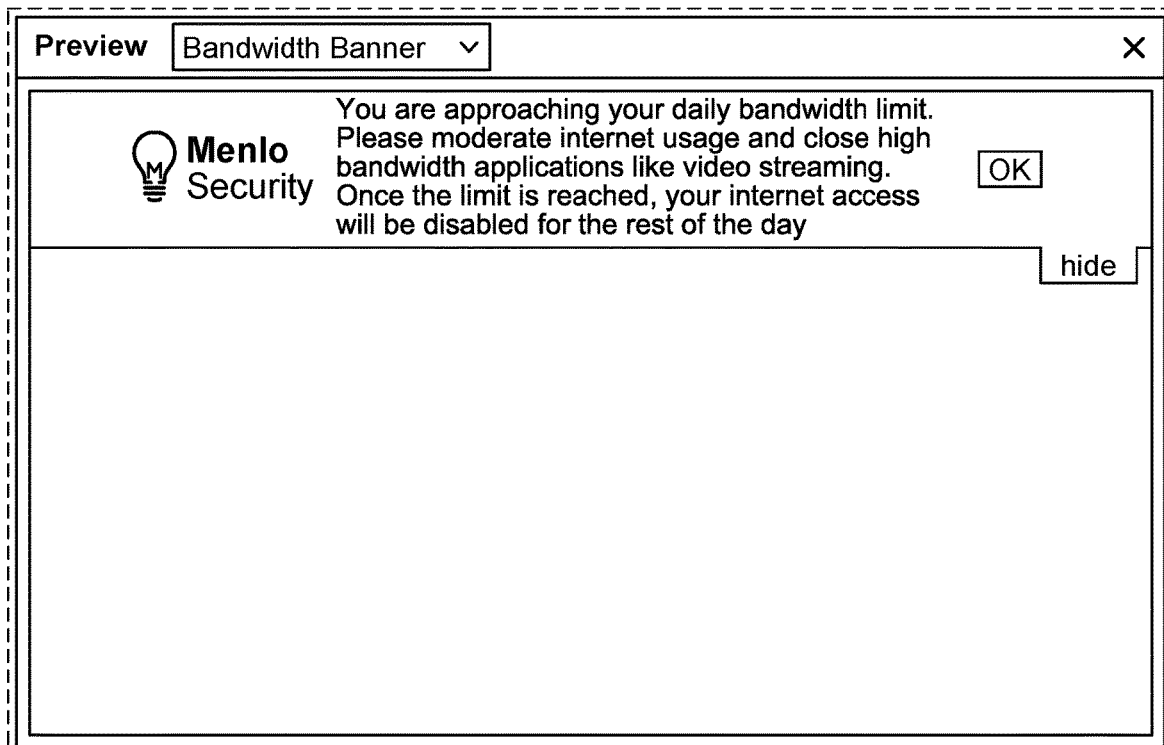
Figure 12C:
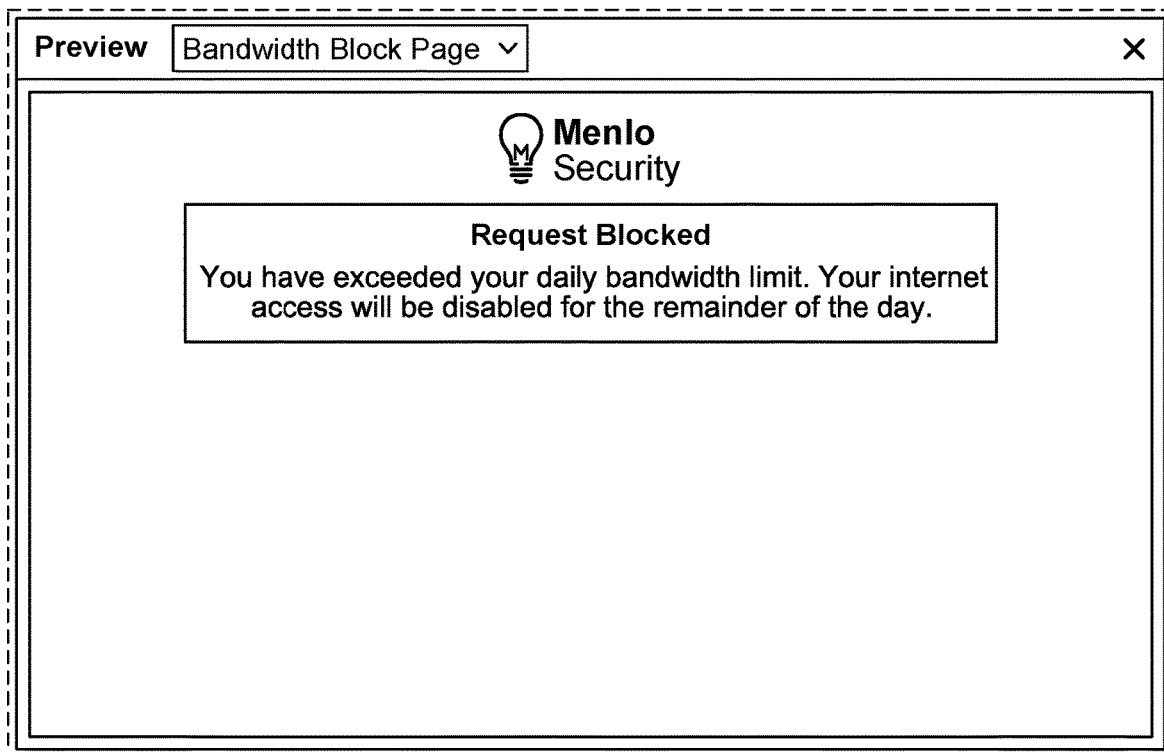

FIG. 12A illustrates an example of an interface provided by system 702. An administrator can use the interface shown in FIG. 12A to customize messaging such as messaging related to quotas. A preview of what a user will see, during a surrogate browsing session, as they approach their quota is displayed in interface 12B and a preview of what a user will see, during a surrogate browsing session, once they have exceeded their quota is displayed in interface 12C. These previews can be accessed by an administrator selecting the "Preview" button (1202) shown in FIG. 12A.

FIG. 13 illustrates an example of an interface provided by system 702. In region 1302, an administrator can specify various settings regarding throttling of video browsing content. Platform 702 can enforce video throttling against various types of video streaming sites in various ways (and additional detail on these approaches is provided in Section V. below). Certain video-hosting websites make available semantic mechanisms that allow a user to explicitly request content at a particular resolution (e.g., via a drop down dialog). System 702 can make use of those tools (if provided by a hosting site) to enforce particular throttling during surrogate browsing sessions. As one example, a JavaScript extension can be used by system 702 to programmatically interact with page content to (as applicable) simulate clicking on a drop down dialog, as well as to prevent the end user from picking a resolution in the drop down dialog that is higher than the allowed resolution (while allowing the user to pick a lower resolution if desired).

As illustrated in region 1304, an administrator has specified that a user actively watching YouTube content should receive that content at 720p, while YouTube content that is in a background tab should be limited to 480p. Where a given video streaming site does not provide tools for picking particular resolutions, bitrates can instead be used for throttling (as indicated in region 1306). In this scenario, bandwidth between the isolation container (of platform 702) and a given video site can be artificially slowed by platform 702, causing the video site to organically respond to the isolation container with a lowered quality video (which can then be passed on to an applicable thin client). Information provided by a browser can be used to determine whether a given network request corresponds to video content. In one scenario, video content is explicitly fetched by a video client, for which system 702 has straight visibility into. In another scenario, video content is fetched by JavaScript and the Media Streaming Extension is used to play the content. It may not be possible for system 702 to know that a particular JavaScript initiated request is for video content, however it is possible to know that a video is playing, at which point all JavaScript initiated requests can be throttled until the video stops playing.

A third approach that can be used is for the isolation container to advertise support for a reduced set of codecs (e.g., supporting only lower quality codecs) to the video hosting site, again causing the video hosting site to provide a reduced quality video to the isolation container.

Using the interface shown in FIG. 13, an administrator can configure whether or not bandwidth throttling should be applied to particular sites (e.g., Vimeo and YouTube), all sites, etc. Other types of configuration (and more fine grained controls over sites) are also possible. For example, a university could specify that video content generated by the university (e.g., hosted on YouTube from an official university account) are not subject to throttling, while all other video content appearing on YouTube is subject to throttling. Similarly, suppose the university serves YouTube videos from a page that the university hosts (e.g., course material embeds YouTube videos of content that is not authored by the university itself such as copies of public domain political speeches linked to in a political science syllabus). System 702 is able to determine that such content is fetched in the context of a course page, and allow those videos to be played at a higher resolution than when watched directly from youtube.com.

C. Example Process

Figure 14:
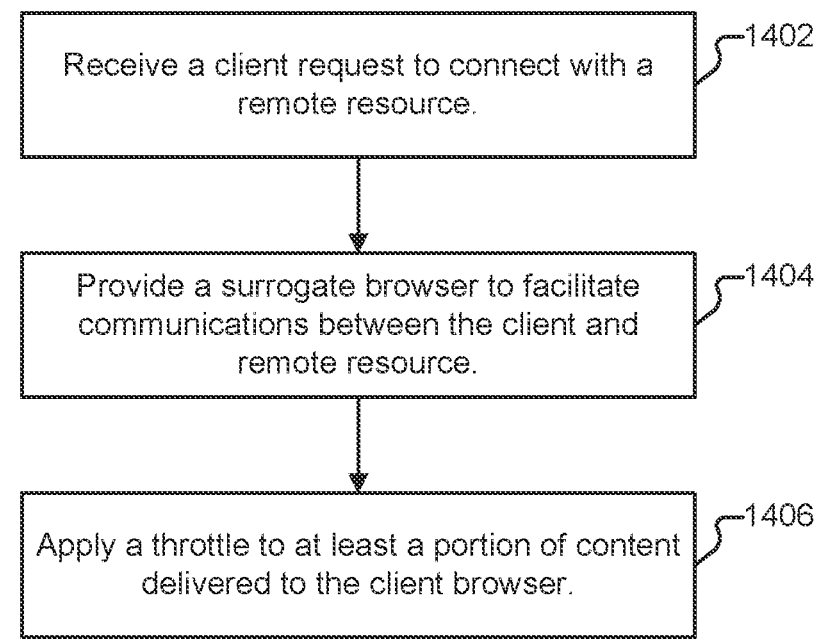
FIG. 14 illustrates an embodiment of a process for throttling bandwidth during a surrogate browsing session.

FIG. 14 illustrates an embodiment of a process for throttling bandwidth during a surrogate browsing session. In various embodiments, process 1400 is performed by system 702. The process begins at 1402 when a browser isolation system receives a request from a client browser executing on a client device to connect with a remote resource. As one example, at 1402, Bob uses the web browser on his laptop to connect to youtube.com (to watch "examplevideo"). At 1404, a surrogate browser is provided to facilitate communications between the client browser and the remote resource (e.g., as described variously above, such as in conjunction with FIG. 7). As explained above, system 702 determines a set of policies applicable to Bob's browsing session. Suppose Bob's surrogate browsing is subject to bandwidth throttling, and in particular, that he is subject to the video throttling settings shown in FIG. 13. When his surrogate browser (e.g., running in isolation container 736) accesses www.youtube.com/examplevideo on his behalf, it will request that the video be streamed (from youtube.com to platform 702) at 720p. Platform 702 will in turn provide the content to Bob's thin client at 720p. If the thin client running on his laptop detects that Bob has minimized the video, switched to another tab, etc., that information can be provided to platform 702 which can then instruct YouTube to instead stream a 480p copy of the video to platform 702. As mentioned above, time-of-day or other conditions can be specified as well, e.g., allowing Bob to watch content at 1080p or 4 k after work hours (but limiting him during the workday). Additional examples of throttling that can be performed at 1406 are provided in the following section.

V. Code Examples and Additional Detail

This section provides various code examples and additional detail regarding embodiments of aspects of a remote browser isolation (surrogate browsing) system.

A. Overview: A Remote Compositing Based RBI System

Remote Compositing is a technique for mirroring the visual content generated by one browser (server) onto another browser (endpoint), typically over a network. The core Remote Compositing approach can be extended to support Chromium-to-Any-Browser remoting, where the server is a modified Chromium-based browser and the endpoint can be running any WC3-compliant browser (with no modifications needed). One example use case is Remote Browser Isolation (RBI) for security in which Remote Compositing provides for seamless and secure remoting of browsing sessions to a remote browser in the cloud (Isolated Browser), thus offloading significant portions of attack surface such as HTML/CSS parsing and JavaScript execution onto the server browser.

Remote Compositing is on par with DOM Mirroring with regards to network and rendering efficiency. However, it goes beyond DOM Mirroring in accuracy and security, largely because it mirrors the Layer Tree as opposed to the DOM Tree. The Layer Tree is a low-level rendering data structure that is compact yet semantically rich enough to support GPU accelerated compositing and rasterization on the endpoint. Moreover, the Layer Tree can be translated and rendered using a minimal set of DOM elements that are available in all modern browsers, thus enhancing cross-browser rendering capability while minimizing the degree of exploitative control that malicious pages have on the endpoint browser's DOM.

Described herein are various Remote Compositing techniques that provide for practical and high performance Chromium-to-Any-Browser remoting. The techniques described herein also apply to alternative formulations of Remote Compositing: e.g., a variant that mirrors only Display Lists (drawing operations) produced by the Renderer and reconstructs a Layer Tree on the client.

Figure 15:
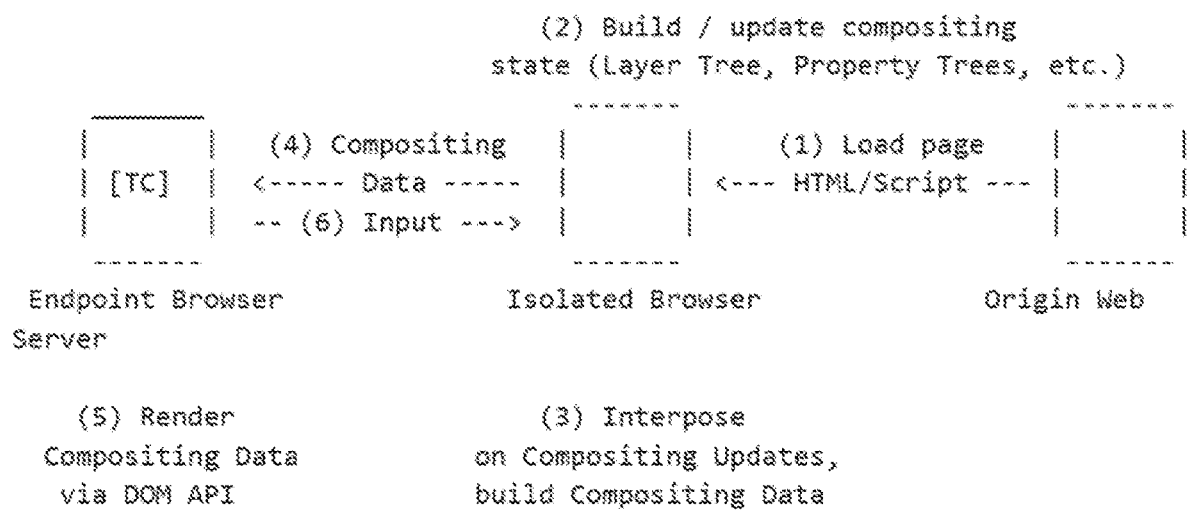
FIG. 15 illustrates an embodiment of a remote compositing system.

FIG. 15 illustrates an embodiment of a remote compositing system. In the example shown, the surrogate (isolated) browser loads and executes the page on the user's behalf (1), generating Compositing Updates (2) in the process. The system interposes on these Compositing Updates (3) and relays them over a network to a JavaScript Thin-Client (TC) running on the Endpoint Browser (4). The TC transforms Compositing Updates into user-visible pixels (5) using nothing beyond the DOM and scripting capabilities provided by a W3C-compliant Endpoint Browser. The TC also intercepts user inputs (keypresses, mouse & touch actions) made on the Endpoint Browser and relays them to the Isolated Browser (6) to support fully-interactive browsing.

1. Example Components

Isolated Browser (IB)

any web browser with a modern rendering pipeline: e.g., Chromium loads pages and associated resources (HTML, CSS, JavaScript, Flash) on behalf of user executes all active content (e.g., JavaScript, Flash)

generates Compositing Data (a.k.a., Commits) to be used by the Endpoint Browser;

Compositing Data comprises:

Layer Tree: a tree of logical Layers, each potentially referencing a Display List; alternative implementations may replace the Layer Tree with the equivalent Layer List and Property Trees combination Display List: a recursive list of drawing operations; the Thin Client translates these ops into DOM API calls that ultimately generate on-screen pixels potentially runs on a different host (e.g., cloud environment) than Endpoint Browser Endpoint Browser (EB)

any W3C-compliant web browser: e.g., Chrome, IE, Firefox, Mobile Safari runs on user's device (Desktop or Mobile)

runs a Thin-Client Compositor (TC)

a JavaScript web application (hence the name Thin Client) that runs on EB loaded via proxy-based redirect or injection when user navigates to a particular site, or via URL prepend: e.g., secure-browsing.com/example.org has a bi-directional communication channel with Isolated Browser updates its local world-view of what to render by:

receiving Compositing Data from the IB on the channel receiving local user-input actions (e.g., mouse wheel and hover actions)

independently of the IB, periodically renders its current world-view by:

(re)drawing individual layers (e.g., to effect image animation)

repositioning and re-compositing Layers (e.g., to effect scrolling)

inducing browser to generate pixels for the latest worldview uses nothing more than the standard JavaScript/DOM API to render content no plugins, no extensions, no custom browser 2. Example Flow (1) User loads or navigates to a page for Secure Browsing by:

entering URL that explicitly points to a Secure Browsing Service (e.g., safeview.it/example.com) into the Endpoint Browser's URL Bar OR by leveraging an intermediate rewriting proxy to redirect an HTTP request (e.g., via URL rewriting) to the Secure Browsing Service (2) Endpoint Browser receives TC JavaScript from Secure Browsing Service, and executes it (3) TC couples with an Isolated Browser from a pool of Isolated Browsers provided by Secure Browsing Service and instructs Isolated Browser to load the page (4) Isolated Browser loads target page and associated resources from the origin server (example.com)

(5) Isolated Browser generates rendering data by transforming web content (HTML/CSS/JavaScript) to a Layer Treeˆ (a.k.a. lifecycle update)

(6) Isolated Browser interposes on Layer Tree generation, serializes it and sends it to the TC in encoded form (e.g., binary encoding)

(7) TC creates a DOM representation from received Layer Tree and activates it, thus inducing Endpoint Browser to render content (8) Go back to step 5 until the user navigates away from the page. Upon navigation, go back to step 4.

Alternate implementations of Remote Compositing exist. The approach remains applicable, e.g., if the endpoint can reconstruct Layers and Display Lists from the information provided. The Display List rendering techniques herein apply even if there is only one Layer for the whole page.

3. Common Component Specification

The following modules are used by both the Isolated Browser and Endpoint Browser components in various embodiments.

```
module<standard> Common::Compositing {
    # A tree of Layer objects. Encapsulates all visual state of the Isolated
    # Browser. On the Isolated Browser, it is built and updated by the
    # Compositor module. On the Endpoint Browser, it is deserialized and
    # reconstructed by the Thin Client. Rendering the tree, termed
    # "Compositing", is defined as drawing each layer on to an output device
    # in a pre-order traversal of the tree.
    class LayerTree:
        # Reference to the root Layer in the tree.
        prop root: Layer
        # Returns an ordered list of Layers that corresponds to a pre-order
        # traversal of this Layer Tree.
        func preOrderList( ) -> List<Layer>
            traversal = [ ]
            stack = [root]
            while not stack.empty( ):
```

```
            layer = stack.pop( )
            traversal.push(layer)
            for child_layer in layer.children.reverse( ):
                stack.push(child_layer)
        return traversal
    func getLayerById(target_id : int) -> (Layer | None)
        for layer in self.preOrderList( ):
            if layer.id == target_id:
                return layer
        return None
# Encapsulates video player state. This is state typically obtained from
# Renderer's implementation of HTMLVideoElement.
class VideoState:
    # A queue of video frame chunks awaiting serialization to the TC.
    typedef Array<uint8> as FrameChunk
    chunks: Array<FrameChunk>
    ## Common video players properties chosen to demonstrate the concept of
    # JavaScript-driven player changes (e.g., volume control). This is not
    # exhaustive
    # True iff sound is muted. This can be altered by JavaScript.
    prop muted: bool
    ## End common video properties
enum LayerType:
    # Scrolls and/or clips descendant Layers.
    kScrollClipLayer = 0
    # Describes visual content as specified by a DisplayList (recursive list
    # of drawing commands).
    kPictureLayer,
    # A layer dedicated to showing the current frame of a single video.
    kVideoLayer
# Compositing or blend mode operation to be applied when compositing
# layer. An implementation will likely support additional blend modes.
enum BlendMode:
    kSrcOver = 0,
    kDstOver = 1
class Layer:
    ### Base properties for all layer types
    prop type : LayerType
    # This Layer's unique identifier; always >= 0.
    prop id : int
    # Reference to parent layer, or None if this is the root layer.
    prop parent : (Layer | None)
    # List of child Layers; may be empty.
    prop children : List<Layer>
    # True iff Layer is new or was modified. Set by the Renderer.
    # Supports efficient serialization of layer tree updates for network
    # efficiency.
    prop is_dirty : bool;
    # Layer's bounding rectangle in the Layer's own coordinate space.
    prop bounds : Rect
    # 3D projection matrix that determines how the Layer will be projected
    # on to the Layer's parent; the viewport transformation matrix for a
    # Layer is the concatenation of transform matrices in the
    # Layer's ancestor path.
    prop transform : Matrix3D
    # Blend mode operation to be applied when compositing this layer.
    prop blend_mode : BlendMode
    # The index of this Layer in a pre-order traversal of the LayerTree to
which
    # this Layer is attached; this is primarily used to determine if one
    # Layer paints on top of another Layer in order to calculate occlusion.
    prop pre_order_index : int
    # Defined only for PictureLayer.
    prop display_list : (DisplayList | None)
    # Defined only for VideoLayer.
    prop video_state : (VideoState | None)
    # A reference to the corresponding element in the LayerTreeDOM; set in
    # the process of building the LayerTreeDOM.
    prop element : (HTMLElement | None)
    # Specific to kPictureLayer types. The rastered output of a picture
    # layer is subdivided into a set of tiles, each of which may raster its
    # portion of the layer's display-list in a different way.
    prop tiling_set : RasterTileMap
    # Returns the RenderFrame that hosts this Layer.
    func<standard> getRenderFrame( ) -> RenderFrame
}
```

The following are components related to drawing operations.

```
module<standard> Common::Drawing {
    # An example minimal set of drawops to aid in exposition. Richer
    # sets can also be used.
    enum DrawOpType:
        kSave = 0,
        kRestore,
        kClip,
        kDrawPath,
        kDrawText,
        kDrawImage,
        kDrawDisplayList
    class DrawOp:
        prop type : DrawOpType
        # The bounds of this draw op in the local coordinate space.
        # Some draw ops, such as kSave/kRestore, do not have any
bounds.
        prop bounds : Rect | None
        func DrawOp(_type : DrawOpType) -> None:
            type = _type
    class SaveOp inherits DrawOp:
        func SaveOp( ) -> None:
            DrawOp(kSave)
    class RestoreOp inherits DrawOp:
        func RestoreOp( ) -> None:
            DrawOp(kRestore)
    class ClipOp inherits DrawOp:
        prop rect : Rect
        func ClipOp( ) -> None:
            DrawOp(kClip)
    class DrawPathOp inherits DrawOp:
        prop path : Path2D
        func DrawPathOp( ) -> None:
            DrawOp(kDrawPath)
    class DrawTextOp inherits DrawOp:
        # The text to be drawn.
        prop utf8_array : string
        # Position of each glyph on x axis.
        prop pos_array : Array<float>
        func DrawTextOp( ) -> None:
            DrawOp(kDrawText)
    class DrawImageOp inherits DrawOp:
        prop image : Image
        func DrawImageOp( ) -> None:
            DrawOp(kDrawImage)
    # Describes a sub-drawing.
    class DrawDisplayListOp inherits DrawOp
        prop display_list : DisplayList
        func DrawDisplayListOp( ) -> None:
            DrawOp(kDrawDisplayList)
```

A Display List comprises an ordered sequence of primitive drawing operations: e.g., "draw a rectangle with width w and height h at position x,y", "draw a path beginning at position x,y", and so on. The Display List specification given here is rudimentary in that it supports only a few draw-ops; real-world implementations, such as the open-source Skia drawing library, offer a richer set of draw ops.

The display-list representation offers several benefits:

compact, resolution-independent size suitable for efficient network transfer can be rastered at arbitrary scale while remaining sharp (a hallmark of all vector rendering techniques)

decouples content-to-be-drawn from how-it-is-drawn (i.e., rasterization)

multiple rasterization targets (Canvas, WebGL, DOM, etc.)

can be analyzed to efficiently answer "what will it draw?" questions—useful to achieve Adaptive Rasterization can piggyback DOM and CSS level semantics and properties of element that corresponds to the DisplayList

```
class DisplayList:
    # A list of drawing operations.
    prop draw_ops : List<DrawOp>
    # Returns true iff content drawn within |query_rect| entirely
    # consists of a single color: e.g., all white or all blue. This is a
    # conservative estimation; more precise implementations are
possible.
    func isSolidColor(query_rect: Rect) -> bool
        for op in display_list.draw_ops:
            if op.type == kDrawPath || op.type == kDrawText:
                return false # assume path is non-solid
            else if op.type == kDrawImage:
                return false # assume image is non-solid
            else if op.type == kDrawDisplayList:
                if not op.display_list.analyzeOps(query_rect):
                    return false
        return true
    # Returns the number of draw operations in this display list,
    # including the counts of those in sub-display lists.
    func getOpCount( ) -> int
        count = 0
        for op in display_list.draw_ops:
            if op.type == kDrawDisplayList:
                return count + op.display_list.getOpCount( )
            else:
                count += 1
        return count
}
```

A variety of tile types are possible, each with benefits and drawbacks that depend on the DisplayList (i.e., content) being rastered as well as the browser environment (e.g., does it support GPU accelerated rasterization?). The system dynamically selects the most efficient tile type for the workload and browser at hand. To ease presentation, a few key types are fully-specified:

module<NN> EndpointBrowser::ThinClient::Tiling {
    enum TileType:
    # Backed by a DOM tree (tree of DOM elements): this tile type can raster
    # arbitrary Display Lists. Example benefits of rastering to DOM include: (a) DOM
    # rasterization is heavily optimized in modern browsers (GPU-accelerated, fast,
    # low RAM usage), and (b) DOM enables the browser, extensions, and third-party
    # programs to understand what's in the drawing: e.g., text and images in
    # particular. This semantic visibility enables browser native functionality such
    # as ADA-compliant assistive technologies (e.g., screen-readers), dictionary
    # extensions, and password managers to work out-of-the-box. However,
    # generating large DOM documents can incur non-trivial overhead, thus
    # potentially making this tile choice inappropriate for tiles
    # with lots of objects that change/animate frequently. A fine-granularity
    # Display List delta algorithm can be used to avoid re-generating the
    # entire DOM tree; only the changed portions of the tree need be updated. kDOM=0,
    # Backed by an HTMLCanvasElement with 2D Context; this can be fast for
    # animated content but not all browser canvas implementations are
    # efficient. e.g., the Chrome browser is known to consume excessive
    # amounts of CPU and/or GPU RAM. The canvas API calls themselves incur

```
# overhead (due to argument validation) that make it
  expensive to invoke
# frequently, as would be needed when drawing pages
  with lots of text. kCanvas2D,
# The WebGL type enables direct control of the GPU,
  bypassing the
# browser's potentially inefficient Canvas implementa-
  tion. However,
# hardware-accelerated WebGL is not supported in all
  environments (e.g.,
# VDI environments, older machines without GPU, etc.).
  Moreover, most
# browsers limit the number of concurrent WebGL con-
  text in use. Also,
# WebAssembly, a relatively new capability, may be
  required
# to achieve WebGL rasterization's full potential.
  kWebGL
The Tile's abstract definition: a rectangular region that is
backed by a DOM element.
  class RasterTile:
  prop element:HTMLElement
  prop rect:Rect
  func RasterTile(_rect:Rect, _element:HTMLElement)→
    None
    rect=_rect
    element=element
    # Position and size the tile at its intended location.
    element.style.left=rect.x( )+'px'
    element.style.top=rect.y( )+'px'
    element.style.width=rect.width( )+'px'
    element.style.height=rect.height( )+'px'
  func getElement( )→HTMLElement
    return element
# Abstract function that is implemented in derived classes.
  virtual func raster(display_list:DisplayList)→None
class DOMTile inherits RasterTile:
  # Represents the <div> that backs the entire tile.
  prop tile_root:HTMLDivElement;
  # A place to store SVG objects that will be referenced by
    <div> nodes.
  prop svg:HTMLSVGElement;
  # Resource definitions for SVG elements such as clipping
    paths. These are placed
  # in the SVG header of |tile_root|.
  prop defs:HTMLSVGDefsElement
  # Used to assign unique IDs to individual definitions.
  prop def_counter:int
  # Points to the current cursor location in the DOM tree.
  # This points to either the root <div> node, or a descen-
    dant <div> node.
  prop cursor:HTMLDivElement
  # Stack of save-restore locations. On Save we push the
    current cursor
  # location to this stack. On Restore, we pop the top-most
    cursor location
  # and move to it.
  clip_stack:List<HTMLDivElement>
  func DOMTile(_rect:Rect)→None
    RasterTile(_rect, tile_root)
    def_counter=0
    cursor=tile_root
    # Place all SVG objects at the beginning so that
      to-be-generated elements can
    # reference them.
    svg.appendChild(defs)
    cursor. appendChild(svg)
    # Be sure to draw in the tile's coordinate space, so
      that content at
    # (rect.x( ), rect.y( ) draws on the tile's origin (i.e.,
      0,0).
    translate(-rect.x( ), -rect.y( ))
The following translates all subsequently drawn content
by (x, y).
  func translate(x:int, y:int)→None
    div=document.createSVGElement('div')
    div.style.transform="translate('+x+','+y+')"
    cursor. appendChild(div)
    cursor=div
The following emits a <div> element to effect the clip
identified by |clip_id|, and advances the cursor to it so that
subsequently emitted elements are nested within and thus
clipped correctly.
  func beginClippedContent(clip_id)→None
    div=document.createElement('div')
    div.style.clipPath='#clip_'+clip_id
    cursor. appendChild(div)
    cursor=div
The following defines a clipping rectangle given by |rect|
and returns its ID.
  func defineClip(rect:Rect)→None
    clip_e=document.createSVGElement('clipPath')
    clip_e.id='clip_'+def_counter
    rect_e=document.createSVGElement('rect')
    rect.setStyle(rect_e)
    clip_e.appendChild(rect_e)
    defs.appendChild(clip_e)
    def_counter+=1
    return clip_e.id
  func drawSVGObject(name:string)→None
    div=document.createElement('div')
    div.style.backgroundImage=name
    cursor.appendChild(div)
  func drawPath(op:DrawPathOp)→None
    path=document.createSVGElement('path')
    path.id='path_'+def_counter
    path.setAttribute('d', op.path.toSVGPath( ))
    defs.appendChild(path)
    def_counter+=1
    drawSVGObject('#path_'+path.id)
  func drawText(op:DrawTextOp)→None
    text=document.createSVGElement('text')
    text.id='text'+def_counter
    # Ensure that glyph positioning matches that of IB.
    text.setAttribute('x', calcPosAttr(op.pos_array))
    text.textContent=op.utf8_array
    defs.appendChild(text)
    def_counter+=1
    drawSVGObject('#text_'+text.id)
  func drawImage(op:DrawImageOp)→None
    image=document.createElement('img')
    image.src=op.image.getURL( )
    cursor. appendChild(image)
  func rasterOneOp(op:DrawOp)→None
    if op.type==kSave:
      stack.push(cursor)
    else if op.type==kRestore:
      cursor=stack.pop( )
    else if op.type==kClip:
      beginClippedContent(defineClip(op.rect))
    else if op.type==kDrawPath:
      drawPath(op)
    else if op.type==kDrawText:
      drawText(op)
```

```
    else if op.type==kDrawImage:
        drawImage(op)
    else if op.type==kDrawDisplayList:
        raster(op.display_list)
The following transforms |display_list| into a DOM tree,
thus supporting for the browser's native rasterization
machinery to transform |display_list| to on-screen pixels.
    func raster(display_list:DisplayList) override→None
        for op in display_list.draw_ops:
            rasterOneOp(op)
    class Canvas2DTile inherits RasterTile:
    prop canvas:HTMLCanvasElement
    func Canvas2DTile(_rect:Rect)→None
        RasterTile(_rect, canvas)
    func rasterOneOp(ctx:2DCanvasContext, op:DrawOp)→
None
        if op.type==kSave:
            ctx.save( )
        else if op.type==kRestore:
            ctx.restore( )
        else if op.type==kClip:
            ctx.clip(op.rect)
        else if op.type==kDrawPath:
            ctx.drawPath(op.path)
        else if op.type==kDrawImage:
            ctx.drawImage(op.image)
        else if op.type==kDrawDisplayList:
            raster(op.display_list)
    The following rasters the given DisplayList to this tile's
HTMLCanvasElement by executing operations against the
backing canvas. The browser will then complete the raster-
ization to pixels.
    func raster(display_list:DisplayList) override→None
        # Map content at (|rect.x( )|, |rect.y( )|) in the DisplayList
            to the
        # tile's origin.
        ctx=canvas.getContext('2d')
        ctx.translate(-rect.x( ), -rect.y( ))
        # No need to draw content that lies outside of the tile's
            area.
        ctx.clip(rect)
        for op in display_list.draw_ops:
            rasterOneOp(ctx, op)
    # A WebGL rasterizer implemented using the CanvasKit
open source library.
    # The library, based on Skia, abstracts away the details of
GL and presents a 2D
    # Canvas like interface to the programmer. Internally, the
library emits GL ops
    # when API calls are made.
    class WebGLTile inherits RasterTile:
    prop canvas:HTMLCanvasElement
    func WebGLTile(_rect:Rect)→None
        RasterTile(_rect, canvas)
    func raster(display_list:DisplayList) override→None
        ctx=canvas.getContext('webgl')
        skcanvas=CanvasKit.getSurfaceWithExistingContext
            (ctx)
        skcanvas.translate(-rect.x( ), -rect.y( ))
        # No need to draw content that lies outside of the tile's
            area.
        skcanvas.clipRect(rect)
        for op in display_list.draw_ops:
            if op.type==kSave:
                skcanvas.save( )
            else if op.type==kRestore:
                skcanvas.restore( )
            else if op.type==kClip:
                skcanvas.clipRect(op.rect)
            else if op.type==kDrawPath:
                skcanvas.drawPath(op.path)
            else if op.type==kDrawImage:
                skcanvas.drawImage(op.image)
            else if op.type==kDrawDisplayList:
                raster(op.display_list)
    # Uniquely identifies a tile in a tile map.
    class TileKey:
    prop index_x:int # column index
    prop index_y:int # row index
    func TileKey(_ix:int, _iy:int)→None
        index_x=_ix
        index_y=_iy
    func ix( )→int
        return index_x
    func iy( )→int
        return index_y
    # Invoked by Map to determine this object's key.
    func getKey( )→string
        return string(index_x)++string(index_y)
    The following represents a set of dynamically allocated
raster tiles where:
    a raster tile is created and added to the tiling set at time
        of draw
    every raster tile is given a unique identifier (TileKey)
    the type of raster tile that is used is dynamically deter-
        mined; there may be a mix of tile types within a raster
        tile set
    here we statically select raster tile size to simplify speci-
        fication; alternative implementations can use dynamic
        tile size selection, or can choose a tile size equal to the
        layer's size, thus effectively disabling tiling; in an
        alternative implementation, one can employ a hetero-
        geneous tile size scheme in which tiles within the same
        set have different sizes in order to optimize rasteriza-
        tion for the workload at hand.
    class RasterTileMap:
    prop size_rect:Rect
    # Maps from tile's row and column position (aka TileKey)
        to the Tile
    # object itself;
    # initially empty; populated at draw time.
    prop tile_map:Map<TileKey, Tile>
    prop tile_width:int
    prop tile_height:int
    prop container:HTMLDivElement
    RasterTileMap( )→None
        container=document.createElement('div')
    func getContainer( )→HTMLDivElement
        return container
    func setSize(_width:int, _height:int)→None
        container.style.width=_width+'px'
        container.style.height=_height+'px'
        size_rect=Rect(0, 0, _width, _height)
        # Tile size must not exceed layer's size.
        tile_width=Math.min(1024, _width)
        tile_height=Math.min(256, _height)
    func setVisible(visible:bool)→None
        container.style.display=visible ? 'block':'none'
    func setTransform(mat:Matrix3D)→None
        container.style.transform=mat.toCSSValue( )
    func setBlendMode(mode:BlendMode)→None
        container.style.mixBlendMode=mode
    func rectForTileKey(key:TileKey)→Rect
        return Rect(tile_width*key.ix( ), tile_height*key.iy( ),
            tile_width, tile_height)
    # Portion of function that returns true iff a canvas 2D
```

```
    # element of the size |tile_rect| can be successfully
allocated.
    # This function may consider, for instance, if enough
canvas memory
    # exists to accommodate a tile of size |tile_rect|.
    func<standard>    canAllocCanvas2DContext(tile_rect:
Rect)→bool
    . . .
    # Portion of function that returns true iff browser is
    # capable of efficiently rendering WebGL content and it is
able to
    # allocate a WebGL context of size |tile_rect|.
    #
    # This efficiency check may entail checking for the
availability of a
    # hardware GPU and/or WebAssembly support.
    func<standard>    isSuitableForWebGL(tile_rect:Rect)→
bool
    . . .
    # Returns true iff the draws ops that lie in |tile_rect| region
of
    # |display_list| are too complex to render efficiently with
SVG (IOW,
    # the ops would result in a very large SVG document).
    #
    # More sophisticated display-list analyses may consider
static metrics
    # such as the number and/or complexity of Path2D objects
in
    # |display_list|, and/or the dynamic metrics such as the
measured cost of
    # drawing complex paths on the Endpoint Browser.
    func  isComplexDrawing(display_list:DisplayList,  til-
e_rect:Rect)→bool
        kComplexDrawingThreshold=10
        if display_list.isSolidColor(tile_rect):
            return false
        if display_list.getOpCount( )<kComplexDrawingThresh-
            old:
            return false
        return true
    # SVG is used in certain cases.
    func isSVGRequired( )→bool
        if isScreenReaderActive( ):
            # SVG allows the screen reader to understand the text
                that is
            # being drawn. Canvas and WebGL do not. Upon
                examining the latter
            # element, the screen reader would merely see a bag of
                pixels.
            return true
        if hasUserMovedMouse( ):
            # User intends to interact with the content, potentially
            # right-clicking to obtain a context-menu. When that
                happens, the
            # context-menu should have the relevant options for the
                content being
            # clicked (e.g., image should have a "Download" or
                "Open in new tab"
            # option).
            return true
        # Many other examples of where true would be returned
            exist. This is
        # just one.
        return false
    The following returns the type of tile that should be
allocated given a |display_list| and the tile's key. In making
its selection, this function considers static properties of the
|display_list| and the capabilities of the browser/platform.
Alternative implementations also consider dynamic metrics
``` such as tile update frequency (updates per second) and the average recorded time it takes to update the tile using a particular rasterization method. The trade-offs and solution space here are similar to those in other code-generation systems (e.g., just-in-time JavaScript-to-machine-code compilers).

```
    func selectTileType(display_list : DisplayList, tile_key :
TileKey) -> TileType
        tile_rect = rectForTileKey(key)
        # Prefer WebGL rasterization over all else since that is
        # generally fastest. As shown by the CanvasKit project, WebGL
        # rasterization can be very fast especially if combined with
WebAssembly.
        if isSuitableForWebGL(tile_rect):
            return kWebGL
        if isSVGRequired(tile_rect):
            return kDOM
        if canAllocCanvas2DContext(tile_rect):
            if isComplexDrawing(display_list, tile_rect):
                return kCanvas2D
        return kDOM
```

The following allocates the tile corresponding to |key|. |display_list| can be used to determine what type of tile is created.

```
    func    allocTileAt(key:TileKey,    display_list:Display-
List)→RasterTile
        tile_rect=rectForTileKey(key)
        tile_type=selectTileType(display_list, tile_key)
        if tile_type==kDOM:
            tile=DOMTile(tile_rect)
        elif tile_type==kWebGL:
            tile=WebGLTile(tile_rect)
        else:
            tile=Canvas2DTile(tile_rect)
        return tile
```

The following rasters |display_list| on to the tiles in the set, allocating new tiles if needed. This re-rasters all tiles to simplify specification, but an efficient implementation will re-raster only the tiles that have changed.

```
func raster(display_list : DisplayList) -> None
    start_index_x = floor(size_rect.x( ) / tile_width)
    end_index_x = floor(size_rect.right( ) / tile_width)
    start_index_y = floor(size_rect.y( ) / tile_height)
    end_index_y = floor(size_rect.bottom( ) / tile_height)
    # Iterate through all tile indices.
    for ix in xrange(start_index_x, end_index_x + 1):
        for iy in xrange(start_index_y, end_index_y + 1):
            key = TileKey(ix, iy)
            tile = tile_map[key]
            if not tile: # Allocate tile object if not already allocated
                tile = allocTileAt(key)
                tile_map[key] = tile
                container.appendChild(tile.getElement( ))
            # Raster tile's content.
            tile.raster(display_list)
}
```

4. Example Isolated Browser Specification

An example high-level flow is as follows:

(1) Renderer updates internal data structures, accounting for new HTML/CSS content and/or dynamic DOM/CSS modifications (e.g., as induced by JavaScript)

(2) Isolated Browser invokes Compositor to build and/or update Layer Tree based on Renderer state (3) An instrumented/patched Compositor sends a serialization of the updated Layer Tree to the Endpoint Browser (4) Go back to step (1)

```
# The rendering engine used to parse and execute web content such as a HTML,
# CSS, and JavaScript. This could be any third-party engine such as WebKit
# or Blink, open-source or otherwise. In the open-source Chromium browser,
# there are multiple Renderers and Compositors, at least one per browser
# tab. To simplify, an assumption is made that at most one tab is supported
# and that exactly one Renderer and Compositor is assigned to that tab.
module<standard> IsolatedBrowser::Renderer {
    # PaintChunk: information about how to paint the page contents, typically
    # comprising a set of Display Lists. Many representations are possible.
    # E.g., see Chromium Blink's definition of PaintChunk here:
    #
    #
https://chromium.googlesource.com/chromium/src/+/master/third_party/blink/renderer/platform/graphics/paint/README.md .
    class PaintChunk
    # The Renderer's representation of a single frame in the page.
    class<standard> RenderFrame:
        # Installs a customized HTTP throttler that is consulted for every
        # request/response issued by this frame.
        func<standard> setNetworkThrottle(throttle : NetworkThrottle | None) -> None
        # Returns the custom network throttle used by the frame, if any.
        func<standard> getNetworkThrottle( ) -> NetworkThrottle | None
        # Returns true iff the frame is actively playing a video.
        func<standard> isPlayingVideo( ) -> bool
        # Returns the origin of the current URL loaded by this frame: e.g., the origin of
        # http://example.org/intro.html is http://example.org.
        func<standard> getCurrentOrigin( ) -> string
        # Returns a unique identifier for the HTML frame. Useful for script injection.
        func<standard> getId( ) -> int
        ...
    # Given a URL, fetches the page at URL and associated resources, parses the
    # data and begins executing it.
    func load(url : string) -> None
    # Returns the PaintChunks that represent the current visual state of the
    # page, taking into account dynamic modifications to the browser DOM from
    # script execution and resource loads made since the last invocation of
    # this function.
    #
    # Throughout the text, we refer to this as the renderer lifecycle update.
    func updatePageLifecycle( ) -> List<PaintChunk>
}
module<standard> IsolatedBrowser::Compositor {
    ### Compositor periodically invokes the Renderer to update state needed to
    # build the Layer Tree and per-Layer Display Lists in response to page
    # activity (e.g., new HTML/CSS, dynamic DOM modifications made by
    # JavaScript, etc.).
    #
    # The Compositor is modified to interpose (i.e., hook) into Layer Tree
    # update events, upon which we serialize the new tree into a message and
    # send it to the Thin Client.
    # Routines to serializer state into a binary buffer that may then be sent
    # over the network and de-serialized by the TC.
    class<standard> Serializer:
        func serializeVideoState(state : VideoState, buffer : BinaryWriter) -> None
            buffer.writeArray(state.chunks)
            buffer.writeBool(state.muted)
        # Serializes the DisplayList into a binary buffer using a simple
        # encoding. This is a standard routine since variants of it can be found
        # in existing browser implementations (e.g., Chromium).
        func serializeDisplayList(display_list : DisplayList,
                                  buffer : Binarywriter) -> None
            buffer.writeInt(len(display_list.draw_ops)) # count of display items
            for op in display_list.draw_ops:
                buffer.writeInt(op.type)
                if op.type == kSave:
                    pass # no arguments
                else if op.type == kRestore:
                    pass # no arguments
                else if op.type == kClip:
                    buffer.writeRect(op.rect)
                else if op.type == kDrawPath:
                    buffer.writePath(op.path)
                else if op.type == kDrawText:
                    buffer.writeArray(op.utf_array)
                    buffer.writeArray(op.pos_array)
```

-continued

```
        else if op.type == kDrawImage:
            buffer.writeImage(op.image)
        else if op.type == kDrawDisplayList:
            serializeDisplayList(op.display_list, buffer)
```

The following serializes |layer| properties in sequence to a binary |buffer|. It avoids serialization of content that has not changed since the previous commit.

```
func serializeLayer(layer : Layer, buffer : BinaryWriter) -> None
    buffer.writeInt(layer.id)
    if layer.parent:
        buffer.writeInt(layer.parent.id)
    else:
        buffer.writeInt(-1) # -1 means "no parent"
    if not layer.is_dirty:
        buffer.writeInt(0) # indicate that properties have not changed
        return
    buffer.writeInt(1)
    buffer.writeInt(layer.type)
    buffer.writeRect(layer.bounds)
    buffer.writeMatrix(layer.transform)
    buffer.writeInt(layer.blend_mode)
    buffer.writeInt(layer.pre_order_index)
    if layer.type == kPictureLayer:
        serializeDisplayList(layer.display_list, buffer)
    else if layer.type == kVideoLayer:
        serializeVideoState(layer.video_state, buffer)
# Encodes |layer_tree| into a binary |buffer|.
func serializeTree(layer_tree : LayerTree,
                   buffer : BinaryWriter) -> None
    # Pre-order traversal guarantees that parent Layers are serialized
    # before children, and that siblings are visited from left to right,
    # both of which enable simple de-serialization.
    for layer in layer_tree.preOrderList( ):
        serializeLayer(layer, buffer)
        layer.is_dirty = false
        if layer.type == kVideoLayer:
            # Reset to avoid sending the chunks again in the next commit.
            layer.video_state.chunks = [ ]
```

Each page has one LayerTreeManager (and hence Layer Tree). In Chromium's Compositor, for instance, this class corresponds to cc::LayerTreeHost. The standard functionality is extended by interposing on Layer Tree build/update completion events for the purpose of commit serialization.

When the Renderer instantiates this class, it provides the ID of the corresponding HTML frame.

```
class<standard> LayerTreeManager(frame_id:int):
    # Periodically updated using info from Renderer. prop
        layer_tree:LayerTree
    # Assigned upon creation; represents bi-directional connection to the
    # Endpoint Browser's Thin Client.
    prop websock:WebSocket
    # Invoked when LayerTreeManager completes layer tree build/update.
    func<NN> onLayerTreeUpdateComplete(layer_tree:LayerTree):
        buffer=BinaryWriter( )
        Serializer( )serializeTree(layer_tree, buffer)
        websock.sendMessage(buffer.toArray( ))
    # Standard Compositor implementation that builds a
        |layer_tree| from
    # PaintChunks produced by the Renderer.
    func buildLayerTree(chunks:PaintChunks)→LayerTree
    # A simple Compositor implementation: periodically
        query Renderer for
    # state updates; if an update is available, build/update the
        LayerTree
    # using paint information from the Renderer.
    #
    # An alternative implementation is to send PaintChunks
        directly
    # to the Endpoint Browser and building the LayerTree
        there.
    func onPeriodicTimer( )→None
        chunks=Renderer.updatePageLifecycle( )
        if not chunks:
            return # No updates available
        layer_tree=buildLayerTree(chunks)
        # Hook: invoke serialization routines.
        onLayerTreeUpdateComplete(layer_tree)
}
``` a. Thin Client Specification

Example high level flow:

(1) establishes a connection to the Isolated Browser and listens for messages, (2) upon receiving a message:

(a) decodes it into a Layer Tree, (b) computes a DOM representation of the Layer Tree (LayerTreeDOM), (c) activates the LayerTreeDOM, thus inducing Endpoint Browser to render frame as pixels (3) goes back to step (2)

```
# ThinClient execution begins in this module.
module<NN> EndpointBrowser::ThinClient::Main {
    ### Global state ###
    # Map of video elements in the video container, indexed by owning Layer id.
    # By maintaining references to video elements across tree activation,
    # we ensure that the element state does not reset, thus allowing us to
    # seamlessly reuse the element (i.e., without audio/visual artifacts) in
    # future LTD trees.
    video_elements_by_id = Map<int, HTMLVideoElement>
    # WebSocket communication channel to IB.
    ws = None
    # References the active LayerTreeDOM tree, if any.
    active_ltd_tree = None
    # Detaches |active_ltd_tree| (if any) from the DOM, and attaches
    # |pending_ltd_tree| in the DOM as the new active tree, thus inducing
    # browser to render content.
```

```
        func activateLTDTree(pending_ltd_tree) -> None
            if active_ltd_tree:
                active_ltd_tree.parentNode.removeChild(active_ltd_tree)
            document.body.appendChild(pending_ltd_tree)
            active_ltd_tree = pending_ltd_tree
        # Invoked upon receiving a message from Isolated Browser. This routine
        # expects the message to be in binary form, but alternative implementations
        # may use encodings such as JSON.
        func onMessage(message : Array<uint8>) -> None:
            layer_tree = deserializeTree(BinaryReader(message))
            pending_ltd_tree = buildLayerTreeDOM(layer_tree)
            activateLTDTree(pending_ltd_tree)
        # Connects to Isolated Browser via a Cloud Browsing Service, and registers
        # a message reception handler.
        func connectAndListen(recv_fn : Function) -> None:
            ws = WebSocket.open('secure-browsing.com');
            ws.onrecv = recv_fn
        func onInit( ) -> None:
            connectAndListen(onMessage)
        # Ask Browser to invoke |onInit| upon loading the Thin Client JavaScript.
        window.onload = onInit
}
module<NN> EndpointBrowser::ThinClient::Deserializer {
    # Shadow copy of the IB Compositor's LayerTree. This is maintained by applying
    # updates (changes made to the IB-side layer tree) from the IB.
    prop layer_tree : LayerTree( )
    func deserializeVideoState(buffer : BinaryReader) -> VideoState
        state = VideoState( )
        state.chunks = buffer.readArray( )
        state.muted = buffer.readBool( )
        return state
    func deserializeDisplayList(buffer : BinaryReader) -> DisplayList
        dl = DisplayList( )
        item_count = buffer.readInt( )
        for i = 0; i < item_count; i++
            type = buffer.readInt( )
            if type == kSave:
                op = SaveOp( )
            else if type == kRestore:
                op = RestoreOp( )
            else if type == kClip:
                op = ClipOp( )
                op.rect = buffer.readRect( )
            else if type == kDrawPath:
                op = DrawPathOp( )
                op.path = buffer.readPath( )
            else if type == kDrawText:
                op = DrawTextOp( )
                op.utf8_array = buffer.readString( )
                op.pos_array = buffer.readArray( )
            else if type == kDrawImage:
                op = DrawImageOp( )
                op.image = buffer.readImage( )
            else if type == kDrawDisplayList:
                op = DrawDisplayListOp( )
                op.display_list = deserializeDisplayList(buffer)
            dl.draw_ops.append(op)
        return dl
    # Updates the shadow layer tree with the updates in |buffer| and returns the
    # updated shadow layer tree. Accounts for the fact that |buffer| represents the
    # changes made to the IB-side layer tree since the last update. Implementation is
    # straightforward, so details are omitted to avoid verbosity.
    func deserializeTree(buffer : BinaryReader) -> LayerTree
}
```

Remote Compositing is supported for arbitrary endpoint browsers via intermediate translation to DOM. This module implements that functionality.

```
module<NN> EndpointBrowser::ThinClient::LayerTreeToDOMTransformer {
    # Creates backing video element and keeps a reference to it in the global
    # state so that it can be reused in the next frame without having to
    # restore the video playback state in an artifact-free manner.
```

```
        func<NN> createAndAttachBackingVideoElementIfNeeded(video_layer : Layer) ->
None
            # Reuse existing <video> element to avoid resets.
            video_layer.video_element = video_elements_by_id[video_layer.id]
            if not layer.video_element:
                video_layer.video_element = document.createElement('video')
                video_elements_by_id[video_layer.id] = video_layer
            video_layer.video_element.style.display = 'block'
        # Draws the layer's contents.
        func drawLayer(layer : Layer) -> None
            if layer.type == kScrollClipLayer:
                pass # Do nothing, no content to draw.
            else if layer.type == kPictureLayer:
                layer.tiling_set.raster(display_list)
            else if layer.type == kVideoLayer:
                pass # Browser will draw the frame, no action needed on our part.
        # Styles the |layer|'s element in accordance with the semantics of the
        # |layer|'s properties.
        func applyLayerProperties(layer : Layer) -> None
            if layer.type == kPictureLayer:
                layer.tiling_set.setSize(layer.bounds.width( ), layer.bounds.height( ))
                layer.tiling_set.setVisible(true)
                layer.tiling_set.setTransform(layer.transform)
                layer.tiling_set.setBlendMode(layer.blend_mode)
            else:
                layer.element.style.width = layer.bounds.width()
                layer.element.style.height = layer.bounds.height( )
                layer.element.style.transform = layer.transform.toCSSValue( )
                layer.element.style.mixBlendMode = layer.blend_mode
            if layer.type == kVideoLayer and layer.state.chunks:
                # Enqueue frame data for eventual playback. We leverage Media Source
                # Extensions (MSE) which enables dynamic construction of a video stream
                # from binary buffers. For browsers without MSE extensions, the video
                # element's src attribute may be used to fetch the video data from the
                # IB.
                buffer = SourceBuffer(layer.state.chunks)
                layer.element.appendSourceBuffer(buffer)
        func getElementForLayer(layer : Layer) -> HTMLElement
            if layer.type == kScrollClipLayer:
                element = document.createElement('div')
            else if layer.type == kPictureLayer:
                element = layer tiling_set.getContainer( )
            else if layer.type == kVideoLayer:
                element = video_elements_by_id[video_layer.id]
            else:
                assert(0) # Unreachable
            return element
        # Given a LayerTree, returns an HTMLDivElement corresponding to the root
        # element of the LayerTreeDOM tree (termed LTD tree). The LTD tree is the
        # DOM representation of LayerTree.
        #
        # Example execution:
        #       * Input: LayerTree
        #             -<ScrollClipLayer>
        #             |--<PictureLayer>
        #             |--<VideoLayer>
        #       * Returns: DOM Tree (LayerTreeDOM)
        #             -<div style='width: 768; height: 1024; overflow: hidden;'>
        #             |--<canvas style='width: 512; height: 512; transform:
matrix3d(...);'>
        #             |--<video style='width: 256; height: 256;'>
        func<NN> buildLayerTreeDOM(layer_tree : LayerTree) -> HTMLDivElement
            ltd_root = None
            for layer in layer_tree.preOrderList( ):
                layer.element = getElementForLayer(layer)
                if not ltd_root:
                    ltd_root = layer.element
                # Insert element into the LTD tree in the same position that |layer|
                # occupies in |layer_tree|, thus guaranteeing that Endpoint Browser
                # will preserve the paint order specified by the layer tree.
                layer.parent.element.appendChild(layer.element)
                applyLayerProperties(layer)
                drawLayer(layer)
            return ltd_root
}
```

B. Example: Rendering Flow of a Single-Layer Page

In this section, we trace the transformation of a single-layer HTML page loaded by the Isolated Browser into user-visible pixels on the Endpoint Browser. An example page is as follows:

```
<!DOCTYPE html>
<html>
    <body>
        <div id='banner' style='position: absolute;'>Hello</div>
        <script>
            <!-- Animation: move the text after 1 second. -->
            setTimeout(function( ) {
                van banner = document.getElementById('banner');
                banner.style.top = '300px';
            }, 1000);
        </script>
    </body>
</html>
```

The above is a simple animated page hosted via an HTTP server running at the imaginary domain example.com. It draws the text "Hello" to the top-left corner of the page, and then moves the text 300 pixels down one second later. In the Chromium 80 web browser, this page comprises one composited layer, and is expected to produce at least two Commits: the first for the initial page rendering, and another Commit for the post-animation rendering.

1. High Level End-to-End Flow (1) User loads or navigates to the example page for Secure Browsing by:
    entering URL that explicitly points to a Secure Browsing Service (e.g., safeview.it/example.com) into the Endpoint Browser's URL Bar (2) Endpoint Browser receives TC JavaScript from Secure Browsing Service, and executes it (3) TC couples with an Isolated Browser from a pool of Isolated Browsers provided by Secure Browsing Service and instructs Isolated Browser to load the page (4) Isolated Browser loads target page and associated resources from the origin server (example.com)

(5) Isolated Browser generates rendering data by transforming web content (HTML/CSS/JavaScript) to a Layer Tree (a.k.a, lifecycle update)

(6) Isolated Browser interposes on Layer Tree generation, serializes it, and sends it to the TC in encoded form (e.g., binary encoding)

(7) TC creates a DOM representation from received Layer Tree and activates it, thus inducing Endpoint Browser to render content (8) Go back to step 5 until the user navigates away from the page. Upon navigation, go back to step 4.

2. Render Updates (Steps 5 & 6 of End-to-End Flow)

Upon loading the page, IB generates and transmits to the TC a sequence of Layer Trees, where the first tree, $T\_\{0\}$, is:

* Root
    Layer A (banner)
      Display List A where Display List A comprises the following draw-ops:
1. DrawRect(0, 0, 1024, 768, kWhite)//draws a white background
2. DrawPath(0, 0, txtPath, kBlack)//draws "Hello" in black at position (0,0)

where |txtPath| references a Path2D object that contains instructions for drawing the glyphs in "Hello".

$T\_\{1\}$ is:
  * Root
    Layer A (banner)
      Display List A' where Display List A' comprises the following draw-ops:
1. DrawRect(0, 0, 1024, 768, kWhite)//draws a white background
2. DrawPath(0, 300, txtPath, kBlack)//draws "Hello" in black at position (0, 300)

The two updates differ only in that Display List A' draws text at y position 300 instead of 0.

3. TC-Side Rendering (Step 7 of End-to-End Flow)

To render the page into user-visible pixels, the TC builds two LayerTreeDOM structures—each corresponding to the two Layer Trees—and installs them in the EB's DOM in succession to render the page (and animation effect), as follows:

1. TC builds LayerTreeDOM_{0} from $T\_\{0\}$ as follows, and then installs it the EB's DOM, thus generating user-visible pixels:

(a) Allocates a single container div for Layer A, subdivides the region into 3 equal sized tiles, as follows:

```
-------
|     |      <-- Tile 0,1 [1024 x 256]
|     |      <-- Tile 0,2 [1024 x 256]
|     |      <-- Tile 0,3 [1024 x 256]
-------
``` and creates the initial RasterTileMap for Layer A:
  0,1→None
  0,2→None
  0,3→None
where K→None denotes that a tile with key K does not yet have a RasterTile allocated for it.
The user still sees a blank page at this point.

(b) For each tile key K in the RasterTileMap, TC allocates a RasterTile for K, attaches it to the LayerTree DOM, and draws to it.

(i) After drawing the first tile, the resulting RasterTileMap is:
    0,1→Canvas2DTile
    0,2→None
    0,3→None
and the user would the following (approximately) on their screen:

```
-------
|Hello|      <-- Tile 0,1 (drawn, text)
|     |      <-- Tile 0,2 (not yet drawn)
|     |      <-- Tile 0,3 (not yet drawn)
-------
```

A Canvas2DTile was selected to raster Tile 1 because a query of draw-ops for that portion of Display List A indicated that the tile is complex due to the presence of text in that region (see isComplexDrawing( ).

(ii) After drawing the second tile, the resulting RasterTileMap is:
    0,1→Canvas2DTile
    0,2→DOMTile
    0,3→None
and the user sees the following on their screen:

```
-------
|Hello|      <-- Tile 0,1 (drawn, text)
|     |      <-- Tile 0,2 (drawn, all white)
|     |      <-- Tile 0,3 (not yet drawn)
-------
```

A DOMTile was selected to raster Tile 2 because that region was comprises a few draw-ops, and thus was considered simple enough for SVG rasterization.

(iii) After drawing the third tile, the resulting RasterTileMap is:

0,1→Canvas2DTile
0,2→DOMTile
0,3→DOMTile and the user sees the following on their screen:

```
-------
|Hello|    <-- Tile 0,1 (drawn, text)
|     |    <-- Tile 0,2 (drawn, all white)
|     |    <-- Tile 0,3 (drawn, all white)
-------
```

A DOMTile was selected for Tile 3 for the same reason given in (ii).

2. Upon receiving Layer Tree T_{1}, TC transforms it into LayerTreeDOM_{1} as follows, and then installs it in the EB's DOM:

(a) Allocates a single container div for Layer A, subdivides the region into 3 equal sized tiles, as follows:

```
-------
|     |    <-- Tile 0,1 [1024 x 256]
|     |    <-- Tile 0,2 [1024 x 256]
|     |    <-- Tile 0,3 [1024 x 256]
-------
``` and creates the initial RasterTileMap for Layer A:

0,1→None
0,2→None
0,3→None where K→None denotes that a tile with key K does not yet have a RasterTile allocated for it. The user would see a blank page at this point.

(b) For each tile key K in the RasterTileMap, TC allocates a RasterTile for K, attaches it to the LayerTreeDOM, and draws to it.

(i) After drawing the first tile, the resulting RasterTileMap is:

0,1→DOMTile
0,2→None
0,3→None and the user sees the following on their screen:

```
-------
|     |    <-- Tile 0,1 (drawn, all white)
|     |    <-- Tile 0,2 (not yet drawn)
|     |    <-- Tile 0,3 (not yet drawn)
-------
```

A DOMTile was selected to raster Tile 1 because that region has few draw-ops, and thus was considered simple enough for DOM rasterization.

(ii) After drawing the second tile, the resulting RasterTileMap is:

0,1→DOMTile
0,2→Canvas2DTile
0,3→None and the user sees the following on their screen:

```
-------
|     |    <-- Tile 0,1 (drawn, all white)
|Hello|    <-- Tile 0,2 (drawn, text)
|     |    <-- Tile 0,3 (not yet drawn)
-------
```

A Canvas2DTile was selected to raster Tile 2 because a query of draw-ops for that portion of the Layer A's Display List indicated that the tile is complex due to the presence of text paths ("hello").

(iii) After drawing the third tile, the resulting RasterTileMap is:

0,1→DOMTile
0,2→Canvas2DTile
0,3→DOMTile and the user sees the following on their screen:

```
-------
|     |    <-- Tile 0,1 (drawn, all white)
|Hello|    <-- Tile 0,2 (drawn, text)
|     |    <-- Tile 0,3 (drawn, all white)
-------
```

A DOMTile was selected for Tile 3 for the same reason given in (i).

Of note here is that tile types can change during execution in response to changes in display list content.

C. Example: Rendering Flow of a Multi-Layer Page

In this section, an example multi-layer HTML page is transformed into user-visible pixels on the Endpoint Browser. The example page is as follows:

```
<!DOCTYPE html>
<html>
  <body>
    <div id='banner' style='position: absolute;'>Hello</div>
    <div id='ad' style='position: fixed; right: 100px; width: 100px; height: 100px;'>
      <image src='animated.gif'/>
    </div>
    <script>
      var ad = document.getElementById('ad');
      <!-- Display a link to purchase product after 1 second. -->
      setTimeout(function ( ) {
        ad.innerHTML = "<a href='buy.html'>Buy now to get a discount!</a>";
      }, 1000);
    </script>
  </body>
</html>
```

The page is similar to the single-layer page, but overlays a transparent fixed-positioned advertisement in the upper-left corner of the page on top of the page's main content ("Hello"), as is typical of many real-world sites. The advertisement, by virtue of being fixed-positioned, gets its own layer, and comprises a looping animated image meant to grab the user's attention. This page is expected to generate a multitude of frame updates, one for each update of the animated image.

1. High Level End-to-End Flow

This is the same as the single-layer example.

2. Rendering Updates (Steps 5 & 6 of End-to-End Flow)

Upon loading the example page, IB generates and transmits to the TC a sequence of n Layer Trees:

T_{0}, T_{1}, ... T_{n−1}, where the precise value of n depends on how long the page is left open; but for our purposes, we assume that n>2. In that update sequence, Layer Tree $T_{\{i\}}$ is defined as:
* Root
  Layer A (banner)
    Display List A
  Layer B (ad)
    Display List $B_{\{i\}}$
For i<n-1, Display List $B_{\{i\}}$ is defined as:
  1. DrawImage(0, 0, frame_data_{j})
Display List $B_{\{n-1\}}$ (the final one) is defined as:
  1. DrawImage(0, 0, frame_data_{j})
  2. DrawPath(0, 0, parPath)//draws a paragraph of text ("Buy . . . ")
In the above, frame_data_{j} corresponds to the pixel data (bitmap) of the j-th frame (where j is i modulo n) of the animated GIF referenced by the page.

3. TC-Side Rendering (Step 7 of End-to-End Flow)

To render the page into user-visible pixels, the TC transforms each $T_{\{i\}}$ in the sequence into the corresponding LayerTreeDOM_{i} structure and installs it in the EB's DOM in sequence order. Since $T_{\{i\}}$ for i<n-1 are similar, it suffices to examine the processing of $T_{\{0\}}$ and $T_{\{n-1\}}$ in detail.
1. TC builds LayerTreeDOM_{0} from $T_{\{0\}}$ as follows, and then install it in the EB's DOM.
   (a) Allocates a single container div for Layer A, subdivides the region into 3 equal sized tiles, as follows:

```
-------
|     |       <-- Tile 0,1 [1024 x 256]
|     |       <-- Tile 0,2 [1024 x 256]
|     |       <-- Tile 0,3 [1024 x 256]
-------
``` and creates the initial RasterTileMap_{A} (i.e., the map for Layer A):
0,1→None
0,2→None
0,3→None
where K→None denotes that a tile with key K does not yet have a RasterTile allocated for it.
It does the same for Layer B (ad), but subdivides it into only 1 tile as the layer is relatively small.

```
-----
| | |       <-- Tile 0,1 [256 x 256]
-----
```

RasterTileMap_{B} is:
0,1→None
The user sees a blank page at this point.
   (b) For each tile key K in a RasterTileMap, TC allocates a RasterTile for K, attaches it to the LayerTree DOM, and draws to it. Here we Demonstrate this in parallel for Layer A and B.
      (i) After one iteration, the resulting RasterTileMap_{A} is:
      0,1→Canvas2DTile
      0,2→None
      0,3→None and the user would see the following for Layer A:

```
-------
|Hello|       <-- Tile 0,1 (drawn, text)
|     |       <-- Tile 0,2 (not yet drawn)
|     |       <-- Tile 0,3 (not yet drawn)
-------
```

After the same iteration, RasterTileMap_{B} is:
0,1→DOMTile (drawn, image)
and the user would see Layer B as:

```
-----
| i |       <-- Tile 0,1 [256 x 256] (i denotes an image)
-----
```

A DOMTile was chosen because the display list has only one draw-op, and thus selectTileType deemed it simple enough for efficient DOM element generation.
The DOM tree emitted by the DOMTile rasterizer is:
  <div style="position: absolute; top: 0px; left: 0px; width: 256px; height: 256px;">
    <img src="image_frame_data_0.png" x="0" y="0">
  </div>
where image_frame_data_0 is the bitmap corresponding to frame 0 of the animated image.
      (ii) After drawing the second tile, the resulting RasterTileMap_{A} is:
      0,1→Canvas2DTile
      0,2→DOMTile
      0,3→None
and the user sees the following for Layer A:

```
-------
|Hello|       <-- Tile 0,1 (drawn, text)
|     |       <-- Tile 0,2 (drawn, all white)
|     |       <-- Tile 0,3 (not yet drawn)
-------
```

A DOMTile was selected to raster Tile 2 because that region was non-complex, and thus was considered simple enough for DOM rasterization.
RasterTileMap_{B} does not have a second tile, so it remains unchanged.
      (iii) After drawing the third tile, the resulting RasterTileMap_{A} is:
      0,1→Canvas2DTile
      0,2→DOMTile
      0,3→DOMTile
and the user would see the following for Layer A:

```
-------
|Hello|       <-- Tile 0,1 (drawn, text)
|     |       <-- Tile 0,2 (drawn, all white)
|     |       <-- Tile 0,3 (drawn, all white)
-------
```

A DOMTile was selected for Tile 3 for the same reason given in (ii).
RasterTileMap_{B} does not have a third tile, so it remains unchanged.

After the EB installs the LayerTreeDOM, the user sees:

```
-------
|Hel|i|
|   -|
|    |
-------
``` in which Layer B (with image i), positioned in the upper right, composites on top of Layer A with text "Hello" (partially occluded by image i).

n. TC builds LayerTreeDOM_{n−1} from T_{n−1} as follows, and then installs it in EB's DOM:
   (a) Allocates a single container div for Layer A, subdivides the region into 3 equal sized tiles, as follows:

```
-------
|    |      <-- Tile 0,1 [1024 x 256]
|    |      <-- Tile 0,2 [1024 x 256]
|    |      <-- Tile 0,3 [1024 x 256]
-------
``` and creates the initial RasterTileMap for Layer A:
0,1→None
0,2→None
0,3→None
where K→None denotes that a tile with key K does not yet have a RasterTile allocated for it.
It does the same for Layer B (ad), but subdivides into only 1 tile as the layer is relatively small.

```
-----
| |      <-- Tile 0,1 [256 x 256]
-----
```

RasterTileMap for Layer B is:
0,1→None
The user continues to see the previously rendered frame at this point, because this LayerTreeDOM has yet to be installed.
   (b) For each tile key K in a RasterTileMap, TC allocates a RasterTile for K, attaches it to the LayerTree DOM, and draws to it. Here it is demonstrated that this in parallel for Layer A and B.
      (i) After drawing the first tile, the resulting RasterTileMap_{A} is:
         0,1→Canvas2DTile
         0,2→None
         0,3→None
      and the user sees the following for Layer A:

```
-------
|Hello|     <-- Tile 0,1 (drawn, text)
|     |     <-- Tile 0,2 (not yet drawn)
|     |     <-- Tile 0,3 (not yet drawn)
-------
```

RasterTileMap_{B} is:
0,1→Canvas2DTile (drawn, complex text)
and the user sees Layer B as:

```
-----
|t|         <-- Tile 0,1 [256 x 256] (t denotes text "Buy...")
-----
```

A Canvas2DTile was chosen because the display list now has complex paths and thus selectTileType deemed it too complex for efficient SVG path generation and rendering.
      (ii) After drawing the second tile, the resulting RasterTileMap is:
         0,1→Canvas2DTile
         0,2→DOMTile
         0,3→None
      and the user sees the following for Layer A:

```
-------
|Hello|     <-- Tile 0,1 (drawn, text)
|     |     <-- Tile 0,2 (drawn, all white)
|     |     <-- Tile 0,3 (not yet drawn)
-------
```

A DOMTile was selected to raster Tile 2 because that region has few draw-ops and thus was considered simple enough for DOM rasterization.
RasterTileMap_{B} does not have a second tile, so it remains unchanged.
      (iii) After drawing the third tile, the resulting RasterTileMap is:
         0,1→Canvas2DTile
         0,2→DOMTile
         0,3→DOMTile
      and the user would see the following for Layer A:

```
-------
|Hello|     <-- Tile 0,1 (drawn, text)
|     |     <-- Tile 0,2 (drawn, all white)
|     |     <-- Tile 0,3 (drawn, all white)
-------
```

A DOMTile was selected for Tile 3 for the same reason given in (ii).
RasterTileMap_{B} does not have a third tile, so it remains unchanged.
After the EB installs the LayerTreeDOM, the user would see:

```
-------
|Hel|t|
|   -|
|    |
-------
``` in which Layer B (with text t ["Buy ... "]), positioned in the upper right, composites on top of Layer A with text "Hello" (partially occluded by text t).

D. Display List to DOM Transformation

The DOM rasterizer facilitates rendering content by way of translation to DOM. In this section, the DOM transformation approach defined in the DOMTile specification is applied to various example Display Lists:
(a) Consider a simple Display List that draws a curved path:
ClipRect(0, 0, 1024, 768)
DrawPath(curvedPath) # curvedPath references path drawing instructions Such a Display List may be produced by the IB browser upon loading a page that draws |curvedPath|. The transformation approach converts the Display List into the following DOM tree:

```
<div style="position: absolute; top: 0px; left: 0px; width: 256px;
        height: 256px;">
    <svg viewBox="0 0 256 256" xmlns="http://www.w3.org/2000/svg">
        <defs>
            <rect id="obj_0" x="0" y="0" width="256" height="256">
            <rect id="obj_1" x="0" y="0" width="1024" height="768">
            <path id="obj_2" d="M 10 80 Q 95 10 180 80" stroke="black"
fill="transparent"/>
        </defs>
    </svg>
    <div style="transform: translate(0,0); clip-path: url(#obj_0);">
        <div style="clip-path: url(#obj_0);">
            <div style="background-image: url(#obj_2); "></div>
        </div>
    </div>
</div>
```

Path data contained in |curvedPath| is converted into an SVG path string (see value of attribute "d" above).
(b) Consider a Display List that draws text:
DrawText(0, 20, "hello", pos_array) # pos_array contains glyph positioning data Such a Display List results from loading a simple page that contains the
text "hello". The transformation approach converts the above Display List into the following DOM tree:

```
<div style="position: absolute; top: 0px; left: 0px; width: 256px;
        height: 256px;">
    <svg viewBox="0 0 256 256" xmlns="http://www.w3.org/2000/svg">
        <defs>
            <rect id="obj_0" x="0" y="0" width="256" height="256">
            <text id="obj_1" x="0 8 16.1 23 30" y="20">hello</text>
        </defs>
    </svg>
    <div style="transform: translate(0,0); clip-path="url(#obj_0);">
        <div style="background-image: url(#obj_1);"></div>
    </div>
</div>
```

The emitted SVG explicitly specifies glyph placement for the text "hello", thus providing pixel-accurate text rendering fidelity. Furthermore, unlike Canvas-based rasterization, it allows the Endpoint Browser or extensions running on the Endpoint Browser (e.g., Chrome Extensions) to understand that the text being rendered is the English word "hello", thus allowing the user to select it and trigger the user's Dictionary extension or screen-reading program (an accessibility feature), and to obtain text-specific functionality (context menu items, copy/paste), among other things.
(c) Consider a simple Display List that draws an image:
ClipRect(0, 0, 1024, 768)
DrawImage(0, 0, frame_data_0) # frame_data_0 is the image of a cat Such a Display List may be produced by the IB browser upon loading a page that shows the image of a cat. The transformation algorithm converts the Display List into the following DOM tree:

```
<div style="position: absolute; top: 0px; left: 0px; width: 256px;
        height: 256px;">
    <svg viewBox="0 0 256 256" xmlns="http://www.w3.org/2000/svg">
        <defs>
            <rect id="obj_0" x="0" y="0" width="256" height="256">
            <rect id="obj_1" x="0" y="0" width="1024" height="768">
        </defs>
    </svg>
    <div style="transform: translate(0,0); clip-path: url(#obj_0);">
        <div style="clip-path : url(#obj_0);">
            <image src="/resources/cat.png"/>
        </div>
    </div>
</div>
```

In contrast with Canvas or WebGL rasterization, the DOM rasterization allows the Endpoint Browser to understand that an image is displayed (as opposed to seeing only a bag of pixels), and that in turn enables the user to right click and save the image as is possible natively. It also allows accessibility tools recognize the image and possibly read out any associated textual caption.

E. Display List Deltas

It can be inefficient in CPU and network utilization to generate and transmit a new per-layer Display List every time a layer's drawing changes, especially if the layer is large and/or updates frequently. In this section, an optimization that enables incremental updates of Display Lists using Display List deltas is presented.

The delta approach works by subdividing a layer's master Display List into several Display List tiles (i.e., sub Display Lists). When the IB updates the master Display List, we identify the tiles that were affected, and serialize only those tiles (ops therein) to the TC. The TC, for any given Layer, retains a copy of the master Display List from the prior update, but applies the incoming tile updates (i.e., deltas).

More precisely, we define the TC's TiledDisplayList as follows:
module TC::Tiling {
    # An alternative Display List implementation in which a rectangular region
    # is tiled into several equal sized (in area) sub-display lists. Tiling
    # allows for efficient partial updates to the Display List because only the
    # tiles that change need be transferred over the network and changed on the
    # TC.
    # In this specification, we assume a fixed tile size, but an alternative
    # implementation may choose to use different tile sizes within the same
    # tile map with little additional effort.
    class TiledDisplayList:
        prop tile_map: Map<TileKey, DisplayList>
        # Updates the tile corresponding to tile |key|.
        func updateTile(key:TileKey, new_dl:DisplayList)→ None
            tile_map[key]=new_dl
}

On the IB, serializing display list tiles is accomplished with the following routines:

module IsolatedBrowser::Compositor {
    class Serializer:
        # Declaration. Returns display list ops with bounding
        # boxes that intersect |rect|.
        func<standard> extractOpsInRect(display_list : DisplayList,
                                        rect : Rect) -> DisplayList
        # Declaration. Sub-divides |bounds| into a list of tiles, and returns
        # that list.
        func<standard> tileRectList(bounds : Rect) -> List<Rect>
        # Writes the |display_list| draw_ops that intersect |tile_rect| into
        # |buffer|.

```
            func writeDisplayListRect(display_list : DisplayList,
                                      tile_rect : Rect,
                                      buffer : Binarywriter) -> None
                buffer.writeRect(tile_rect) # identify the tile
                tile_dl = extractOpsInRect(display_list)
                serializeDisplayList(tile_dl, buffer)
            # Serializes only the tiles that intersect |dirty_rect| in the given
            # |display_list| into |buffer|.
            #
            # Meant to be invoked as part of serializeLayer in lieu of
            # serializeDisplayList.
            func writeDirtyTiles(display_list : DisplayList,
                                 dirty_rect : Rect,
                                 layer_bounds : Rect,
                                 buffer : Binarywriter) -> None
                for rect in tileRectList(layer_bounds):
                    if rect.intersects(dirty_rect):
                        writeDisplayListRect(display_list, rect, buffer)
        }
```

1. Example: Image Animation

An example of how Display List tiling cuts rendering and network tiling costs is shown on the following example page:

```
<!DOCTYPE html>
<html>
  <body>
    <div id='ad' style='position: absolute; width: 100px; height: 100px;'>
      <image src='animated.gif' />
    </div>
    Paragraph 1
    Paragraph 2
    ...
  </body>
</html>
```

The page displays a 100×100 animated image in the top left corner, followed by lots of text content. Because the image is animated, the IB generates a continuous stream of updates for the TC to render.

2. Rendering Updates

Upon loading the example page, IB generates and transmits to the TC a sequence of n Layer Trees:

$T\_\{0\}, T\_\{1\}, \ldots, T\_\{n-1\}$ where the precise value of n depends on how long the page is left open.

In that update sequence, Layer Tree $T\_\{i\}$ is defined as:
* Root
  Layer A
    Display List $A\_\{i\}$ Without tiled Display Lists, Display List $A\_\{i\}$ (for all i) would contain the following ops:
 1. DrawImage(0, 0, frame_data_{j})
 2. DrawPath(0, 256, par1Path)//draw paragraph 1
 3. DrawPath(0, 512, par2Path)//draw paragraph 2
 4. DrawPath(0, 768, par2Path)//draw paragraph 3
 ...

In other words, all of Layer A's content, including text, is serialized in every update even though only the image is being animated.

By contrast, with tiled Display Lists, the initial update is the same size as the without tiling case, but subsequent updates are substantially smaller.

More precisely, with tiled display lists using a fixed and uniform 256×256 tile size, Display List $A\_\{0\}$ is defined as:
 1. DrawImage(0, 0, frame_data_{j})
 2. DrawPath(0, 256, par1Path)//draw paragraph 1
 3. DrawPath(0, 512, par2Path)//draw paragraph 2
 4. DrawPath(0, 768, par2Path)//draw paragraph 3
 ...

but Display List $A\_\{i\}$ (for i>0) is defined as:
 1. DrawImage(0, 0, frame_data_{j})

That is, after the first display list, subsequent updates do not transmit the ops that lie outside of the animating tile. There is no need to because the TC already has a copy of those tiles, and those tiles have not changed.

F. Context-Aware Throttling

1. Example Specification

An Isolated Browser can be augmented with:
Layer priorities
  Each layer has a configurable priority
  Priority may be static, or dynamic based on the Layer's properties
    E.g., as determined by an analysis of Display List contents
    E.g., as determined by an analysis of video content or its metadata
A rate limiter for bandwidth control
  The rate limiter is shared by all pages (browser wide)
  Though a variety of limiting approaches may be used here, in an example embodiment we use the Token Bucket Filter (TBF), which has the following parameters:
    Token fill-rate: determined by standard bandwidth estimation procedure or by an artificial limit; token unit is in bytes
    Bucket size: a large burst size is recommended to account for video content; unit is in bytes
  A single rate limiter allows unused capacity to be shared by lower priority classes
A prioritized layer serializer
  that serializes high priority layers first to ensure that they get favored access to bandwidth capacity
A Thin Client can be augmented with:
Per-layer flow controller
  Periodically monitors resource utilization of a layer
    E.g., how long it takes to draw, memory required, etc.
  If high, informs IB Compositor to downgrade priority by sending it a message with the id of the Layer to downgrade
  Optionally, it may update the Layer's priority when it detects that resource utilization is nominal The following is an extension of the IB Compositor that supports data rate limiting. Here is given only the changes made to the core implementation.

```
module<standard> IsolatedBrowser :: Compositor {
    ## Globals shared by all LayerTreeManager instances
    # Size of EB's viewport; kept up to date by resize updates sent by TC.
    prop viewport_rect : Rect
    # A global rate limiter shared by all priority classes.
    prop tbf : TokenBucketFilter
```

```
# Two priority classes to keep the spec simple.
enum Priority:
   kLow = 0,
   kHigh = 1
# An extension of the core Layer class.
class Layer:
   # Priority set by the TC. None if TC hasn't set it.
   prop priority : Priority | None
   func intersectsViewport( ) -> bool
      return transform.mapRect(bounds).intersects(viewport_rect)
   # Returns true if the layer resides in a tab that is visible to the user:
   # i.e., is not in a background tab and is not being occluded by other
   # windows.
   func<standard> isForeground( ) -> bool
   # Returns true iff this Layer is hosted within an ad iframe. This is
   # standard functionality provided by modern browsers (e.g.. Chromium has
   # an AdTracker).
   func<standard> isInAdFrame( ) -> bool
   # Returns true iff the layer hosts an interactive element or is capable
   # of being interacted with (e.g., scrolled) in some way. This may be
   # tailored to the needs of the user base.
   func isInteractive( ) -> bool
      # These helpers are trivial to implement given existing Renderer APIs.
      return (hasInputFocus( ) or hasHTMLButtonElement( )
         or hasScrolledRecently( ))
   # Returns true iff layer is of interest to user. This can be tailored to
   # the user-base at hand: e.g., some user bases will find ads interesting,
   # others will not.
   func isInterestingToUser( ) -> bool
      # Our target audience does not value ad content. Nor is there any value
      # in consuming bandwidth for invisible content.
      return intersectsViewport( ) and not isInAdFrame( )
   # Example prioritization function that favors videos and interactive
   # content.
   func getPriority( ) -> int
      # Allow TC to override the priority for flow control needs.
      if priority:
         return priority
      # Background tabs are not visible to the user, so there's little value
      # in consuming bandwidth to remote such content.
      if not isForeground( ) or not isInterestingToUser( ):
         return Priority::kLow
      if type == kVideoLayer:
         return Priority::kHigh
      elif type == kPictureLayer and isInteractive( ):
         return Priority::kHigh
      return Priority::kLow
   # Override the default priority calculation for the layer. This allows
   # the TC to control prioritization for flow controls needs.
   func setPriority(Priority new_prio) -> None
      priority = new_prio
   # Invoked when this layer's updates are throttled; does nothing by
   # default but is overridden by the video quality adjustment modules.
   func wasThrottled(tbf : TokenBucketFilter) -> None
      pass
# A layer tree serializer that considers available bandwidth and layer
# priority order during serialization. Layer serialization is skipped if
# there is not enough available bandwidth.
class PrioritizedSerializer inherits Serializer:
   func serializeIfTokensAvailable(layer : Layer) -> None
      tmp_buffer = BinaryWriter( )
      serializeLayer(layer, tmp_buffer)
      # Send the update only if there's enough bandwidth capacity.
      if tmp_buffer.size( ) <= tbf.nrTokens( )::
         buffer.writeBuffer(tmp_buffer)
         tbf.consumeTokens(tmp_buffer.size( ))
         layer.is_dirty = false
         if layer.type == kVideoLayer:
            # Avoid sending the chunks again in future commits.
            layer.video_state.chunks = None
      else: # not enough tokens
         # Do not send an update, and do not clear the dirty flag to ensure
         # that the layer is considered for serialization in the next commit
         #
         # Take layer-specific throttling action (e.g., adjust video quality)
         layer.wasThrottled(tbf)
   func serializeTree(layer_tree : LayerTree,
               buffer : Binarywriter) -> None
```

```
    # High-priority layers get priority access to TBF tokens.
    for layer in layer_tree.preOrderList( ):
        if layer.getPriority( ) == Priority::kHigh:
            serializeIfTokensAvailable(layer)
    # Now serialize the low-priority layers.
    for layer in layer_tree.preOrderList( ):
        if layer.getPriority( ) == Priority::kLow:
            serializeIfTokensAvailable(layer)
# A variant of LayerTreeManager with bandwidth throttling capability. The
# IB is expected to use this instead of LayerTreeManager if bandwidth
# throttling capability is desired.
class ThrottlingLayerTreeManager inherits LayerTreeManager:
    # Callback invoked when TC's FlowController explicitly updates a layer's
priority
    # class. This happens, for instance, when TC realizes that drawing layer
    # |layer_id| costs too much endpoint CPU and thus wants to reduce the
layer data
    # rate in order to avoid falling behind on drawing other layers.
    func<NN> onSetPriorityFromTC(layer_id : int, prio : Priority) -> None
        layer = layer_tree[layer_id]
        layer.setPriority(prio)
    # Invoked when LayerTreeManager completes layer tree build/update.
    func<NN> onLayerTreeUpdateComplete(layer_tree : LayerTree):
        buffer = BinaryWriter( )
        PrioritizedSerializer( ). serializeTree(layer_tree, buffer)
        websock.sendMessage(buffer.toArray( ))
    # Initialize the rate limiters with values that add up to a global maximum
    # data rate of roughly 100KBps.
    kMaxDataRate = 100000 # in bytes
    kBucketSize = kMaxDataRate * 4 # allow bursts up to 4x the average max data
rate
    tbf = TokenBucketFilter(kBucketSize, kMaxDataRate)
}
module<standard> Common::Utils {
    # Standard set of routines for getting current time and creating timers.
    class<standard> Time
    class TokenBucketFilter(bucket_size : int, data_rate : int):
        prop tokens : int = 0
        # The last time the TBF was filled.
        prop last_time : Time
        func consumeTokens(int nr_to_sub) -> None
            tokens = max(0, tokens – nr_to_sub)
        func addTokens(int nr_to_add) -> None
            tokens = max(bucket_size, tokens + nr_to_add)
        func hasTokens( ) -> bool
            return tokens > 0
        func getDataRate( ) -> int
            return data_rate
        func replenishBucket( ) -> None
            elapsed_time_secs = Time::Now( ) – last_time
            addTokens(elapsed_time_secs * data_rate)
            last_time = Time::Now( )
        # Replenish the bucket at regular intervals.
        Time::setInterval(replenishBucket, 100) # invoked every 100 ms
}
```

1. Examples: kPictureLayer Data Rate Throttling a. Example: Login Page with Background Animation Real-world pages often contain gratuitous animations that are not central to the user's needs. When loaded via RBI, these animations may consume substantial bandwidth at the expense of interactive response time. For example, consider the following login page modeled after a real-world login page to a major cloud service:

```
<!DOCTYPE html>
<html>
    <body>
        <div id='background' style='width: 100%; height: 100%;'>
        <form action='/login.php' method='post' style='position: absolute;
left: 50%;'>
            Login: <input id='login'></input>
            Password: <input id='pass'></input>
            <input type='submit' value='Submit'>
        </form>
        <script>
            var boxes = [ ], i;
            for (i = 0; i < 100; i += 1) {
                var box = document.createElement('div');
                box.style.top = box.style.left = '0px';
                box.style.width = box.style.height = '100px';
                box.style, backgroundcolor = 'blue';
                box.style.transform = 'rotateZ(0)'; // force composited
layer creation
                boxes.push(box);
                box.appendChild(document.getElementById('background'));
            }
            <!-- Animation: move the boxes around to create a simple
jiggling effect
            -->
            window.requestAnimationFrame(function( ) {
                boxes.forEach(function (box) {
                    box.style.left += Math.random( ) * 2;
```

-continued

```
      box.style.top += Math.random( ) * 2;
    });
  });
  </script>
  </body>
</html>
```

Hosted via an HTTP server running at the imaginary domain example.com, the page features a login form comprising HTML, input fields (for login and password) and a jiggling-box background animation. The background animation comprises a hundred animated boxes that, when loaded via RBI, induce the Compositor to generate frequent layer updates. Without fine-grained layer bandwidth regulation, these updates will likely overwhelm the EB-to-IB communications channel and make it impossible (or excruciatingly slow) for the user to input credentials into the login form.

In this section, it is demonstrated that, with a bandwidth throttling mechanism in place, the RBI service provides differentiated bandwidth regulation of page content, thus providing low interactive response times to the user while keeping within admin-enforced bandwidth upper-limits.

Session trace under RBI:
1. The user enters the URL of the page into the EB (example.com). The TC then requests that IB load the page.
2. The RBI service allocates and pairs an IB with the user (if not already paired) and forwards the load request to the IB.
   a. Upon allocation: among other things, IB initializes a single 100 KBps TBF for rate limiting needs.
3. IB loads the page
   a. IB's Renderer parses the page, builds intermediate data structures, and prepares for lifecycles update requests from the Compositor
   b. Compositor allocates a single LayerTreeManager for the page
4. The page's LayerTreeManager enters its main rendering loop, which involves periodically generating Commits and sending them to the TC
   a. For each turn of the rendering loop, LayerTreeManager requests a lifecycle update from the Renderer. That results in the building or updating of the Layer Tree and the generation of a Commit.
   b. For this page, all generated Layer Trees have the following form:
   Tree Root
   |_ P_1 (PictureLayer for animated square object)
   |_ . . . (same)
   |_ P_k (same)
   P_k+1 (PictureLayer for login form with input fields)
   where layers P_1 to P_k (k=100 for this page) correspond to animated objects in the page's background and P_k+1 corresponds to the login form.
   i. P_k+1 contains username and password input fields. To log in to the site, the user must first shift keyboard focus to those fields prior to typing.
   ii. The background objects (P_1 to P_k) are constantly animated via CSS style updates made by the page's JavaScript. As there are 100 of them in our example demo (see HTML), we expect it to consume significant bandwidth.
   iii. The background objects, by virtue of our rate limiting policy, do not contain input fields and thus will be considered low priority (Priority::kLow). The login form layer also starts off with Priority::kLow since it does not yet have input focus.
   c. Although the form of the Layer Tree is similar across commits, the properties of individual Layers in the tree will vary from commit to commit.
5. In this example user session, the Compositor is expected to generate the following sequence of commits immediately after page load: C_0, C_1, C_2, . . . , C_20
   a. C_0 contains the initial properties of all page layers: e.g., transform, size, type, Display List, etc.
   b. C_1 to C_20 contain updates to the animated layer properties, specifically their positions
      i. E.g., In C_1, P_1 may move to the right by 1 pixel, P_2 may move down by 2 pixels, and so on.
      ii. E.g., In C_10, P_k+1 updates its Display List to draw a focus ring around the input field
6. Shortly after load (commits C_20 to C_60), the user perceives a slight reduction in frame-rate for the background animation
   a. Cause of background frame-rate reduction: when it is time to generate C_20, the tokens in the TBF become depleted, which means there is not enough bandwidth availability to serialize all background objects in this commit
   b. PrioritizedSerializer::serializeTree then chooses a subset of all background layers to serialize. The remaining will have to wait for a future commit in which more TBF tokens become available.
7. During commits C_61 to c_100, the user clicks on the username field and begins typing her credentials. As she types, she perceives low response times: the characters echo with little to no latency and the caret blinks in steady tempo.
   a. As a result of shifting input focus to the username field, the login form layer's priority changes to Priority::kHigh, per our example policy (see Layer:: getPriority( )).
   b. Since high-priority layers get priority access to TBF tokens, the response times of keyboard echos and caret blinks are not impacted by the high volume of background updates in the low-priority layers.

b. Example: News Page with Advertisement Frames

Real-world pages often contain advertisements that are not central to the user's interests or needs. When loaded via RBI, these ads may consume substantial bandwidth along the EB-to-IB link, even if the user is not actively interacting with or looking at the page. For example, consider the following news page:

```
<!DOCTYPE html>
<html>
  <body>
    <div style='overflow: scroll;' id='article'>
    Breaking News: Stock Market is Up
    . . .
    </div>
    <iframe style='position: fixed; bottom: 0px;' src='ad.net/widget.html'>
    <iframe style='position: fixed; right: 0px;' src='ad.net/product-video-1.html'>
  </body>
</html>
```

Hosted on an HTTP server running at the imaginary domain example.com, the page features a long news article and multiple advertisement iframes, as is typical of real-world news sites. One ad frame hosts a video player that begins playing videos as soon as the page is loaded and continues to play for the duration of the session, cycling through a variety of ad videos even when the user is not interacting or looking at the page, thus consuming substantial bandwidth. The second ad features DOM and image-based animations that update frequently, also consuming significant bandwidth. The news article itself is hosted inside of a scrollable div element.

In this section, it is demonstrated that, with a bandwidth throttling mechanism in place, the RBI service ensures timely rendering of news content when the user scrolls, while keeping within admin-enforced bandwidth upper-limits.

Session trace under RBI:
1. The user enters the URL of the page into the EB (example.com). The TC then requests that IB load the page.
2. The RBI service allocates and pairs an IB with the user (if not already paired) and forwards the load request to the IB
   a. Upon allocation: among other things, IB initializes a single 100 KBps TBF for rate limiting needs.
3. IB loads the page
   a. IB's Renderer parses the page, builds intermediate data structures, and prepares for lifecycles update requests from the Compositor
   b. Compositor allocates a single LayerTreeManager for the page
4. The page's LayerTreeManager enters its main rendering loop, which involves periodically generating Commits and sending them to the TC
   a. For each turn of the rendering loop, LayerTreeManager requests a lifecycle update from the Renderer. That results in the building or updating of the Layer Tree and the generation of a Commit.
   b. For this page, all generated Layer Trees have the following form (simplified):
   Tree Root
   |_ P_1 (PictureLayer for news (scrollable))
   |_ P_2 (PictureLayer for ad.net/widget.html ad)
   |_ V_1 (VideoLayer for ad.net/product-video-1.html)
   |_ P_3 (PictureLayer for video controls)
      i. The ad layers (P_2, V_1) host dynamic content (animation and videos), while the news layer (P_1) is animated only when the user explicitly scrolls the content.
      ii. The dynamic content will consume significant bandwidth, but our rate limiting method will prevent those layers (low-priority) from interfering with the perceived responsiveness of the news layer (initially low-priority) should the user decide to scroll it (making it high-priority).
5. The compositor will generate the following sequence of commits immediately after page load: C_0, C_1, C_2, . . . , C_20
   a. C_0 contains the initial properties of all layers (background and foreground): e.g., transform, size, type, Display List, etc.
   b. C_1 to C_20 contain updates to the advertisement layers (changing frame to frame)
      i. Image and DOM animation on P_2
      ii. New video chunks for V1
6. Shortly after load (commits C_20 to C_60), the user scrolls the news layer (P_2). As she does so, she perceives a slight reduction in frame-rate on the advertisement layers
   a. As soon as she begins scrolling P_2, TC updates the scroll position of the layer on the IB, thus promoting the layer to Priority::kHigh per the logic in Layer::getPriority( ).
   b. On the next commit (e.g., C_21), LayerTreeManager observes the position change and serializes an updated set of layer properties for P_2
      i. These property updates include a Display List that describes what content to draw further down the scrollable
      ii. If the Display List is delayed substantially, then the user will momentarily see blank content (this is what we're trying to avoid)
   c. Since P_2 is now considered high priority, it gets priority access to TBF tokens as soon as they become available.
   d. Ad layers, being low priority, must wait for P_2's updates to be serialized, which means that their layer-properties will not be serialized on every commit, hence the perceived reduction in frame-rate of the ad layers.
7. After C_60, the user stops scrolling, and she shortly thereafter perceives an improvement to the smoothness of animation and/or video playback in the ad frames
   a. Once scrolling stops, P_2 is downgraded to Priority::kLow, and moreover, P_2 no longer uses any tokens, thus enabling the low-priority ad content layer updates to be serialized on every commit.

2. Example: kVideoLayer Data Rate Throttling

The ability to throttle video transfers independently of other page content on the EB-to-IB communications path is a unique capability afforded by RBI; network-level throttling cannot do this because it sees the page merely as a bag of bytes and is unaware of what they represent (e.g., video vs. non-video). However, reducing the EB-to-IB transfer rate of video layer communications alone may not be enough to ensure a good user experience; specifically, throttled EB-to-IB data rates risk introducing playback stalls if the EB's frame playback rate is greater than the rate at which the frame data arrives from the IB.

To minimize playback stalls, we can reduce the quality, compression format, and/or frame-rate of the video so that more video content can be transferred at the same or smaller bitrate. One challenge is that the quality of video encoding is determined at the web application level and depends largely upon the specific video player in use. Described herein are several techniques that address this challenge.

a. Example Techniques for Avoiding Video Playback Stalls

—Explicit Quality Adjustment Via Video Player Interaction—

Many video players expose user-adjustable quality/bit-rate options in their UI. Hence one way to adjust video quality is to manipulate the video player application settings by either simulating user actions (clicking on DOM elements) or by directly invoking the player's JavaScript API. A key benefit of this approach is that it works for any video player with exposed quality settings. However, the precise interaction sequence including the ids of DOM elements must be hard-coded and therefore must be continuously updated when the video player changes.

The following is an extension for adjusting the video quality setting on popular HTML video players:

```
module IsolatedBrowser::Extensions:: QualityAdjustment {
    # Leverages Extensions API (e.g.. Chromium Extension API) to inject a
    # simulated click on every element with id attribute |id| within frame
    # |frame_id|. Returns true iff at least one such element was found and
    # successfully clicked.
    func<standard> clickElements(frame_id : int, id : string) -> bool
    # Execute the JavaScript in |script| in the context of the frame identified
    # by |frame_id|.
    func<standard> executeScript(frame_id : int, script : string) -> bool
    # Quality adjuster for ExampleCorp1 video player.
    class PlayerAController:
        # Adjusts quality (and hence bit-rate) of video players in frame
        # |frame_id| by simulating user interaction on the video player.
        func adjustQualityByClicking(frame_id : int, prio : Priority) -> bool
            if prio == Priority::kHigh:
                return clickElements('high-quality')
            return clickElements ('low-quality')
        # Adjust bit-rate by directly invoking the video player's JavaScript API.
        func adjustQualityByScripting(frame_id : int, prio : Priority) -> bool
            return executeScript(
                'document.getElementById("movie_player"). setPlaybackQuality(%s);'
                % prio)
    # Adjuster designed for another video player. Works like the one above, but
    # element ids and API calls will differ.
    class PlayerBController:
        ...
}
module IsolatedBrowser::Compositor {
    func Layer::wasThrottled(tbf : TokenBucketFilter) -> None
        if layer.type != kVideoLayer:
            return
        # Fall back to user-interaction simulation if adjustment via direct API
        # call fails. The latter may fail if the site changes the API name.
        #
        # Each layer is associated with one LayerTreeManager object, and each
        # such object has an associated DOM frame id that uniquely identifies the
        # HTML frame/iframe it corresponds to.
        if getFrame( ).getCurrentOrigin( ) == 'maker-of-player-a.com':
            ctrl = Extensions::QualityAdjustment::PlayerAController( )
        else:
            ctrl = Extensions::QualityAdjustment::PlayerBController( )
        frame_id = getFrame( ).getId( )
        if not ctrl.adjustQualityByScripting(frame_id, getPriority( )):
            ctrl.adjustQualityByClicking(frame_id, getPriority( ))
}
```

—Induced Quality Adjustment Via Bandwidth Modulation—

Another approach to quality adjustment is to module the effective bandwidth along the IB to Origin Web Server link. The aim is to artificially trigger the HTML video player's built-in adaptive streaming capabilities. This is based on the fact that adaptive players pay attention to how fast video chunks are being downloaded and adjust the quality rate automatically in order to avoid playback stalls. A benefit of this approach is that it works on any adaptive video player (e.g., those that auto-adjust bit-rate of video playback based on available bandwidth) and it will not break when the DOM element of the player changes.

The following is a module that throttles the bandwidth of select XHR requests/responses issued by the IB with the aim of triggering the video player's built-in quality adjustment mechanism (found in modern adaptive video players).

```
module IsolatedBrowser {
    # Defines the default request/response throttling behavior for every HTTP
    # request/response issued by the IB to Origin Servers. It may be overridden
    # to customize throttling behavior.
    class<standard> NetworkThrottle:
        # Returns a list of pending responses.
        func<standard> pendingResponses( ) -> List<Response>
        # Returns the frame that is being throttled.
        func<standard> getFrame( ) -> RenderFrame
        ...
    # Contains a single HTTP response, including size, payload, origin, etc.
    class<standard> Response
        # The contents of the response.
```

```
    enum<standard> Response::Initiator:
        kXHR,     # request was initiated by XMLHttpRequest
        kVideo,   # request was initiated by a <video> tag
        ...
    ...
    # A custom throttler that overrides the default throttling behavior.
    class XHRThrottle inherits NetworkThrottle:
        prop data_rate : int = -1  # -1 implies unbounded data rate
        func throttleIfNeeded(resp : Response) -> bool
            # Throttle only those responses that are likely to contain video
            # content. XHRs may be used to fetch video content by MSE-based
            # players, but they may also be used to fetch non-video application
            # data. We avoid disrupting the latter by using a heuristic here based
            # on a combination of request initiator type and whether the page is
            # actually playing any video (a capability unique to RBI).
            if (resp.type == Response::Initiator::kXHR and
                    getFrame( ).isPlayingVideo( )):
                resp.setThrottle(data_rate)
                return true
            else if resp.type == Response.Initiator::kVideo:
                resp. setThrottle(data_rate)
                return true
            return false
        func onResponse(resp : Response) -> None
            if not throttleIfNeeded(resp):
                NetworkThrottle::onResponse(resp) # original behavior
        func setDataRate(new_rate : int) -> None
            data_rate = new_rate
            # Throttle pending responses that have yet to complete; video stream
            # responses may take a while to complete on account of their size
            # and/or streaming.
            for resp in pendingResponses( ):
                throttleIfNeeded(resp)
    func<standard> onNewFrameCreated(frame : RenderFrame) -> None:
        # Install a custom throttling object for each frame so that we can
        # control the request/response data rate of specific frames without
        # impacting other frames.
        frame.setNetworkThrottle(XHRThrottle( ))
}
module IsolatedBrowser::Compositor {
    # Returns the RenderFrame that hosts this Layer.
    func<standard> Layer::getRenderFrame( ) -> RenderFrame
    func Layer::wasThrottled(tbf : TokenBucketFilter) -> None
        if layer.type != kVideoLayer:
            return
        # Get a reference to the custom throttler for this frame; this was
        # assigned at frame creation time (see above).
        frame_throttle = getRenderFrame( ).getThrottle( )
        # Throttling the IB-to-OriginServer link will trigger adaptive streaming
        # logic in the video player: it will dynamically update the video quality
        # or codec parameters to ensure smooth playback with the available
        # bandwidth. Note that this assumes the video player and Origin Web
        # Server supports adaptive streaming.
        frame_throttle.setDataRate(tbf.getDataRate( ))
}
``` b. Example: Video Rate Limiting

It is herein demonstrated that bandwidth regulation of video content on the news page example given above. On that page, product video served by ad.net employs an HTML5 video player with adaptive streaming capability. The players are hosted within iframes and begin playing video content in an endless loop upon iframe load.

With the news page example in mind, the session trace under RBI is as follows:

1. The user enters the URL of the page into the EB (example.com). The TC then requests that IB load the page.
2. The RBI services allocates and pairs an IB with the user (if not already paired) and forwards the load request to the IB
    a. Upon allocation: among other things, IB initializes a single 100 KBps TBF for rate limiting needs.
3. IB loads the page
    a. IB's Renderer parses the page, builds intermediate data structures, and prepares for lifecycles update requests from the Compositor
    b. Compositor allocates a single LayerTreeManager for the page
4. The page's LayerTreeManager enters its main rendering loop, which involves periodically generating Commits and sending them to the TC
    a. For each turn of the rendering loop, LayerTreeManager requests a lifecycle update from the Renderer. That results in the building or updating of the Layer Tree and the generation of a Commit.
    b. For this page, all generated Layer Trees have the following form:
        Tree Root
        |_ P_1 (PictureLayer for main frame http://example.com)

|_ V_1 (VideoLayer for iframe video http://example.com/news.mp4) where V_1 is assigned low priority (Priority::kLow) as a result of being within an ad iframe (see Layer::getPriority( )). Had it not been in an ad iframe, it would have received Priority::kHigh on account of it being user-visible (in the viewport and in a foreground tab).

5. As the HTML video players begin fetching and playing segments, video chunks are enqueued into V_1's VideoLayer chunk queue. This results in the following sequence of commits over the page's lifetime: T_0, T_1, T_2, . . . , T_100 (the precise number of commits will vary from run to run), where
   a. Chunk C_a (5 KB) is enqueued to V_1's chunk queue at T_10
   b. Chunk C_c (40 KB) is enqueued to V_1's chunk queue at T_20
   c. Chunk C_d (5 KB) is enqueued to V_1's chunk queue at T_60
   d. Chunk C_e (5 KB) is enqueued to V_1's chunk queue at T_70
   e. Chunk C_f (5 KB) is enqueued to V_1's chunk queue at T_80

6. Given the flow of video chunks, rate-limiting code executes as follows:
   a. In T_0, no rate limiting is needed since there is not yet any chunk data in either video layer:
      i. V_1: chunks=[ ] (0 KB)
   b. In T_10, V_1 has a chunk to serialize:
      i. V_1: chunks=[C_a (5 KB)]
      ii. Given that there are enough TBF tokens, the chunk gets serialized
   c. In T_20, V_1 gets a new chunk:
      i. V_1: chunks=[C_c (200 KB)]
      ii. But that chunk exceeds the number of available tokens, and thus V_1 must be throttled (in turn invoking Layer::wasThrottled for V_1)
      iii. As a result of the throttling, user is at risk of video playback disruption (stalls)
   d. In T_50, V_1 finally has finally accumulated enough tokens to send C_c
   e. In T_60, V_1 gets a new chunk that is much smaller as a result of applying a stall reduction technique (done within the Layer::wasThrottled call)
      i. V_1: chunks=[C_d (5 KB)]
   f. All subsequent chunks added to V_1 in the trace are equally small, thus reducing the risk of EB-side playback stalls.

Example: Explicit Video Quality Adjustment via Video Player Interaction

Step 6c in the primary trace above is now examined more closely with the assumption that Explicit Video Quality Adjustment is in effect. Upon having its wasThrottled method invoked, video layer V_1 reduces the quality of the video stream as follows:
1. It inspects the URL of the iframe hosting the video
2. It observes that the URL corresponds to the maker of video player PlayerA, so it instantiates a PlayerAController object to control it
3. It tells PlayerAController to reduce quality via the JavaScript API
4. But, in our example, that API call fails since PlayerAController has no such exposed API (e.g., because it was removed in the latest version)
5. As a fallback action, PlayerAController resorts to simulating user interaction with the video player
   a. IB, under extension control, generates a click event on the button for "Low Quality"
   b. That in turn invokes the onButtonClick handler
   c. The handler sets the 'quality' variable of the page to 'low'
6. In subsequent chunk fetches, the video player will fetch low-quality versions of segments as opposed to the default high quality versions.
   a. Observe that the query string for the fetch request URLs now evaluates to 'low' instead of 'high'.
   b. This explains why C_d is small (5 KB): the application reduces quality, thus causing it to request smaller video segments.

Example: Induced Video Quality Adjustment Via Bandwidth Modulation

Step 6c in the primary trace above is herein examined more closely with the assumption that Bandwidth Modulation is in effect.

Upon having its wasThrottled method invoked, video layer V_1 reduces the quality of the video stream as follows:
1. It obtains a reference to the XHRThrottle for its containing frame
2. It sets the throttle data rate to match that of the layer's TBF data rate
   a. As a low priority layer, V_1 is assigned a low data rate, and thus one can expect video traffic in that frame to be throttled to that amount.
3. Upon invoking XHRThrottle::setDataRate, it considers all active/pending HTTP responses (e.g., for long lived video streams) and future connections:
   a. For each such connection, it determines who the initiator of the connection is and whether the page is actively playing video (IB's Renderer tracks via its implementation of HTMLMediaElement).
   b. It throttles only those connections that were initiated by XHR or by a video tag, and that only if video is actively playing on the page.
   c. Note that only the connections in the owning frame are impacted by the data rate change, which is a useful property since popular real-world video players are often hosted inside of iframes.
4. At the HTML/JavaScript level, the page's adaptive video player observes the change in bandwidth and reduces quality to 'low'.
   a. As the video continues playback, the page observes that it is dangerously close to the end of the playback stream despite having more chunks in its pending queue.
   b. It sets the quality variable to 'low', which in turn causes the next segment fetch request to request a low-quality version of the segment as opposed to the default 'high' quality version, hence adapting to bandwidth conditions.

G. Appendix

1. Specification Language

For clarity and precision, a typed programming language inspired by Python has been used to provide additional detail on various techniques described herein. A variety of languages can be used to implement embodiments of the techniques described herein.

A brief overview of constructs is as follows:
* Variables

Variables hold state, and syntax follows a Python-like model.
x=0

Type declarations, when left out, are inferred from context.
* Loops
Python-like while and for loops are supported, e.g.,
for x in xrange(1, 3):
iterates twice, with x holding the value 1 in the first iteration and 2 in the second iteration.
* Function (func)
Defines a method that may be invoked. When invoked (potentially with arguments), it performs computation and returns a value. For example,
func myFunc(val: int)→bool
return 1<2
defines a function named |myFunc| that takes one argument of type int and returns a value of type bool.
A function with an empty body denotes a type definition for a function defined in a third-party or standard component, e.g.,
func getTime( )→float
* Class (class)
Defines a class of objects with properties and methods (prop and func keywords, respectively). A class may inherit from another class in object-oriented fashion, and supports common object-oriented features such as polymorphism. For example,
class Polygon:
func getArea( )→float
class Triangle:
prop base:float
prop height:float
Triangle( ):# class constructor
   base=0
   height=0
func getArea( )→float # polymorphic override
return (self.base*self.height)/2
defines a base Polygon class and a derived Triangle class (via inherits keyword) with several properties (|base| and |height|). The Triangle class overrides the getArea function in polymorphic fashion. The |self| variable references the containing object, and is used to access object properties. Classes are instantiated as follows, e.g.,
t=Triangle( )
where we say that is an object of type Triangle.
* Module (module)
Defines a high-level component. For example,
module EndpointBrowser::Compositor {
. . .
} defines a Compositor component nested within a larger EndpointBrowser component.
* Enumeration (enum)
Defines an integer enumeration of values, for example,
enum Color {
kTransparent=0,
kRed,
kBlue
}
meaning the value of kTransparent is 0 while the values of kRed and kBlue are implicitly assigned to be 1 and 2, respectively.
* Annotations
Identifiers (e.g., module, class, func, variables) may be augmented with one of the following annotations: standard, nonstandard/new; example semantics of those terms are as follows:
* standard: denotes that the component corresponds to a foundational software concept and/or publicly available software component

* NN (for: nonstandard/new): denotes that component does not correspond to a commonly found component; the module may or may not be new
An annotation of A implies that all content within the module should by default also be considered A unless explicitly marked otherwise. Example:
module<standard> BigModule {
module<NN> SubModule1 {
. . .
}
module SubModule2 {
. . .
}
}
The above indicates that BigModule is a standard component that has two submodules, SubModule1 and SubModule2, where SubModule1 is new/nonstandard and SubModule2 is standard.
Subsequent definitions of a module denotes extensions of the original definition. For example, module A below has two functions: fA and fB.
. . .
module A {
func fA( )→None
}
module A {
func fB( )→None
}
. . .
(b) The annotation <custom> within a function definition denotes that the reader is free to choose an implementation.
(c) The assert(exp) function means that expression |exp| should evaluate to true at that point in program execution. This is used to remind the reader of important program invariants.
(d) The isInstanceOf(o, C) function returns true iff |o| is an object of class |C|.
(e) Comments within the specification begin with the # character.
* Types
All variables in this language have types.
Primitive types include uint8, int, float, bool, string, and None.
Container types
* List<T> denotes a dynamic list of objects of type T, supporting a standard set of methods: e.g., push, pop( ).
* Array<T> denotes a statically-sized array of objects of type T
* Map<K,V> denotes a dictionary that maps objects of type K to objects of type V one-to-one. The non-primitive type K, the key must be supplied by K's getKey function.
Function refers to a function type, useful for passing callbacks.
Union types are also supported, e.g., object: (Apple|Orange) is taken to mean that |object| may be either an Apple or an Orange.
Variables without types are permitted so long as the type can be inferred from context.
2. Example Video Player with Adaptive Streaming Capability
The following video player leverages Media Stream Extensions to dynamically adjust the quality of video playback based on the likelihood of hitting playback stalls. Like many real-world players, this particular player also allows the user to manually select the quality type.

```
<!DOCTYPE html>
<html>
  <body>
    <video id='vid' style='width: 1024px; height: 768px;'></video>
    Select video quality:
    <button quality='high' onclick='onButtonClick( );'>720p</button>
    <button quality='low' onclick='onButtonClick( );'>240p/button>†
    <script>
      let quality = 'high'
      let m = new MediaSource
      let next_seg = 0
      let source_buffer = null
      let segments = [ ]
      let fetch_pending = false
      onButtonClick = ( ) =>
         quality = this.getAttribute('quality')
      fetchNextSegment = ( ) =>
         # Fetch chunk of the specified quality level.
         fetch_pending = true
         let chunk = await feteh('segment-' + next_seg + '-' + quality + '.mp4')
         fetch_pending = false
         source_buffer.appendBuffer(chunk)
         next_seg += 1
      m.onsourceopen = ( ) =>
         source_buffer = m.addSourceBuffer('mp4')
         fetchNextSegment( ) // fetch the first chunk
      # Invoked periodically as playback advances.
      vid.ontimeupdate = ( ) =>
         # Begin fetch of the next segment when nearly done playing current one.
         if next_seg < segments.length:
            if vid.currentTime >= vid.totalTime * 0.8 and not fetch_pending:
               fetchNextSegment( )
         # Adaptive streaming: downgrade to 'low' quality if the chunk transfer
         # brought us dangerously close to a playback stall.
         if vid.currentTime >= vid.totalTime * 0.98:
            quality = 'low'
      vid.oncanplay = ( ) =>
         # Start playing as soon as the first chunk is loaded.
         vid.play( )
      window.onload = ( ) =>
         # Get a list of video segments (i.e., chunks)
         segments = (await fetch('/segments.txt')).slice(',')
         video.src = URL.createObjectURL(m)
    </script>
  </body>
</html>
```

Upon loading within an iframe (window.onload), the player loads a list of video segments from the origin web server and initiates fetch of the first segment at the default quality level ('high'). Subsequent segments are fetched in an on-demand fashion and may be of a different quality level if the user alters the desired quality (by clicking on the quality buttons) during playback, or if the player determines that segment fetch is taking too long.

3. Utility Components

An example system uses several components that are commonly found in publicly available graphics libraries and/or open-source web browsers.

```
module<standard> Common::Utility {
   # Represents a single point (x, y) in 2D space.
   class Point:
   prop x:float
   prop y:float
   # A rectangle.
   class Rect:
   prop ltrb:List<float>[4]
   func Rect(x, y, w, h)→None
   # Returns the width of the rectangle.
   func width( )→float
   # Returns the height of the rectangle;
   func height( )→float
   # Returns true iff this rect intersects 'other'.
   func intersects(other:Rect)→bool
   # Returns true iff |pt| intersects this rect.
   func intersects(pt:Point)→bool
   # Sets |element|'s CSS position and size to that of this
      rect.
   func setStyle(element:HTMLElement)→None
   # The open source package glMatrix implements the
functionality described
   # here.
   class Matrix3D:
   # A 4x4 projection matrix of floats, suitable for projecting
      points in
   #3D space.
   prop List<float>[4][4]
   # Returns an identity matrix.
   static func identity( )→Matrix3D
   # Returns self*|other_matrix|.
   func multiply(other_matrix:Matrix3D)→Matrix3D
   # Returns the inverse of this matrix, or None if the matrix
      is
   # non-invertible.
   func inverse( )→(Matrix3D|None)
   # Returns the matrix as a CSS string value, e.g.,
      'matrix3d( . . . )'.
   func toCSSValue( )→string
```

Reads data types from binary buffer |buf| in serial order.
class BinaryReader(buf:Array<uint8>)
Writes data types to binary buffer |buf| in serial order.
class BinaryWriter(buf:Array<uint8>)

Returns the SHA256 hash of the string |s|.
func SHA256(s:string)→string
}

4. Native Browser Types

Invokes standard browser functionality. Here are various type definitions.

```
module<standard> EndpointBrowser::DOM {
#    DOM overview:
#    - browser internal representation of rendered output
#    - tree of HTML Elements and Nodes: e.g..
#         * HTMLDivElement
#               |- HTMLVideoElement
#               |- HTMLImageElement
#    - commonly traversed and manipulated using JavaScript to create dynamic
#      webpages
#    - manipulations automatically initiate Browser re-rendering
#    - common manipulations include attaching and detaching elements.
#      modifying their attributes, and removing attributes/elements.
# Partial type definition for base class for all HTML elements,
class HTMLElement:
    prop parentNode : HTMLElement
    func appendChild(element : HTMLElement) -> None
    func removeChild(element : HTMLElement) -> None
# A sequence of lines and contours used to build shapes. This is
# expressive enough to draw complex shapes such as text glyphs.
class Path2D:
    # Returns a string representation of the path, suitable for use as the
    # value of an SVG path element's "D" attribute.
    func toSVGPath( ) -> string
# Holds bitmap data (partial type definition)
class Image inherits HTMLImageElement
    # The source (e.g., URL) of the bitmap data.
    prop src : string
# Partial type definition for <canvas> elements.
class HTMLCanvasElement inherits HTMLElement:
    # Draws |image| onto the canvas.
    func drawImage(image : Image) -> None
    # Rasters |svg| and draws the resulting pixels onto the canvas.
    # On supported browsers (Chromium-based browsers. Safari, Firefox)
    # foreignObject elements of type HTMLElement within |svg| are also
    # rasterized.
    func drawImage(svg : HTMLSVGElement) -> None
    # Draws the current frame of |video| onto the canvas.
    func drawImage(video : HTMLVideoElement) -> None
    # Draws |path| onto the canvas.
    func drawPath(path : Path2D) -> None
    # Saves the current matrix and clipping state of the canvas onto a
    # stack.
    func save( ) -> None
    # Restores the top-most matrix and clipping state from the stack.
    func restore( ) -> None
    # Sets the clipping region to that of the intersection of the current
    # clip and |rect|. Draws outside of the clipping region have no effect.
    func clip(rect: Rect) -> None
class HTMLDocumentElement:
    prop body : HTMLElement
# Renders video content. Uses hardware acceleration when available.
# Heavily optimized by the Browser, hence preferable. Known drawbacks
# include:
# * resets state if detached from Browser DOM (on some browsers)
# * attempts to restore state after re-attach will result in
#    audio & visual artifacts (e.g., skipping)
class HTMLVideoElement inherits HTMLElement
# Partial type definition.

# One instance of this object per window/frame is created automatically by
# the browser. From script, it is referenced via the |document| variable,
class Document:
    # Root node of the DOM tree.
    prop documentElement : HTMLDocumentElement
      # External type declaration for the third-party CanvasKit library,
      class CanvasKit
}
# Partial type definition.
```

-continued

```
module<standard> EndpointBrowser: : BOM {
  # This module represents the Browser's Object Model. It provides
  # capabilities such as network & file I/O, window management, session state
  # management, etc.
  } # Bi-directional, FIFO communication channel used to communicate with
  # the Isolated Browser.
  class WebSocket
}
```

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive, at a browser isolation system, a request from a client browser executing on a client device operated by a user to connect to a web site hosted by a remote resource;
provide, by the browser isolation system, a surrogate browser to facilitate communications between the client browser and the remote resource, wherein the surrogate browser executes on the browser isolation system and wherein the surrogate browser retrieves web page content comprising a plurality of web page elements;
determine, by the browser isolation system, a set of policies applicable to communications between the client browser and the remote resource, wherein a policy included in the set of policies indicates that a first element included in the plurality of web page elements should be given less priority than at least one of: (1) a second element included in the plurality of web page elements or (2) content loaded in a tab provided by the client browser that is different from a tab in which the first element is provided, at least in part by throttling the first element in conjunction with delivering content to the client browser;
apply, at the browser isolation system, the throttle to the first element in connection with delivering content to the client device, wherein applying the throttle includes determining a target bitrate and programmatically interacting with a bitrate selection interface made available by the remote resource; and
a memory coupled to the processor and configured to provide the processor with instructions.

2. The system of claim 1, wherein the applied throttle is contextual.

3. The system of claim 1, wherein the throttle is applied at a sub-page level of granularity.

4. The system of claim 1, wherein the throttle is applied at a tab level of granularity.

5. The system of claim 1, wherein the throttle is applied based at least in part on a time of day.

6. The system of claim 1, wherein the throttle is applied based at least in part on a determination of whether a use of the client browser during a browser session is idle.

7. The system of claim 6, wherein the determination of whether the use of the client browser during the browser session is idle is based at least in part on whether or not a threshold amount of user interaction within a predetermined period of time is observed.

8. The system of claim 1, wherein applying the throttle includes reducing bandwidth available to a background animation.

9. The system of claim 1, wherein the first element is an invisible video.

10. The system of claim 1, wherein applying the throttle includes reducing bandwidth available to advertisement content.

11. The system of claim 1, wherein applying the throttle includes reducing bandwidth available to a first layer and prioritizing bandwidth available to a second layer.

12. The system of claim 1, wherein applying the throttle includes prioritizing bandwidth available to an interactive layer.

13. The system of claim 1, wherein programmatically interacting with the bitrate selection interface includes preventing a user from selecting a bitrate that is above a threshold.

14. A method, comprising:
receiving, at a browser isolation system, a request from a client browser executing on a client device operated by a user to connect to a web site hosted by a remote resource;
providing, by the browser isolation system, a surrogate browser to facilitate communications between the client browser and the remote resource, wherein the surrogate browser executes on the browser isolation system and wherein the surrogate browser retrieves web page content comprising a plurality of web page elements;
determining, by the browser isolation system, a set of policies applicable to communications between the client browser and the remote resource, wherein a policy included in the set of policies indicates that a first element included in the plurality of web page elements should be given less priority than at least one of: (1) a second element included in the plurality of web page elements or (2) content loaded in a tab provided by the client browser that is different from a tab in which the first element is provided, at least in part by throttling the first element in conjunction with delivering content to the client browser;
applying, at the browser isolation system, the throttle to the first element in connection with delivering content to the client device, wherein applying the throttle includes determining a target bitrate and programmatically interacting with a bitrate selection interface made available by the remote resource.

15. The method of claim 14, wherein the applied throttle is contextual.

16. The method of claim 14, wherein the throttle is applied at a sub-page level of granularity.

17. The method of claim 14, wherein the throttle is applied at a tab level of granularity.

18. The method of claim 14, wherein the throttle is applied based at least in part on a time of day.

19. The method of claim 14, wherein the throttle is applied based at least in part on a determination of whether a use of the client browser during a browser session is idle.

20. The method of claim 19, wherein the determination of whether the use of the client browser during the browser session is idle is based at least in part on whether or not a threshold amount of user interaction within a predetermined period of time is observed.

21. The method of claim 14, wherein applying the throttle includes reducing bandwidth available to a background animation.

22. The method of claim 14, wherein the first element is an invisible video.

23. The method of claim 14, wherein applying the throttle includes reducing bandwidth available to advertisement content.

24. The method of claim 14, wherein applying the throttle includes reducing bandwidth available to a first layer and prioritizing bandwidth available to a second layer.

25. The method of claim 14, wherein applying the throttle includes prioritizing bandwidth available to an interactive layer.

26. The method of claim 14, wherein programmatically interacting with the bitrate selection interface includes preventing a user from selecting a bitrate that is above a threshold.

\* \* \* \* \*

UNITED STATES PATENT AND TRADEMARK OFFICE
CERTIFICATE OF CORRECTION

| | | |
|---|---|---|
| PATENT NO. | : 11,611,482 B1 | Page 1 of 1 |
| APPLICATION NO. | : 17/346010 | |
| DATED | : March 21, 2023 | |
| INVENTOR(S) | : Lionel Litty et al. | |

It is certified that error appears in the above-identified patent and that said Letters Patent is hereby corrected as shown below:

In the Specification

In Column 27, Line(s) 27, delete "element=element", and insert --element = _element--, therefor.

In Column 28, Line(s) 46, delete "text.id = 'text' + def_counter", and insert --text.id = 'text_' + def_counter--, therefor.

In Column 30, Line(s) 22, delete "return string(index_x) ++ string(index_y)", and insert --return string(index_x) + ':' + string(index_y)--, therefor.

In Column 41, Line(s) 13, delete "van banner", and insert --var banner--, therefor.

In Column 70, Line(s) 41, delete "'other'", and insert --|other|--, therefor.

Signed and Sealed this
Fifteenth Day of April, 2025

Coke Morgan Stewart
*Acting Director of the United States Patent and Trademark Office*